United States Patent
Li et al.

(10) Patent No.: US 12,481,104 B2
(45) Date of Patent: Nov. 25, 2025

(54) FIBER CONNECTOR PLUG, FIBER ADAPTER, CONNECTOR ASSEMBLY, AND COMMUNICATIONS DEVICE

(71) Applicant: Huawei Technologies Co., Ltd., Shenzhen (CN)

(72) Inventors: Xiupeng Li, Wuhan (CN); Wei Xiong, Shenzhen (CN); Shangjun Peng, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 18/175,075

(22) Filed: Feb. 27, 2023

(65) Prior Publication Data

US 2023/0258877 A1   Aug. 17, 2023

Related U.S. Application Data

(63) Continuation of application No. PCT/CN2021/082426, filed on Mar. 23, 2021.

(30) Foreign Application Priority Data

Aug. 27, 2020   (CN) .......................... 202010881525.6

(51) Int. Cl.
 *G02B 6/38*   (2006.01)
(52) U.S. Cl.
 CPC ........... *G02B 6/387* (2013.01); *G02B 6/3825* (2013.01); *G02B 6/3874* (2013.01)

(58) Field of Classification Search
 None
 See application file for complete search history.

(56) References Cited

U.S. PATENT DOCUMENTS

| | | |
|---|---|---|
| 2014/0105542 A1 | 4/2014 | Yang et al. |
| 2018/0031773 A1* | 2/2018 | Ohtsuka ............... G02B 6/2552 |
| 2019/0339461 A1 | 11/2019 | Dannoux et al. |
| 2021/0181432 A1 | 6/2021 | Xiong et al. |

FOREIGN PATENT DOCUMENTS

| | | |
|---|---|---|
| CN | 105339822 B | 10/2017 |
| CN | 107430249 A | 12/2017 |
| CN | 107533200 A | 1/2018 |
| CN | 108254835 A | 7/2018 |
| CN | 110146958 A | 8/2019 |
| CN | 110542925 A | 12/2019 |
| CN | 110542952 A | 12/2019 |

(Continued)

*Primary Examiner* — Jerry Rahll
(74) *Attorney, Agent, or Firm* — Conley Rose, P.C.

(57) ABSTRACT

A fiber connector plug, a fiber adapter, a connector assembly, and a communications device, where the fiber connector plug includes a ferrule fastened to a fiber, and a main housing and a front cover that encircle the fiber. The front cover is fastened to the main housing and encircles the ferrule. A front end face of the ferrule is flush with a front end face of the front cover, or in an axial direction, a front end face of the ferrule is located between a front end face of the front cover and a rear end face of the front cover. A slot is formed between the front cover and the ferrule, and the slot is used to accommodate an end face of a ferrule sleeve of a fiber adapter. The ferrule is used to be inserted into the ferrule sleeve.

20 Claims, 44 Drawing Sheets

(56) References Cited

FOREIGN PATENT DOCUMENTS

| | | |
|---|---|---|
| CN | 111308615 A | 6/2020 |
| CN | 112051644 A | 12/2020 |
| CN | 112068256 A | 12/2020 |
| CN | 112068257 A | 12/2020 |
| CN | 112327424 A | 2/2021 |
| CN | 213182120 U | 5/2021 |
| JP | 2007121599 A | 5/2007 |
| JP | 2010519575 A | 6/2010 |
| JP | 2016164601 A | 9/2016 |
| JP | 2019066772 A | 4/2019 |
| KR | 100278943 B1 | 1/2001 |

\* cited by examiner

FIBER CONNECTOR PLUG, FIBER ADAPTER, CONNECTOR ASSEMBLY, AND COMMUNICATIONS DEVICE

CROSS-REFERENCE TO RELATED APPLICATIONS

This is a continuation of International Patent Application No. PCT/CN2021/082426, filed on Mar. 23, 2021, which claims priority to Chinese Patent Application No. 202010881525.6, filed on Aug. 27, 2020. The disclosures of the aforementioned applications are hereby incorporated by reference in their entireties.

TECHNICAL FIELD

This application relates to the field of optical communications, and in particular, to a fiber connector plug, a fiber adapter, a connector assembly, and a communications device.

BACKGROUND

With development of communications technologies, fiber transmission is increasingly applied to communications systems. In a fiber to the home network, in a drop phase, fibers led out from an equipment room are connected to drop fibers in a fiber management tray, to deploy an optical network to every household. With population density of cities, a quantity of ports of each fiber management tray increases. How to arrange more fiber connection ports in a limited space is a research and development direction in the industry. For each fiber connector plug, how to simplify a structure to implement a miniaturization design solution is a research and development direction in the industry.

SUMMARY

Embodiments of this application provide a fiber connector plug, a fiber adapter, a connector assembly, and a communications device, to implement a miniaturization design of the fiber connector plug, such that more fiber connection ports can be arranged in a limited space.

According to a first aspect, this application provides a fiber connector plug, including a fiber, a ferrule fastened to a front end of the fiber, a main housing sleeved over a periphery of the fiber, and a front cover. The main housing is sleeve-shaped. The front cover is fastened to one end of the main housing and encircles the ferrule. An end face that is of the ferrule and that is away from the fiber is a front end face of the ferrule, and an end face that is of the front cover and that is away from the main housing is a front end face of the front cover. The front end face of the ferrule is flush with the front end face of the front cover. It may be understood that, in a radial direction, the front end face of the ferrule is aligned with the front end face of the front cover. Alternatively, in an axial direction, the front end face of the ferrule is located between the front end face of the front cover and a rear end face of the front cover. The rear end face of the front cover is an end face that is of the front cover and that faces the main housing. A slot is formed between the front cover and the ferrule, and the slot is used to accommodate a ferrule sleeve of a fiber adapter, such that an end face of the ferrule sleeve is located in the slot. It may be understood that, a front end of the ferrule sleeve is all inserted into the slot, and a radial size of the ferrule sleeve matches a radial size of the slot, that is, the radial sizes of the ferrule sleeve and the slot may be equal, or a difference between the radial sizes of the ferrule sleeve and the slot meets machining tolerance and assembling clearance. In other words, the slot accommodates no other element than the ferrule. The ferrule is used to be inserted into the ferrule sleeve.

In this application, the front end face of the ferrule is protected using the front end face of the front cover, such that the front end face of the ferrule can be prevented from being scratched. For example, the front cover can protect the front end face of the ferrule in a process of turnover, transportation, and insertion into and removal from the fiber adapter. During subsequent connection to a ferrule of a connector plug at a peer end, it is ensured that an optical signal can be stably and reliably transmitted between the two connector plugs. The slot fitting the ferrule sleeve of the fiber adapter is formed between an inner side of the front cover and the ferrule. For example, the slot is used to accommodate one end of the ferrule sleeve, and the end face of the ferrule sleeve extends into the slot. In this way, the front cover has functions of protecting the front end face of the ferrule and fitting the fiber adapter, and no other component needs to be disposed in a periphery of the front cover. Therefore, a radial size of the fiber connector plug can be small enough, such that more fiber connection ports can be arranged in a limited space of a communications device.

For the fiber connector plug, an outer surface of the front cover is also an outer surface of the entire fiber connector plug, that is, there is only one front cover structural member in a periphery of the ferrule. In this application, a protection feature (the front end face of the front cover) configured in the periphery of the ferrule and an insertion/removal fit feature (the slot formed between an inner surface of the front cover and the ferrule, and a fit between the outer surface of the front cover and an inner surface of the fiber adapter) are concentrated on the front cover. This can not only reduce parts and simplify a structure of the fiber connector plug, but also facilitate a miniaturization design of the radial size.

In a possible implementation, a first guide structure is disposed on the outer surface of the front cover, and the first guide structure is used to fit a guide key on the fiber adapter. The outer surface of the front cover provided in this application is in contact with and fits the inner surface of the fiber adapter, and the first guide structure may fit the guide key to provide guidance in a process of inserting the fiber connector plug into the fiber adapter.

In a possible implementation, the first guide structure extends along the axial direction, the fiber connector plug having the first guide structure extending along the axial direction can be inserted into or removed from the fiber adapter in a manner of direct insertion or direct removal, and there is no rotation action in an insertion process. This design helps reduce an operation space around the fiber connector plug. When a plurality of fiber connector plugs are arranged side by side on the communications device, because only an axial space is required in the operation manner of direct insertion or direct removal, no operation space needs to be reserved between adjacent fiber connector plugs.

In a possible implementation, in the radial direction, the first guide structure is a groove structure disposed on the outer surface of the front cover, that is, the first guide structure does not penetrate the inner surface of the front cover. A notch may be disposed in a position, close to the front end face, of the front cover. Disposing of the notch enables the front end face to form a non-closed ring-shaped structure or a structure with at least two faces (for example, when there are two notches, the front end face is divided into a first face and a second face). In this implementation, the first guide structure that is the groove structure and that is disposed on the outer surface of the front cover has an opening formed on one side facing the front end face, and the opening communicates with the notch. The first guide structure and the notch can provide an eye-catching reminding function for alignment in a process of inserting the fiber connector plug.

In a possible implementation, the first guide structure penetrates the inner surface and the outer surface of the front cover. It may be understood that the first guide structure is a notch or a hollowed-out structure disposed on the front cover.

In a possible implementation, the first guide structure is protrudingly disposed on the outer surface of the front cover.

In a possible implementation, the first guide structure may extend from the front end face of the front cover to the rear end face of the front cover, or may extend from the front end face of the front cover to a middle position of the front cover. The middle position herein is a position between the front end face and the rear end face. The middle position not only represents a central position between the front end face and the rear end face, but also may be a position close to the front end face or may be a position close to the rear end face.

In a possible implementation, there may be one, two, or more first guide structures. Two or more first guide structures may be evenly disposed on the outer surface of the front cover at intervals in a circumferential direction.

In a possible implementation, a second guide structure is disposed on an outer surface of the main housing, and the second guide structure and the first guide structure are connected and are jointly used to fit the guide key on the fiber adapter. The first guide structure and the second guide structure may be the same. For example, both the first guide structure and the second guide structure are groove structures, cut structures, or protrusion structures. The first guide structure and the second guide structure may be different. For example, the first guide structure is a groove structure, and the second guide structure is a cut structure; or the first guide structure is a cut structure, and the second guide structure is a protrusion structure.

The first guide structure is disposed (or the first guide structure is combined with the second guide structure), such that in a process in which the fiber connector plug is connected to the fiber adapter, the front cover can have an eye-catching reminding and guiding function. This facilitates alignment between the fiber connector plug and the fiber adapter, improves accuracy of connection, prevents a ferrule component of the fiber connector plug from being damaged or invalid due to a plurality of collisions caused by incorrect insertion of the fiber connector plug, and effectively prolongs a service life of the fiber connector plug.

In a possible implementation, the front end face of the front cover is in a closed ring structure.

In a possible implementation, one notch is disposed at an end that is of the front cover and that is close to the front end face of the front cover, such that the front end face of the front cover forms a non-closed continuously extending surface. Disposing of the notch enables the front end of the fiber connector plug to present a concave-convex shape suitable for insertion. In this way, when the fiber connector plug is inserted into the fiber adapter, the fiber connector plug can better adapt to an internal space of the fiber adapter in comparison with a front end of a fiber connector plug in a flat shape. Therefore, a loose connection caused by a limitation of the internal space of the fiber adapter is avoided, stability and reliability of insertion are improved, practicability is higher, and an application range is wide.

In a possible implementation, two notches opposite to each other are disposed at an end that is of the front cover and that is close to the front end face of the front cover, such that the front end face of the front cover is formed between the two notches. In this implementation, the front end face includes a first face and a second face, and the first face and the second face are symmetrically disposed on two sides of a central axis of the front cover. For example, if the first face and the second face are connected to form a complete circular ring, both the first face and the second face are less than or equal to a quarter of the circular ring, such that positions of the two notches can accommodate a part of a side wall on which a front end face of a front cover of another fiber connector plug is located. It may be understood that because the front end face of the front cover protrudes from the front end face of the ferrule, when a pair of same fiber connector plugs is inserted into a same fiber adapter, front end faces of two ferrules need to be connected, and an interference fit is required between two front covers. The two notches are designed to resolve a problem of the interference fit in the connection. The positions of the two notches can accommodate a part of an area in which a front end face of another front cover is located. For example, the two notches may be symmetrically disposed on the two sides of the central axis of the front cover. Due to the symmetric disposing, force received by an outer frame sleeve during the insertion can be relatively even and balanced during the insertion can be relatively even and balanced, overall strength of the outer frame sleeve is high, and a possibility of a connection failure caused by force imbalance can be minimized.

In this application, the notch disposed at the front end of the front cover is also advantageous for observation. A worker can see at least the front end face of the ferrule when viewing an outer surface of the outer frame sleeve disposed with the notch. Based on this, when connecting the fiber connection plug to the fiber adapter, the worker can see a position of the ferrule. This facilitates insertion, improves an insertion success rate, prevents the ferrule from suffering a plurality of collisions due to wrong insertion, and prevents the ferrule from being damaged.

In a possible implementation, a first limiting structure is disposed on a surface of the ferrule, a second limiting structure is disposed on the inner surface of the front cover, and the first limiting structure fits the second limiting structure to prevent the ferrule and the front cover from rotating relative to each other.

In a possible implementation, the first limiting structure includes a first plane, the second limiting structure is protrudingly disposed on the inner surface of the front cover, the second limiting structure includes a second plane facing the ferrule, and the first plane is in contact with the second plane. Limiting structures, namely, the first limiting structure and the second limiting structure, are disposed between the front cover and the ferrule that are provided in this application. It may be understood that an outer surface of the ferrule is in direct contact with and fits the inner surface of the front cover. This architecture makes a structure between the ferrule and the front cover more compact, thereby facilitating the miniaturization design.

In a possible implementation, the main housing includes a main shaft and a mounting member that are both sleeve-shaped, and the mounting member is connected to an end that is of the main shaft and that faces the front cover; a first stop structure is disposed on the outer surface of the ferrule, the mounting member includes a mounting member body and a second stop structure, and the second stop structure is located at a front end of the mounting member body and protrudes from an inner surface of the mounting member body; and a part of the ferrule is accommodated inside the mounting member, the first stop structure fits the second stop structure to prevent the ferrule from moving out of the mounting member from the front end of the mounting member body, and the front cover is sleeved over an outer surface of the mounting member and is fastened to the mounting member. In this application, assembling between the ferrule and the main shaft is implemented using the mounting member. A specific position of the ferrule on the main shaft is determined, and the front cover is directly sleeved over a periphery of the mounting member. To be more specific, the inside of the mounting member is used to mount the ferrule, the outside of the mounting member is used to mount the front cover, and a rear end of the mounting member is used to connect to the main shaft. In this application, multi-dimensional assembling and connection relationships are implemented using a mounting member structure, such that the structure of the fiber connector plug tends to be simplified and that the miniaturization design is easily implemented.

In a possible implementation, the first limiting structure and the first stop structure of the ferrule are adjacent in the axial direction, the first stop structure includes a first limiting face facing a front end of the ferrule, and the first limiting face is vertically connected to the first plane of the first limiting structure.

In a possible implementation, the mounting member body is sleeve-shaped and includes a central axis, the second stop structure protrudes from the inner surface of the mounting member body, and the second stop structure includes a second limiting face and a contact face. The second limiting face faces a rear end of the mounting member body, and the contact face faces the central axis of the mounting member body. The second limiting face is used to fit the first limiting face of the first stop structure of the ferrule. The contact face is used to fit the first plane of the first limiting structure of the ferrule. In a possible implementation, there are two second stop structures disposed opposite to each other on two sides of the central axis of the mounting member body. An axial size of one second stop structure is less than an axial size of the other second stop structure. One side that is of one second stop structure and that is away from the mounting member body forms a mounting member notch. A position of the mounting member notch directly faces a part of a contact face of the other second stop structure. The mounting member notch is used to accommodate the second limiting structure of the front cover.

In a possible implementation, the mounting member further includes an elastic clamping hook. The elastic clamping hook is formed at the front end of the mounting member body. The front cover is disposed with a clamping groove or a hole. The elastic clamping hook fits the clamping groove or the hole, to fasten the mounting member to the front cover. A fastening manner based on a fit between the elastic clamping hook and the hole can implement a detachable connection between the mounting member and the front cover to facilitate assembling and disassembling. In addition, the elastic clamping hook is clamped into the hole, and the elastic clamping hook occupies an internal space of the front cover, without increasing a radial size of the fiber connector plug. In this implementation, the front cover is sleeved over the periphery of the mounting member in a manner of direct insertion along the axial direction, such that positioning of the first guide structure of the front cover is easily implemented. Especially, when the first guide structure needs to be connected to the second guide structure on the main shaft, circumferential positioning between the front cover and the main shaft needs to be ensured.

In a possible implementation, a rear end of the front cover is in a fully enclosed cylindrical architecture, that is, the rear end of the front cover is in a circumferentially closed architecture. This can improve structural strength of the front cover on one hand, and can also improve connection strength between the front cover and the main shaft on the other hand. In addition, the front cover is used as an exterior part of the fiber connector plug, and the circumferentially fully enclosed structure can implement exterior integrity and improve user experience.

In a possible implementation, a rear end face of the mounting member body and the rear end face of the front cover are coplanar and jointly form a connecting face, and the connecting face is in contact with an end face of the main shaft. In this application, a structural design in which the connecting face is in contact with the end face of the main shaft is employed, such that the connection between the front cover and the main shaft occupies only a space of the end face of the main shaft and does not extend to the outer surface of the main shaft. The connecting face may be planar, and correspondingly, the end face of the main shaft is also planar. In another implementation, alternatively, the connecting face may be an arc-shaped face. Correspondingly, the end face of the main shaft is an arc-shaped face that is in contact with and that matches the connecting face. For example, the connecting face is a convex arc-shaped face, and the end face of the main shaft is a concave arc-shaped face.

In a possible implementation, the outer surface of the front cover and the outer surface of the main shaft in this application may be coplanar, or there is a smooth transition. For example, the outer surface of the front cover is a cylindrical surface, and the outer surface of the main shaft is also a cylindrical surface. When the front cover is in contact with the end face of the main shaft, the outer surfaces of the two cylinders with a same radial size are in contact to form a complete cylindrical outer surface.

In a possible implementation, a positioning structure is disposed at a joint between the connecting face and the front end face of the main shaft, and the positioning structure is used to position the main housing and the front cover in the circumferential direction, and/or position the main housing and the mounting member in the circumferential direction.

In a possible implementation, a first cut is disposed on the rear end face of the front cover, and a second cut is disposed on the rear end face of the mounting member body. The first cut and the second cut are opposite to each other in the radial direction. A bump is disposed on the end face of the main shaft, and the bump fits the first cut and the second cut. The positioning structure between the main shaft, the front cover, and a mounting member the mounting member is located at the joint, and positioning is implemented through a fit of the first cut, the second cut, and the bump on the main shaft. In this way, the radial size of the fiber connector plug is not increased, and the miniaturization design is facilitated.

There may be one, two, or more first cuts on the rear end face of the front cover. When there are two first cuts, the two first cuts may be symmetrically distributed on the two sides of the central axis of the front cover. When there are a plurality of first cuts, the first cuts may be distributed at intervals in the circumferential direction. Similarly, there may be one, two, or more second cuts, and an arrangement scheme of the second cut may be the same as that of the first cut.

In a possible implementation, the mounting member is connected to the main shaft using a fastener, a part of the fastener is located inside the main shaft, and the other part of the fastener is located inside the mounting member, that is, the fastener is in a completely enclosed state, and in a periphery of the fastener, the main shaft is connected to the mounting member.

In a possible implementation, the mounting member is connected to the main shaft using a fastener, and the fastener may alternatively be partially exposed as an exterior face of the fiber connector plug. The fastener is a sleeve-shaped structure. The fastener includes a front end, a rear end, and a middle part connected between the front end and the rear end. The front end of the fastener extends into an inner side of the mounting member and is fastened to the mounting member. The rear end of the fastener extends into an inner side of the main shaft and is fastened to the main shaft. The middle part is located between the front end of the main shaft and the rear end of the mounting member. It may also be understood that the middle part is located between the front end of the main shaft and the rear end of the front cover. An outer surface of the middle part forms the exterior face of the fiber connector plug.

In a possible implementation, the front end of the fastener is detachably connected to the mounting member in a manner of a fit between a buckle and a hole. A buckle is disposed in a periphery of the front end. A hole that penetrates the inner surface and the outer surface is disposed on the mounting member. The buckle of the front end is accommodated in the hole of the mounting member. The rear end is also detachably connected to the main shaft in a manner of a fit between a buckle and a hole. A buckle is disposed in a periphery of the rear end. A hole that penetrates the inner surface and the outer surface is disposed on the main shaft. The buckle of the rear end is accommodated in the hole of the main shaft.

In another possible implementation, the front end of the fastener may be fastened to the mounting member in a threaded connection manner. Similarly, the rear end of the fastener may also be fastened to the main shaft in a threaded connection manner.

In a possible implementation, a sealing groove is disposed in a periphery of the middle part of the fastener and used to accommodate a sealing structure. Certainly, in the architecture in this implementation, the sealing groove may alternatively not be disposed in the periphery of the middle part, but the sealing groove is disposed on the outer surface of the main shaft. When the fiber connector plug is inserted into the fiber adapter, the middle part is located inside the fiber adapter, and the front end of the main shaft also extends into the fiber adapter.

In a possible implementation, a sealing structure is disposed between the rear end of the fastener and the main shaft.

In a possible implementation, a guide structure may also be disposed in the periphery of the middle part of the fastener. The guide structure communicates with or continuously extends to the first guide structure on the front cover. The guide structure and the first guide structure on the front cover jointly fit the guide key on the fiber adapter. In another implementation, a guide structure is disposed in each of the periphery of the middle part and the periphery of the main shaft. The two guide structures are both disposed on an extension path of the first guide structure on the front cover. The two guide structures and the first guide structure on the front cover jointly form a guide structure of the fiber connector plug.

In a possible implementation, a sealing structure and a first locking structure are disposed on the outer surface of the main housing; and along the axial direction, the sealing structure is located between the front cover and the first locking structure, the first locking structure is used to fit a second locking structure of the fiber adapter, and the sealing structure is used for sealing connection of an inner surface of the fiber adapter.

The fiber connector plug provided in this implementation is a fiber connector plug used outdoors, and has a sealing requirement. The sealing structure is disposed between the front cover and the first locking structure, and is inserted into the fiber adapter together with the front cover, to form sealing inside the fiber adapter. According to the solution of disposing the sealing structure, a sealing connection between the fiber connector plug and the fiber adapter can be implemented using only the sealing structure. For example, the main housing includes a main shaft, the main shaft is in an integrated sleeve structure, and a front end of the main shaft also extends into the fiber adapter. The sealing structure is disposed on the main shaft and is close to the front end of the main shaft. A sealing connection between the main shaft and the fiber is implemented at a tail end of the main shaft using a heat shrink tube.

In a possible implementation, in this application, the first locking structure disposed on an outer surface of the main housing provides an insertion path for directly inserting the fiber connector plug into and removing the fiber connector plug from the fiber connector, and this helps save an operation space. For example, the first locking structure includes a sliding member and a locking part. The locking part is fastened to the outer surface of the main housing. The sliding member is slidably connected between a first position and a second position to the main housing. The locking part is located between the sliding member and the ferrule along an axial direction of the main housing. When the sliding member is located in the first position, the sliding member fits the locking part to jointly lock a second locking structure. When the sliding member is located in the second position, unlocking between the locking part and the second locking structure is implemented.

In this application, the sliding member fits the locking part to jointly lock the second locking structure on the fiber adapter, and the sliding member slides along the axial direction to implement locking and unlocking, that is, a user only needs to drive the sliding member to move in the axial direction. In a process of inserting the fiber connector plug into the fiber adapter or removing the fiber connector plug from the fiber adapter, an operation space is also a peripheral space on a side corresponding to the fiber connector plug, for example, a space above the fiber connector plug, and the sliding member only needs to be driven to slide on the main housing.

In this application, there is no need to reserve an operation space in a circumferential periphery of the fiber connector plug (space surrounding a periphery of the main housing of the fiber connector plug). Therefore, in this application, not only a miniaturization design of the fiber connector plug is implemented, but also more fiber connector plugs can be configured in a communications device having a plurality of fiber interfaces. The fiber connector plugs may be densely arranged, and even if there is no space between adjacent fiber connector plugs, insertion/removal, locking, and unlocking of a single fiber connector plug are not affected.

In a possible implementation, the locking part is a fastening block that is protrudingly disposed on the outer surface of the main housing, the locking part and the main housing are of an integrated structure, and there may be one or two locking parts. When there are two locking parts, the two locking parts are symmetrically distributed on two sides of the main housing.

The locking part is used to fit a clamping groove of the second locking structure. A locking groove is formed between the sliding member and the main housing. The locking groove is used to fit an elastic arm of the second locking structure. An opening position of the locking groove is located between one end of the sliding member and the main housing. The sliding member includes a fitting surface formed on an inner wall of the locking groove. The fitting surface faces the main housing. The fitting surface includes a first area and a second area. The first area is located between the second area and an opening of the locking groove. A vertical distance between the first area and the main housing is greater than a vertical distance between the second area and the main housing.

In this implementation, the vertical distance between the first area and the main housing is set to be different from the vertical distance between the second area and the main housing, such that the fitting surface is designed to be similar to a two-step structure or a structure obliquely extending relative to an axial direction. In a state of a fit between the fitting surface and the second locking structure, the fitting surface presses the elastic arm of the second locking structure into the locking groove. Both the first area and the second area exert pressure on the elastic arm, and the first area and the second area form a two-step architecture or an architecture obliquely extending along a radial direction. This not only helps increase a contact area between the fitting surface and the elastic arm, but also implements a function of radially pressing the elastic arm. Clamping force and locking force on the elastic arm can ensure that the elastic arm is firmly locked in the locking groove and is not easy to be pulled out.

A size of the fitting surface extended along the axial direction is a first size, and a size of the first area extended along the axial direction is a second size. It is clear that, the second size is less than the first size, and the second size may be even less than half the first size. In a locked state, a mutual pressing area between the fitting surface and the elastic arm may be an area in which the entire fitting surface is located. However, in an unlocking process, only the first area needs to be moved to a position in which the second area in the locked state is located, and the second area is synchronously moved out of the elastic arm. In this case, both the first area and the second area are detached from the elastic arm, and the elastic arm is not pressed, such that unlocking is implemented. It can be learned that, during moving in the unlocking process, the sliding member needs to travel only a distance of the second size, and does not need to travel a distance of the first size. Therefore, this implementation has advantages of stable locking and easy unlocking.

In a possible implementation, when the sliding member is located in the first position, the first area is disposed opposite to the locking part, and the second area is disposed opposite to the outer surface of the main housing; or when the sliding member is located in the second position, the fitting surface is disposed opposite to the outer surface of the main housing. In this application, a position relationship between the sliding member in the first position and the main housing and a position relationship between the sliding member in the second position and the main housing are defined, such that accurate positioning of the sliding member on the main housing can be ensured and efficiency of locking and unlocking can be improved.

In a possible implementation, the fitting surface is in a stepped shape, and an extension direction of the first area in a direction from a front end face to a rear end face of the sliding member is parallel to a central axis of the sliding member.

In a possible implementation, the fitting surface is in a bevel shape, and an included angle is formed between an extension direction of the first area in a direction from a front end face to a rear end face of the sliding member and a central axis of the sliding member.

In a possible implementation, an etched structure is disposed in the first area, or an etched structure is disposed in the second area, or an etched structure is disposed in each of the first area and the second area.

In a possible implementation, a groove is disposed on the fitting surface, the groove is used to fit a protruding part on the elastic arm, and the groove may be disposed in the first area or the second area.

Both the etched structure and the groove structure that is disposed on the fitting surface help increase locking force.

In a possible implementation, the sliding member includes a first plate member, a second plate member, a third plate member, and a fourth plate member that are sequentially connected. The first plate member is disposed opposite to the third plate member. The second plate member is disposed opposite to the fourth plate member. The fitting surface is disposed on inner surfaces of the first plate member and the third plate member. In this implementation, the first plate member and the third plate member are convex arc-shaped structures, and an anti-sliding structure is disposed on an outer surface of each of the first plate member and the third plate member. The second plate member and the fourth plate member are flat plate structures. The second plate member and the fourth plate member are disposed in parallel with each other. A distance between the second plate member and the fourth plate member is less than a maximum distance between the first plate member and the third plate member. When the sliding member is operated, external force is applied to the first plate member and the third plate member, and one side of the second plate member and one side of the fourth plate member may be used to adjoin another fiber connector plug, such that a plurality of fiber connector plugs are densely arranged to save a space.

In a possible implementation, the second plate member and the fourth plate member may be in direct contact with an outer surface of a main shaft or may be connected to an outer surface of a main shaft using a guide structure. A gap is formed between the main shaft and each of the first plate member and the third plate member. The gap may be a locking groove for accommodating the second locking structure of the fiber adapter or an accommodating space for accommodating a second elastic element and a fastening base.

In a possible implementation, a second sliding guide structure is further disposed on an inner surface of the sliding member. The second sliding guide structure is used to fit a first sliding guide structure on the main shaft. The second sliding guide structure is located on inner surfaces of the second plate member and the fourth plate member.

In a possible implementation, the second sliding guide structure includes a second guide part and a second limiting part. The second limiting part is located on one side that is of the second guide part and that is away from the front end face of the sliding member. The second guide part is used to fit a first guide part on an outer surface of the main shaft. The second limiting part is used to fit a first limiting part on the outer surface of the main shaft. One side that is of the second limiting part and that faces the front end face of the sliding member forms a second limiting step. The second limiting step is used to fit a first limiting step of the first limiting part on the main shaft, to define a boundary position for sliding of the sliding member toward a front end of the main shaft.

In a possible implementation, the second limiting part and the second guide part form a T-shaped structure. In this implementation, the second limiting part and the second guide part are guide groove structures recessed on the inner surface of the sliding member. Alternatively, in another implementation, the second limiting part and the second guide part may be guide rail structures protrudingly disposed on the inner surface of the sliding member.

In a possible implementation, a step positioning face facing the rear end face of the sliding member is disposed on the inner surface of the sliding member, and is used to position a second elastic member.

In a possible implementation, the fiber connector plug provided in this implementation further includes a dustproof cap. The dustproof cap includes a cap body and an elastic arm. The cap body is hollow and is disposed with an opening. The elastic arm is formed in a position of the opening of the cap body. The cap body is a centrosymmetric structure and is disposed with a central axis. There are two elastic arms disposed opposite to each other on two sides of the central axis. Along the axial direction, a first fitting part and a second fitting part are disposed at one end that is of the elastic arm and that is away from the cap body. The first fitting part is located between the second fitting part and the elastic arm. A vertical distance between the first fitting part and the central axis is greater than a distance between the second fitting part and the central axis. In a use state, the dustproof cap covers a periphery of the front cover, and the elastic arm extends into the locking groove formed between the fitting surface of the sliding member and the outer surface of the main housing; through a fit between the elastic arm and the fitting surface, the first fitting part abuts against the first area, and the second fitting part abuts against the second area; and the dustproof cap is fastened to the fiber connector plug using clamping force applied by the fitting surface to the first fitting part and the second fitting part. When the dustproof cap needs to be removed, the sliding member is moved toward a tail end of the main shaft, such that the first area leaves the first fitting part and the second area leaves the second fitting part. When the first area directly faces the second fitting part in the radial direction, unlocking between the fiber connector plug and the dustproof cap can be implemented.

In a possible implementation, the locking part includes an elastic arm and a clamping block, and one end of the elastic arm is fastened to the main housing. The elastic arm and the main housing may be an integrated connection structure, or may be a split structure that is integrally assembled. The clamping block is fastened to the other end of the elastic arm and protrudes from a surface that is of the elastic arm and that is away from the main housing. A gap is disposed between the elastic arm and the main housing. The sliding member includes a sliding body slidably connected to the main housing and a stop structure connected to one end of the sliding body. The elastic arm is used to fit a clamping groove on the fiber adapter. The stop structure stop structure can move into the gap and abut against the elastic arm, to lock the elastic arm in the clamping groove.

In a possible implementation, a clamping structure is further disposed on the outer surface of the main housing, and the clamping structure is used to fit the sliding member, to limit the sliding member to the first position. For example, the clamping structure is a limiting block protrudingly disposed on the outer surface of the main housing. There are two clamping structures, and the clamping structures are spaced apart, that is, a limiting groove is formed between the two clamping structures.

In a possible implementation, the sliding member includes a sliding positioning structure. The sliding positioning structure includes a connection part connected to the sliding body and a bump structure protrudingly disposed on the connection part. The connection part is formed by disposing a pair of strip-shaped slits on the sliding body. Disposing of the slits enables the connection part to easily make radial elastic deformation under an action of external force. The bump structure is used to fit the clamping structure on the main shaft. For example, when the bump structure is clamped in the limiting groove, the sliding member can be limited to the first position.

In a possible implementation, there are two sliding positioning structures, and the two sliding positioning structures are symmetrically distributed on two sides of the central axis of the sliding member. In this application, the sliding member can be securely connected to the main shaft using the sliding positioning structures that are symmetrically arranged.

In this implementation, another solution to the first locking structure is provided. The elastic arm and the clamping block that are disposed on the locking part fit the clamping groove of the second locking structure, and the stop structure of the sliding member abuts against the elastic arm, such that a locked state between the first locking structure and the second locking structure is implemented. Likewise, in this implementation, moving the sliding member causes the stop structure to leave the elastic arm, such that unlocking is implemented.

In a possible implementation, the clamping block is located on one side that is of the elastic arm and that is away from a front end of the main housing. The clamping block is located at one end that is of the elastic arm and that faces the sliding member. When the fiber connector plug is inserted into the fiber adapter, the elastic arm is first inserted into the adapter, and then the clamping block enters the fiber adapter. In the locked state, corresponding to a blocking part, the clamping block is connected to one end of the sliding body and the end of the sliding body may be considered as a root of the blocking part, and abutting force in this position is greater than that at one end that is of the blocking part and that is away from the sliding body (this end may be considered as a tail part of the blocking part). Therefore, in this application, the structure that is of the clamping block and the elastic arm and that fits the position of the sliding member helps increase locking force.

In a possible implementation, the locking part includes a locking arm. An accommodating space is disposed between the locking arm and the outer surface of the main housing. Two opposite ends of the accommodating space are open along the axial direction of the main housing. The locking arm is disposed with a clamping groove or a hole. The accommodating space is used to accommodate the second locking structure. The clamping groove or the hole is used to fit the second locking structure. The sliding member includes a sliding body slidably connected to the main housing and a stop structure connected to one end of the sliding body. The stop structure can move to the accommodating space and abut against the second locking structure.

For example, an opening at one end of the accommodating space is used to allow the second locking structure on the fiber adapter to extend into the accommodating space, and an opening at the other end of the accommodating space is used to allow the stop structure of the sliding member to move into the accommodating space. The second locking structure may be a connection section structure (that is, an elastic arm structure disposed with a buckle) connected to a buckle part. The stop structure of the sliding member abuts against the connection part, and locks the buckle part in the clamping groove or the hole to implement the locked state. During unlocking, only the sliding member needs to be moved, such that the stop structure leaves the accommodating space, and under an action of elastic force of the connection part, the buckle part can be detached from the clamping groove or the hole.

In a possible implementation, the locking part is in a sleeve-shaped structure, and an inner surface of the locking part is disposed with a positioning groove, a locking groove, and a hole. The positioning groove is used to fit a connection part of the outer surface of the main shaft to fasten the locking part to the main shaft. There are two positioning grooves symmetrically distributed on two sides of the central axis of the locking part. The hole is located at a bottom of the locking groove, and the hole is in a through-hole structure, such that the inner surface of the locking part communicates with the outer surface of the locking part. An extension direction of the locking groove is an axial direction of the locking part, and an opening of the locking groove is formed at one end face of the locking part.

In a possible implementation, there are two holes and two locking grooves, and the two holes and the two locking grooves are symmetrically distributed on other two sides of the central axis of the locking part.

During assembly, the locking part is sleeved over the main shaft, and the connection part is clamped into the positioning groove, to implement a connection between the locking part and the main shaft. In this state, a bottom wall of the locking groove and the main shaft form an accommodating space, and the locking part in a bottom wall position of the locking groove forms a locking arm. It may be understood that the hole is disposed on the locking arm. The hole may be of a structure of a clamping groove or a hole. The accommodating space is formed between the locking arm and the outer surface of the main shaft. The accommodating space is used to accommodate the second locking structure of the fiber adapter, and the hole is used to fit the second locking structure.

In a possible implementation, the sliding member is elastically connected to the main housing, and the sliding member is kept in the first position by elastic force.

In a possible implementation, a limiting structure is disposed between the sliding member and the main housing, and the limiting structure is used to limit the sliding member to the first position, or the limiting structure may be used to limit the sliding member to the second position.

In a possible implementation, the main housing includes a sleeve-shaped main shaft. The main shaft is in an integrated structure. The main shaft includes a front end and a tail end that are opposite to each other. The front end of the main shaft is connected to the front cover. The fiber is accommodated in the main shaft. The tail end is fastened to the fiber. A through hole is disposed at the tail end. The through hole penetrates an outer surface and an inner surface of the main shaft. The through hole is used to fill glue into a gap between the fiber and the inner surface of the main shaft, to fasten the fiber to the main shaft.

For example, the fiber includes a fiber core, a reinforced layer wrapped around the fiber core, and an outer layer wrapped around the reinforced layer. A part of the fiber core extends out of the reinforced layer and is fastened to the ferrule, and a part of the reinforced layer is not wrapped by the outer layer. The glue is used to fasten the reinforced layer to the main shaft.

In this application, a through hole for glue filling is disposed at the tail end of the main shaft, and the fiber is fastened through glue pouring. The glue fills a gap between the reinforced layer and the main shaft, a surface structure form of the reinforced layer is further utilized, and a surface of the reinforced layer has a space for glue pouring. Therefore, the glue can be fully in contact with the fiber and the main shaft, and a fastening effect is improved. In addition, a miniaturization design is facilitated by removing some materials from the main shaft (without adding any clamping structure) and fastening the fiber inside the main shaft without occupying any space outside the main shaft. In addition, filling the glue in the gap between the main shaft and the fiber can further sealingly connect the fiber to the main shaft. In this way, disposing of the through hole does not cause a poor sealing effect.

According to a second aspect, this application provides a fiber adapter, including a body sleeve and a ferrule sleeve. The ferrule sleeve is connected inside the body sleeve. A first accommodating space communicating with an internal space of the ferrule sleeve is disposed inside the body sleeve. The first accommodating space is used to accommodate the fiber connector plug according to any implementation of the first aspect. The ferrule sleeve is used to accommodate the ferrule of the fiber connector plug. An inner surface of the body sleeve is used to be in contact with the outer surface of the front cover of the fiber connector plug. A first slot is formed between the body sleeve and the ferrule sleeve, and the first slot is used to accommodate a part of the front cover. According to the fiber adapter provided in this application, the first slot between the body sleeve and the ferrule sleeve fits the front cover of the fiber connector plug, and the inner surface of the body sleeve is in contact with and fits the outer surface of the front cover to implement matching between the fiber adapter and the fiber connector plug. For the fiber adapter, a structure of the fiber adapter is simplified, alignment of the fiber connector plug inserted into the fiber adapter is implemented using the first slot and the inner surface of the body sleeve, and a radial size may be designed to match the front cover of the fiber connector plug. Therefore, the fiber connector plug has an advantage of a small size.

In a possible implementation, a guide key is disposed on an inner wall of the body sleeve, an extension direction of the guide key is the same as an extension direction of a central axis of the ferrule sleeve, and the guide key is used to fit the first guide structure on the front cover of the fiber connector plug. Disposing of the guide key in the axial extension direction enables the body sleeve to match the fiber connector plug in direct insertion and direct removal and helps save an operation space. Therefore, more fiber connection ports can be arranged in a limited space.

In a possible implementation, the body sleeve includes a first end, a second end, and a body part connected between the first end and the second end. The ferrule sleeve is connected inside the body part. A second locking structure is disposed at the first end. The second locking structure is used to fit the first locking structure of the fiber connector plug. An inner surface of the body part is sealingly connected to the sealing structure of the fiber connector plug.

In a possible implementation, the second locking structure includes a clamping groove and an elastic arm. The clamping groove is formed on the inner surface of the body sleeve. The body sleeve includes a body part. The elastic arm is located at one end of the body part and extends along an axial direction of the body sleeve. The elastic arm includes a first section and a second section. The first section is connected between the second section and the body part. An outer surface of the elastic arm is a surface that is of the elastic arm and that is away from the first accommodating space. A vertical distance from an outer surface of the first section to a central axis of the body sleeve is greater than a vertical distance from an outer surface of the second section to the central axis of the body sleeve. In this application, the elastic arm is designed to be similar to a two-step structure or a structure obliquely extending relative to the axial direction. A fit between the elastic arm and the fitting surface of the fiber connector plug not only helps increase a contact area between the fitting surface and the elastic arm, but also implements a function of radially pressing the elastic arm. Clamping force and locking force on the elastic arm can ensure that the elastic arm is firmly locked in the locking groove and is not easy to be pulled out.

In a locked state, a mutual pressing area between the fitting surface and the elastic arm may be an area (including the first section and the second section) in which the entire elastic arm is located. However, in an unlocking process, only the first area of the fitting surface of the fiber connector plug needs to be moved to a position in which the second area in the locked state is located, and the second area is synchronously moved out of the elastic arm. To be more specific, the first section is detached from the first area, the second section is detached from the second area, and the first area directly faces the second section, but a gap is disposed between the first area and the second section, such that the elastic arm is not pressed, that is, unlocking is implemented. It can be learned that, during moving in the unlocking process, the sliding member needs to travel only to a position in which the first area is moved to be radially opposite to the second section, and does not need to satisfy that the fitting surface and the elastic arm are completely staggered in a radial direction. Partial overlapping between the fitting surface and the elastic arm in the radial direction may be maintained, such that unlocking can be implemented. Therefore, this implementation has advantages of stable locking and easy unlocking.

In a possible implementation, in the radial direction of the body sleeve, the first section directly faces a part of the clamping groove, and the second section is located in a periphery of the clamping groove.

In a possible implementation, the outer surface of the elastic arm is in a stepped shape; or an included angle is formed between an extension direction of the elastic arm and the axial direction of the body sleeve, and the extension direction of the elastic arm is an extension direction from the body part to one end that is of the second section and that is away from the body part.

In a possible implementation, an etched structure is disposed on the outer surface of the first section and/or the outer surface of the second section; or a protruding part is disposed on the outer surface of the elastic arm, and the protruding part is used to fit the groove on the sliding member of the fiber connector plug. Both the etched structure and the protruding part structure that is disposed on the elastic arm help increase locking force.

In a possible implementation, the second locking structure is a clamping groove formed on the inner surface of the body sleeve. The clamping groove includes a limiting groove recessed on an inner surface of the body part and a groove or hole located at a bottom of the groove. The limiting groove is used to fit the elastic arm of the locking part on the fiber connector plug. The groove or hole is used to fit the clamping block of the locking part on the fiber connector plug.

In a possible implementation, the body sleeve includes a body part. The second locking structure is located at one end of the body part and includes a buckle part and a connection section. The connection section is connected between the buckle part and the body part. The buckle part is protrudingly disposed on a surface that is of the connection section and that is away from a central axis of the body sleeve. The connection section is used to extend into an accommodating space between the locking arm and the main housing on the fiber connector plug. The buckle part is used to fit the clamping groove or the hole of the locking arm on the fiber connector plug.

According to a third aspect, this application provides a connector assembly, including the fiber connector plug according to any implementation of the first aspect and the fiber adapter according to any implementation of the second aspect.

According to a fourth aspect, this application provides a communications device, including a housing, and the fiber adapter according to any possible implementation of the second aspect, where the fiber adapter is connected to the housing, the housing is disposed with a socket, the fiber adapter is disposed inside the housing, and the socket directly faces the first accommodating space of the fiber adapter.

In a possible implementation, there are a plurality of sockets arranged in one row, and there are also a plurality of fiber adapters correspondingly disposed in positions of the sockets.

In a possible implementation, there are a plurality of sockets arranged in at least two rows on the housing, and there are also a plurality of fiber adapters correspondingly disposed in positions of the sockets.

In a possible implementation, the communications device further includes the fiber connector plug according to any possible implementation of the first aspect, where the fiber connector plug is used to fit the fiber adapter.

The communications device provided in this application includes a plurality of sockets arranged in a row or arranged in a plurality of rows. The fiber adapters are correspondingly disposed in positions of the sockets, such that more fiber connection ports can be arranged in a limited space and density of fiber adapters disposed in the communications device is improved.

DESCRIPTION OF EMBODIMENTS

For ease of understanding, the following explains and describes related technical terms used in the embodiments of this application.

Axial direction: The axial direction may be understood as an axial direction of a fiber connector plug, and is equivalent to an extension direction of a fiber and a ferrule, that is, a direction in which a tail end of the fiber extends to a front end of the fiber and then continues to extend to a front end of the ferrule, and is equivalent to an axial direction of a housing assembly that is sleeved over a periphery of the fiber and that is in the fiber connector plug.

Radial direction: The radial direction is a direction perpendicular to the axial direction.

Sleeve-shaped: The sleeve-shaped means sleeving over an outer surface of a long strip-shaped object for a purpose of protection, reinforcing and fastening, or connection. A sleeve-shaped element includes a cylindrical (or tubular) housing, there is a hollow space inside the housing, and openings are disposed at both end faces of the cylindrical (or tubular) housing. The long strip-shaped object may penetrate the sleeve-shaped element via the two openings. For example, the fiber extends into the housing assembly from an opening at one end of the housing assembly and can extend out of the housing assembly from an opening at the other end of the housing assembly. The end face of the sleeve-shaped element includes an inner edge and an outer edge. An inner surface of the sleeve-shaped element is connected between inner edges of the two end faces and faces the hollow space inside the sleeve-shaped element. An outer surface of the sleeve-shaped element is connected between outer edges of the two end faces and faces an external space of the sleeve-shaped element. An axial direction of the sleeve-shaped element is a direction extending from one end face to the other end face. A radial direction of the sleeve-shaped element is a direction extending perpendicularly from the inner surface to the outer surface, and may be understood as being perpendicular to the axial direction of the sleeve-shaped element. An outer contour of a cross section of the sleeve-shaped element may be in a shape of a circle, a polygon, or a triangle, or in another regular or irregular shape. This is not limited in this application.

The following describes the embodiments of this application with reference to the accompanying drawings in the embodiments of this application.

Figure 1:
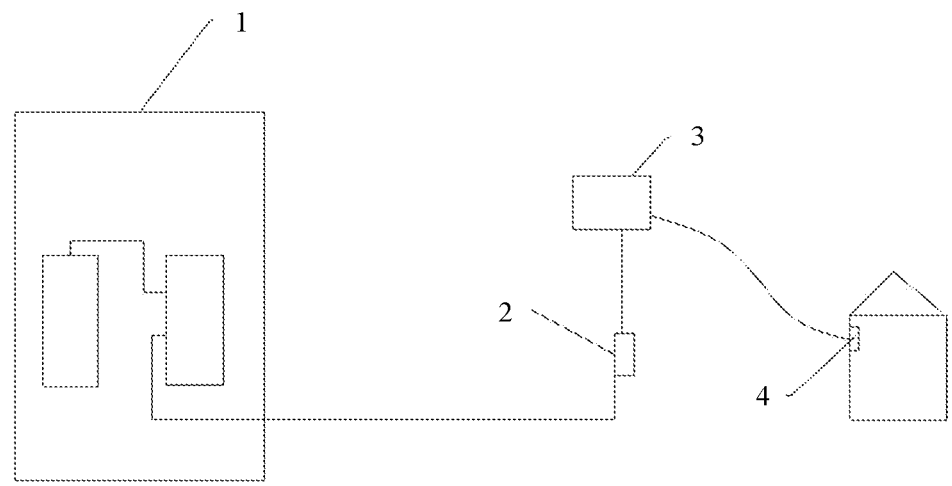
FIG. 1 is a schematic diagram of an application scenario of a fiber connector plug, and for example, a schematic diagram of a fiber-to-the-home (FTTH) network according to this application.

A fiber connector plug, a fiber adapter, a connector assembly, and a communications device that are provided in this application are applied to a fiber to the x (FFTx) system. The FFTx system may be but is not limited to an fiber to the home (FFTH), fiber to the curb (FTTC), fiber to the premises (FTTP), fiber to the neighborhood or fiber to the node (FTTN), fiber to the office (FTTO), or fiber to the service area (FTTSA) system. The embodiments of this application are described using an example in which the communications device is applied to a fiber to the FTTH system. FIG. 1 is a schematic diagram of an FTTH network. Referring to FIG. 1, a connectorised fiber distribution point (CFDP) 2 and a fiber distribution box 3 are disposed between a central office (CO) 1 and a customer terminal box (e.g., a customer splicing point (CSP)) 4. A communications device in the central office 1 is connected to the connectorised fiber distribution point 2 through an optical cable, to distribute a signal to the connectorised fiber distribution point 2. The connectorised fiber distribution point 2 transmits the signal to the fiber distribution box 3 through an optical cable, and then the fiber distribution box 3 outputs the signal (transmits the signal through an optical cable) to the customer terminal box 4.

The communications device provided in this application may be but is not limited to a fiber access terminal (FAT) or a splitting and splicing closure (SSC).

Figure 2:
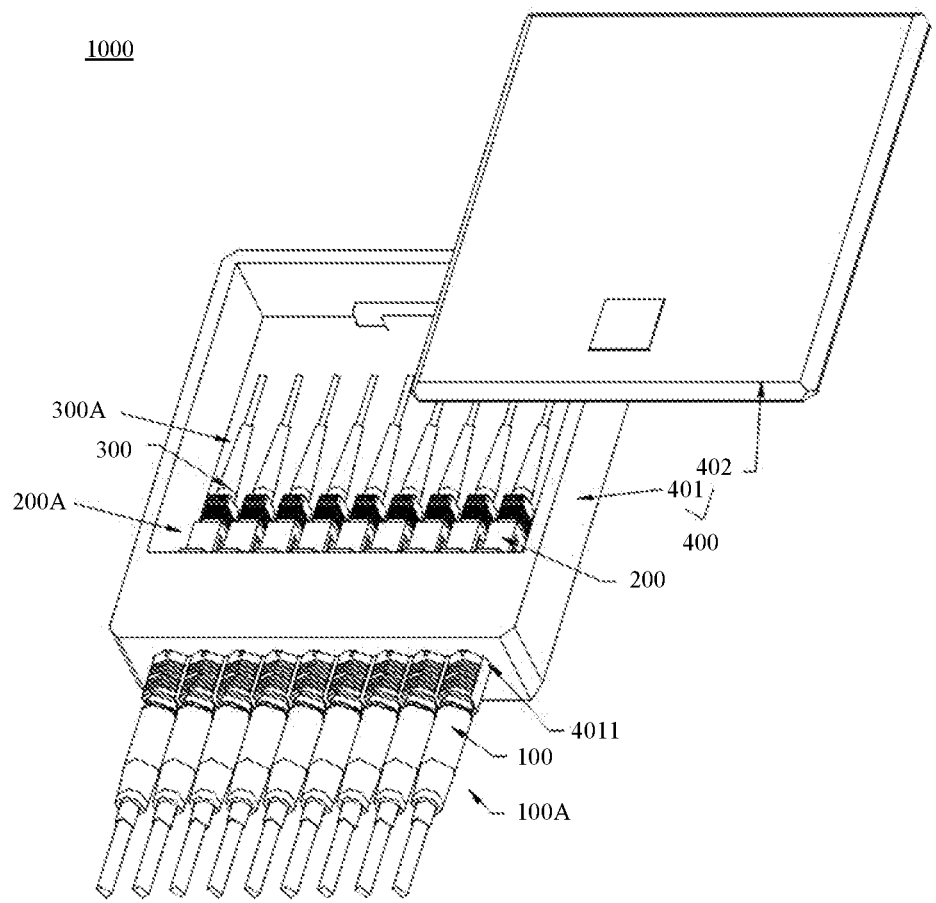
FIG. 2 is a schematic diagram of an implementation of a communications device in which a fiber connector plug is located according to this application.

FIG. 2 is a schematic diagram of a communications device 1000 according to an implementation. The communications device 1000 includes a housing 400, an adapter assembly 200A, an indoor connector assembly 300A, and an outdoor connector assembly 100A. The adapter assembly 200A is fastened to the housing 400. The indoor connector assembly 300A is accommodated inside the housing 400. The outdoor connector assembly 100A is located outside the housing 400. The outdoor connector assembly 100A and the indoor connector assembly 300A can be connected to the adapter assembly 200A to implement connection and further implement optical signal transmission.

It should be understood that a difference between the indoor connector assembly 300A and the outdoor connector assembly 100A lies in different application scenarios. The indoor connector assembly 300A may be understood as being located in a relatively closed space inside the housing 400, and can be effectively isolated from external dust, water vapor, and the like. The outdoor connector assembly 100A may be understood as being located in a relatively open space outside the housing 400, and needs to have better environment adaptability to adapt to a complex and changing external environment.

For example, the housing 400 includes a box body 401 and a top cover 402 that covers the box body 401. The box body 401 is disposed with a plurality of sockets 4011 that are disposed side by side. The sockets 4011 may be arranged in one row or a plurality of rows. The adapter assembly 200A includes a plurality of fiber adapters 200. A quantity of fiber adapters 200 is equal to or less than a quantity of sockets 4011 (a case in which the quantity of fiber adapters 200 is less than the quantity of sockets 4011 means that a part of the sockets can be reserved for other purposes). In another implementation, the sockets 4011 may alternatively be disposed on the top cover 402. Each fiber adapter 200 can be correspondingly disposed in a position of a corresponding socket 4011.

The indoor connector assembly 300A includes a plurality of indoor fiber connector plugs 300, and the plurality of indoor fiber connector plugs 300 are all accommodated in the housing 400. In addition, a quantity of indoor fiber connector plugs 300 is the same as the quantity of fiber adapters 200, or may be less than the quantity of fiber adapters 200, such that each indoor fiber connector plug 300 can be inserted into a corresponding fiber adapter 200.

The outdoor connector assembly 100A includes a plurality of outdoor fiber connector plugs 100. A quantity of outdoor fiber connector plugs 100 may be the same as the quantity of fiber adapters 200, or may be less than the quantity of fiber adapters 200. Each outdoor fiber connector plug 100 may be inserted into a corresponding fiber adapter 200 from the outside of the housing 400.

It may be understood that an opening adapted to the indoor fiber connector plug 300 and an opening adapted to the outdoor fiber connector plug 100 are disposed at two ends of the fiber adapter 200. The indoor fiber connector plug 300 and the outdoor fiber connector plug 100 are inserted into the two openings of the fiber adapter 200. In this way, ferrules of the indoor fiber connector plug 300 and the outdoor fiber connector plug 100 are connected in the fiber adapter 200, that is, connection between two fibers that need to be connected is implemented, and an optical signal output by a transmit fiber can be coupled to a receive fiber to a maximum extent.

Therefore, each indoor fiber connector plug 300 can be inserted into the corresponding fiber adapter 200 from the inside of the housing 400, and each outdoor fiber connector plug 100 can be inserted into the corresponding fiber adapter 200 from the outside of the housing 400, such that each indoor fiber connector plug 300 can be connected to a corresponding outdoor fiber connector plug 100. To be more specific, one indoor fiber connector plug 300, one fiber adapter 200, and one outdoor fiber connector plug 100 can together constitute a connector assembly, to implement link transmission of an optical signal.

The communications device 1000 provided in this application includes a plurality of sockets 4011 arranged in a row or arranged in a plurality of rows. The fiber adapters 200 are correspondingly disposed in positions of the sockets 4011, such that more fiber connection ports can be arranged in a limited space and density of fiber adapters disposed in the communications device is improved.

The fiber connector plug provided in this application may be an outdoor fiber connector plug 100 in the communications device 1000 in the implementation shown in FIG. 2, or may be an indoor fiber connector plug 300 in the communications device 1000 in the implementation shown in FIG. 2. The following describes in detail embodiments of fiber connector plugs with three different structures and fiber adapters fitting the fiber connector plugs, where the fiber connector plugs are outdoor fiber connector plugs.

The following describes in detail a fiber connector plug provided in a first embodiment.

Figure 3:
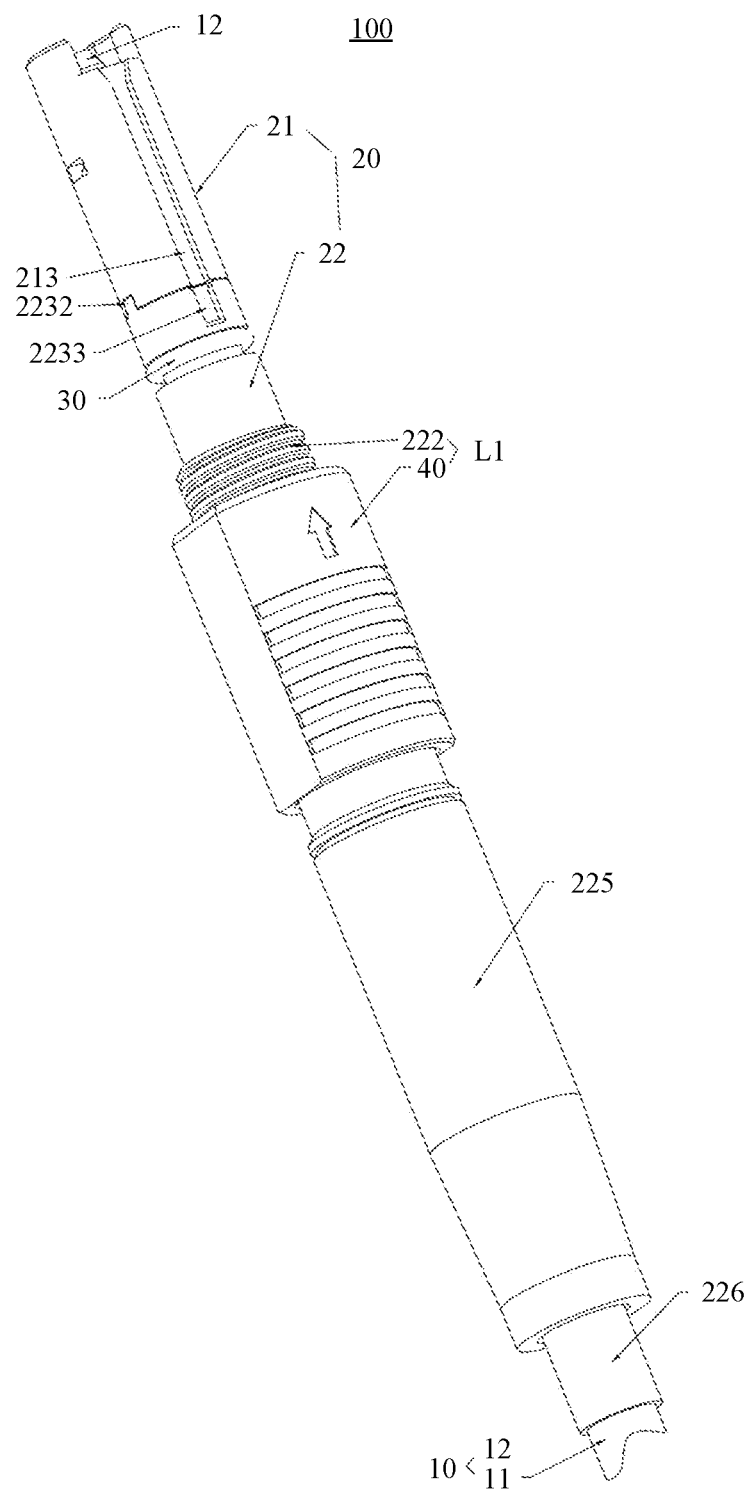
FIG. 3 is a schematic three-dimensional assembly diagram of a fiber connector plug according to a first embodiment of this application.
Figure 4:
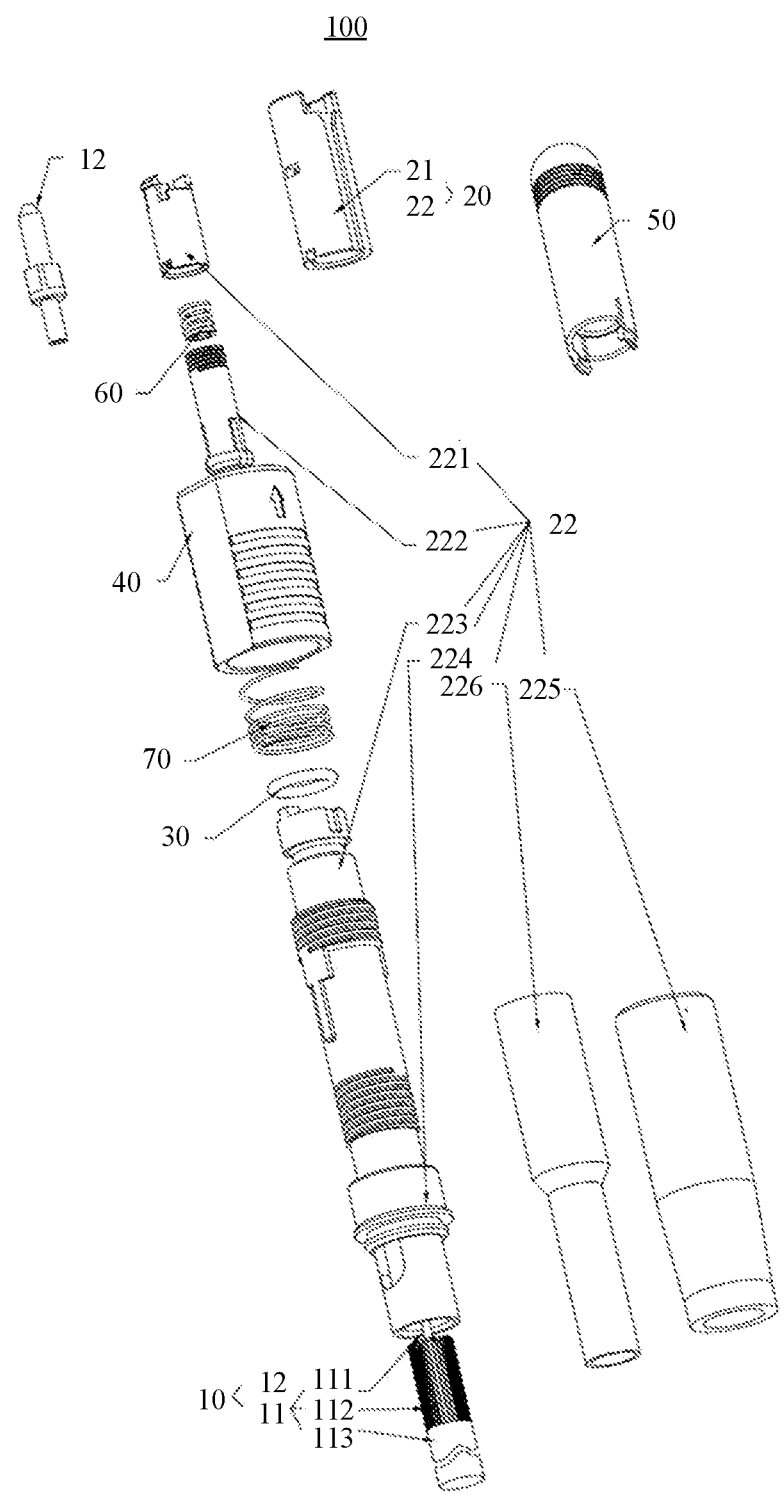
FIG. 4 is a schematic three-dimensional exploded diagram of a fiber connector plug according to a first embodiment of this application.
Figure 5:
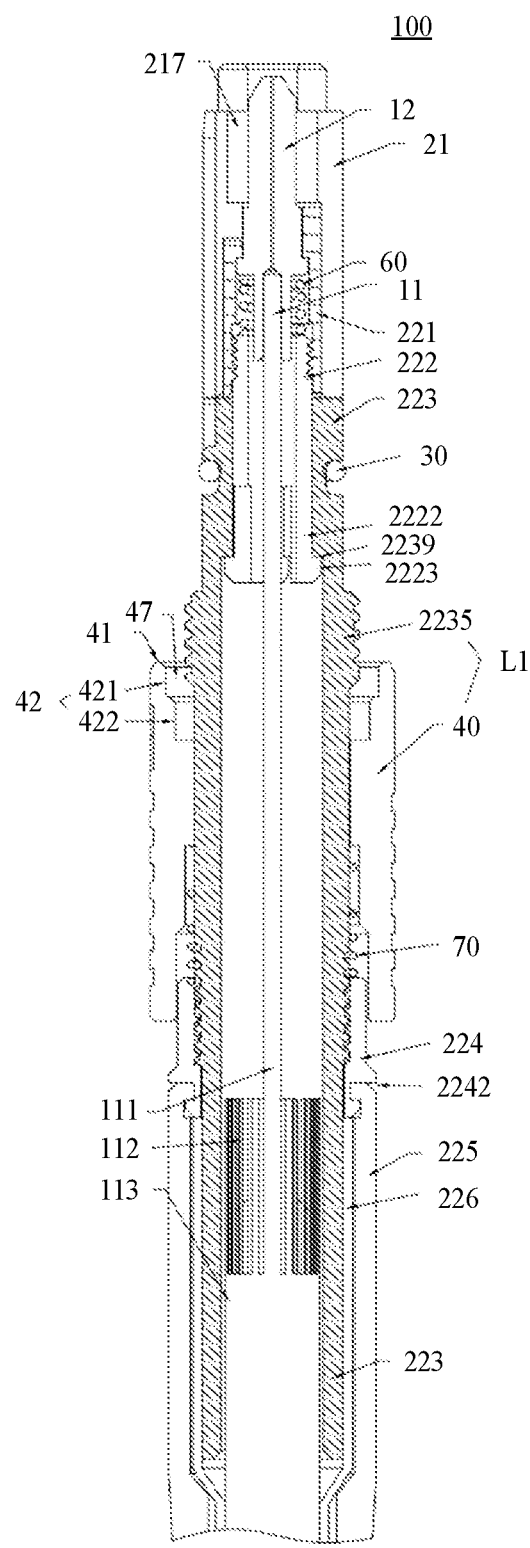
FIG. 5 is a cross-sectional diagram of a fiber connector plug in one direction according to a first embodiment of this application.
Figure 6:
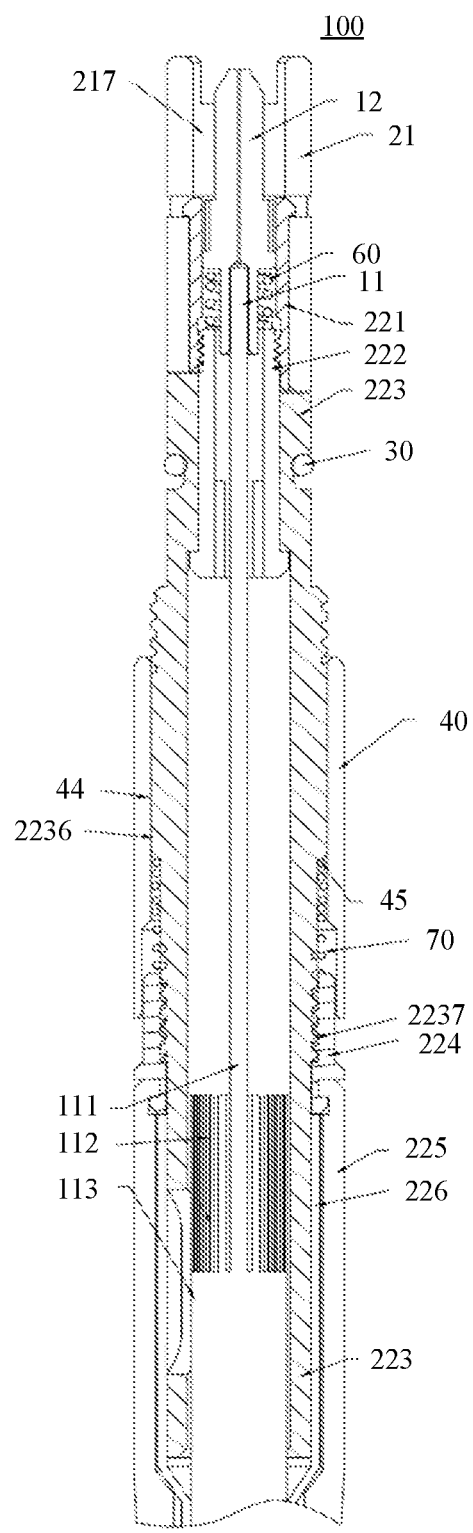
FIG. 6 is a cross-sectional diagram of a fiber connector plug in another direction according to a first embodiment of this application.

FIG. 3 is a schematic three-dimensional assembly diagram of a fiber connector plug according to a possible implementation. FIG. 4 is a schematic three-dimensional exploded diagram of the fiber connector plug shown in FIG. 3, where a dustproof cap is added in FIG. 4. FIG. 5 and FIG. 6 are cross-sectional diagrams of the fiber connector plug in different directions. The fiber connector plug 100 provided in this application includes a transmission member 10, a housing assembly 20, a sealing structure 30, a sliding member 40, a dustproof cap 50, a first elastic member 60, and a second elastic member 70. The housing assembly 20 is sleeved over a periphery of the transmission member 10, and is used to protect the transmission member 10 and used to insert/remove the fiber connector plug 100. The dustproof cap 50 may be a part of the housing assembly 20. Alternatively, the fiber connector plug 100 may not include the dustproof cap 50. The sliding member 40 is slidably connected to an outer surface of the housing assembly 20, and is used to lock and unlock the fiber connector plug 100 and a fiber adapter 200. The sealing structure 30 is disposed on the outer surface of the housing assembly 20, and is located at a front end of the sliding member 40 in an axial direction. The sealing structure 30 is used to sealingly connect to an inner surface of the fiber adapter 200. For the fiber connector plug 100, the front end is an end inserted into the fiber adapter (the end may be understood as an end at which a ferrule is located), and a tail end or a rear end is an end away from the ferrule.

Referring to FIG. 4, FIG. 5, and FIG. 6, the transmission member 10 includes a fiber 11 and a ferrule 12, and the ferrule 12 is connected to a front end of the fiber 11. The housing assembly 20 includes a front cover 21 and a main housing 22. The front cover 21 is in a sleeve-shaped structure and encircles the ferrule 12, that is, the front cover 21 is sleeved over a periphery of the ferrule 12. Certainly, an internal space of the front cover 21 may also accommodate a part of the fiber 11. The front cover 21 is used to protect the ferrule 12 and is used to fit the fiber adapter 200. The main housing 22 includes a mounting member 221, a fastener 222, a main shaft 223, a fastening base 224, a tail sleeve 225, and a heat shrink tube 226. The main housing 22 is sleeve-shaped as a whole, and is used to accommodate the fiber 11. All components in the main housing 22 are also sleeve-shaped. In this implementation, six elements are assembled and connected to form the main housing 22. The elements are all connected in a fastened manner. Therefore, some of the elements may be an integrated structure. For example, the fastener 222 may be integrally formed at a front end face of the main shaft 223; therefore, the fastener 222 may be considered as a part of the main shaft 223.

Referring to FIG. 4, FIG. 5, and FIG. 6, the fiber 11 includes a fiber core 111, a reinforced layer 112 wrapped around the fiber core 111, and an outer layer 113 wrapped around the reinforced layer 112. A part of the fiber core 111 extends out of the reinforced layer 112 and is fastened to the ferrule 12. A part of the reinforced layer 112 of the fiber is not wrapped by the outer layer. A part of the outer layer is also located inside the housing assembly 20. The reinforced layer 112 may be made of a metal or non-metal material. The metal material of the reinforced layer 112 may be a steel wire. The non-metal material of the reinforced layer 112 may be fiber reinforced composite material such as fiber-reinforced plastic (FRP). The reinforced layer 112 is mainly used to enhance tensile strength and balance of the fiber. An outer surface of the reinforced layer 112 is not as smooth as an outer surface of the outer layer. The outer surface of the reinforced layer 112 may have a concave-convex structure, similar to a tooth-shaped structure. A purpose of exposing the reinforced layer 112 (that is, being not wrapped by the outer layer) is to fasten the reinforced layer 112 to the housing assembly 20. The fiber core 111 of the fiber 11 is fastened to the ferrule 12 using curing glue. The following describes a structure of the ferrule 12 in detail.

Figure 7:
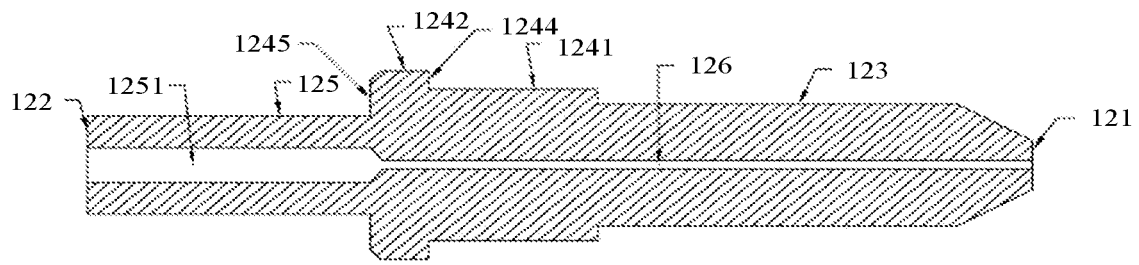
FIG. 7 is a schematic three-dimensional diagram of a ferrule of a fiber connector plug according to a first embodiment of this application.
Figure 8:
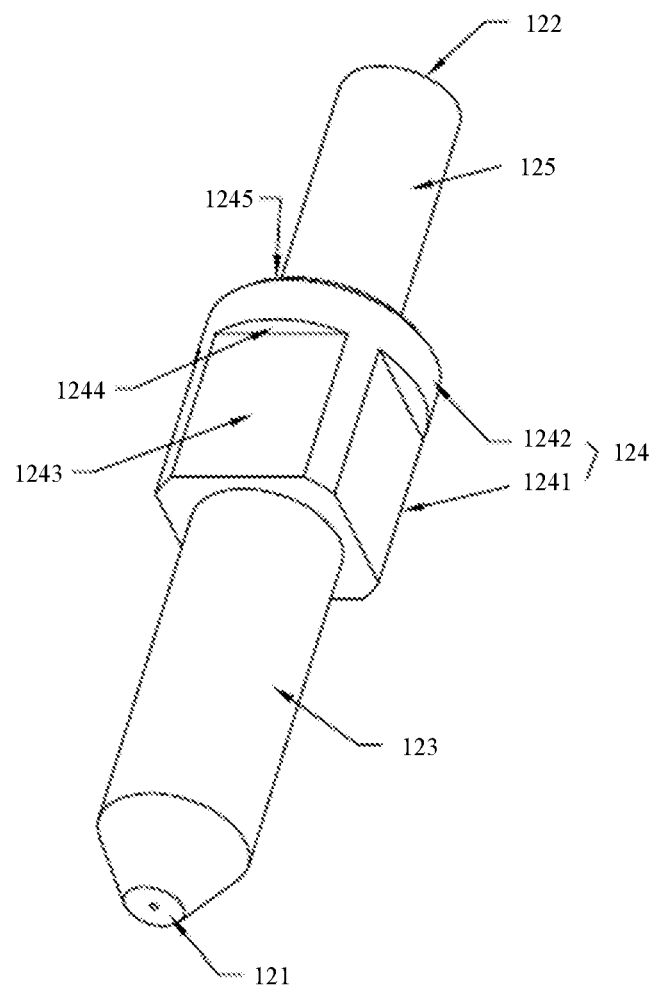
FIG. 8 is a cross-sectional diagram of a ferrule of a fiber connector plug according to a first embodiment of this application.

Referring to FIG. 7 and FIG. 8, the ferrule 12 includes a front end face 121 and a rear end face 122. A front section 123, a middle section 124, and a rear section 125 are sequentially connected between the front end face 121 and the rear end face 122, and both the front section 123 and the rear section 125 have a centrosymmetric structure. For example, a shape of the rear section 125 is a cylinder, and a shape of the front section 123 is a combination of a cylinder and a truncated cone. The middle section 124 includes a first limiting structure 1241 and a first stop structure 1242. Along the axial direction, the first limiting structure 1241 is located between the first stop structure 1242 and the front section 123. The first limiting structure 1241 is used to fit the housing assembly 20, to limit the ferrule 12 in a circumferential direction, that is, prevent the ferrule 12 from rotating relative to the housing assembly 20. The first limiting structure 1241 includes a first plane 1243. There may be one, two, or more first planes 1243. The first plane 1243 may have a limiting function in the circumferential direction, provided that disposing of the first plane 1243 enables the middle section 124 to be a non-rotary symmetric structure. As shown in FIG. 7, there are four first planes 1243 spaced apart and symmetrically distributed on an outer surface of the middle section 124. The first stop structure 1242 is a columnar structure connected to the first limiting structure 1241. The first stop structure 1242 includes a first limiting face 1244, and the first limiting face 1244 faces the front end face 121 of the ferrule 12. In this implementation, a quantity of disposed first limiting faces 1244 also corresponds to a quantity of disposed first planes 1243, and the first limiting faces 1244 are vertically connected to the first planes 1243. In a process of manufacturing the ferrule 12, a piece is cut off from an outer surface of a cylindrical entity, and the first plane 1243 and the first limiting face 1244 are simultaneously formed. An outer surface of the rear section 125 is used to sleeve the first elastic member 60 (for example, a spring). A surface that is of the first stop structure 1242 and that faces the rear section 125 is a positioning face 1245, and the positioning face 1245 is used to abut against the first elastic member 60. A fiber core fastening hole 1251 is disposed in the rear section 125. On the rear end face 122, the fiber core fastening hole 1251 forms an opening for inserting the fiber core 111. A light-through hole 126 is formed between a bottom of the fiber core fastening hole 1251 and the front end face 121 of the ferrule 12. In the fiber core fastening hole 1251, the bottom is a position directly facing the opening.

When the fiber connector plug 100 is connected to another fiber connector plug in the fiber adapter 200, the connection is implemented using the front end face 121 of the ferrule 12. In this way, optical signal transmission is implemented between the two fiber connector plugs 100. Therefore, for the fiber connector plug 100, the front end face 121 of the ferrule 12 needs to be protected by the housing assembly 20, to ensure that the front end face 121 of the ferrule 12 is not scratched and ensure quality of light transmission.

In this application, the front cover 21 on the housing assembly 20 can protect the front end face of the ferrule 12. The front cover 21 is described in detail (described with reference to FIG. 9 to FIG. 16) in the following.

Figure 9:
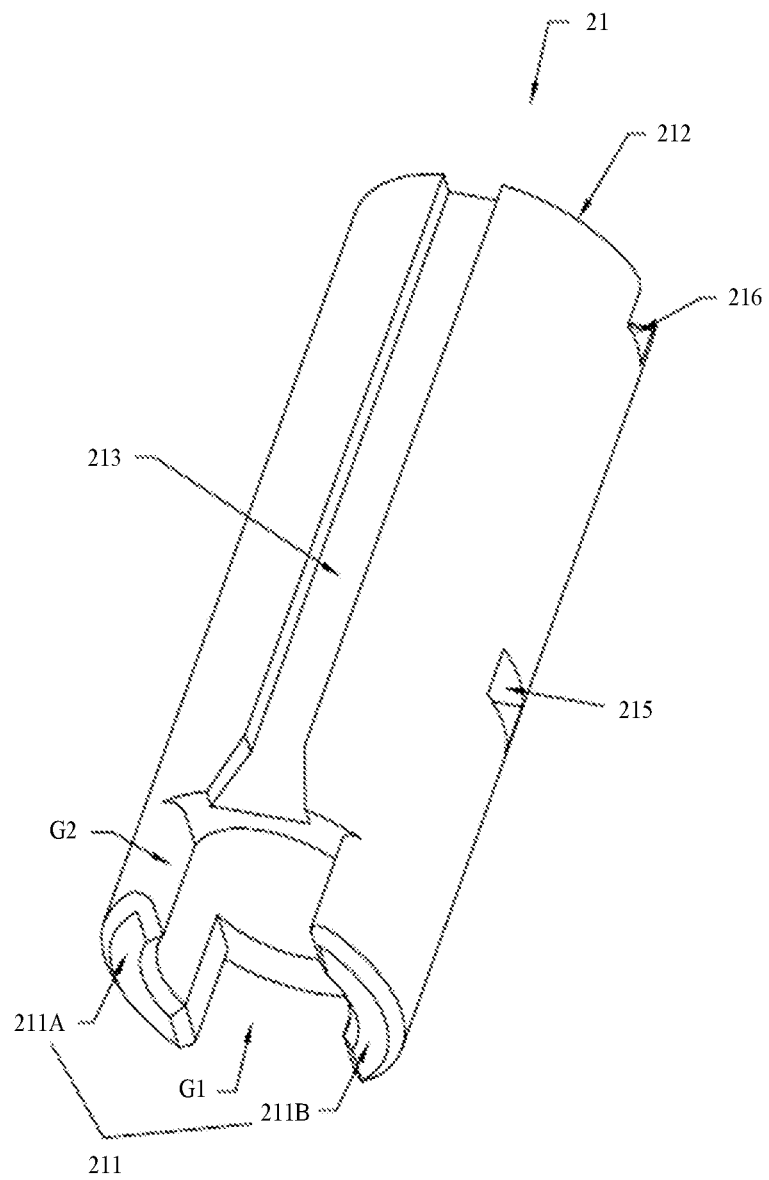
FIG. 9 is a schematic three-dimensional diagram of a front cover of a fiber connector plug according to a first embodiment of this application.
Figure 10:
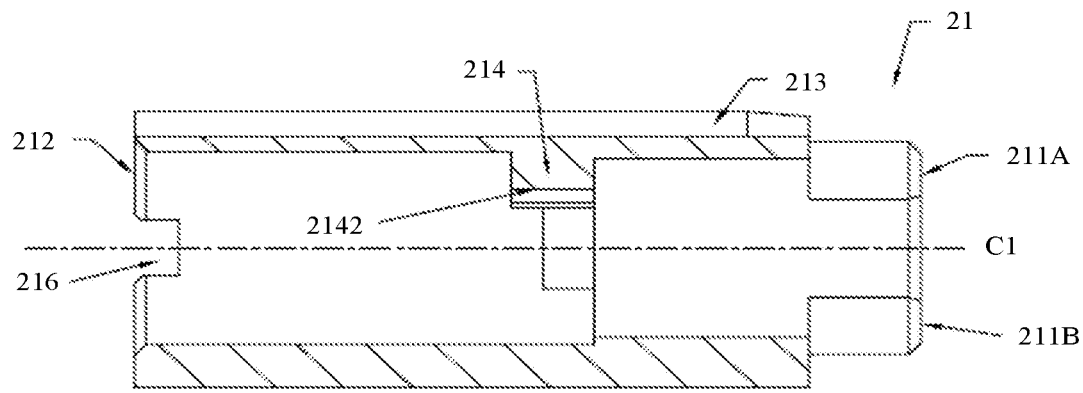
FIG. 10 is a cross-sectional diagram of a front cover of a fiber connector plug in one direction according to a first embodiment of this application.

Referring to FIG. 9 and FIG. 10, the front cover 21 is sleeve-shaped and includes a front end face 211 and a rear end face 212. With reference to FIG. 4 to FIG. 6, in the fiber connector plug 100, the front cover 21 is located at a most front end of the housing assembly 20, and the rear end face 212 of the front cover 21 is used to connect to the main housing 22.

Figure 11:
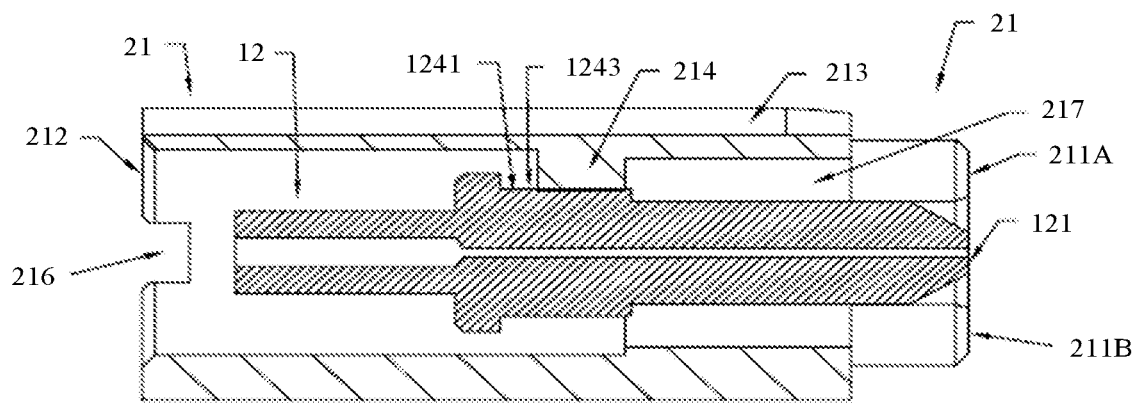
FIG. 11 is a schematic cross-sectional diagram of a first position relationship between a front cover and a ferrule of a fiber connector plug according to a first embodiment of this application.
Figure 12:
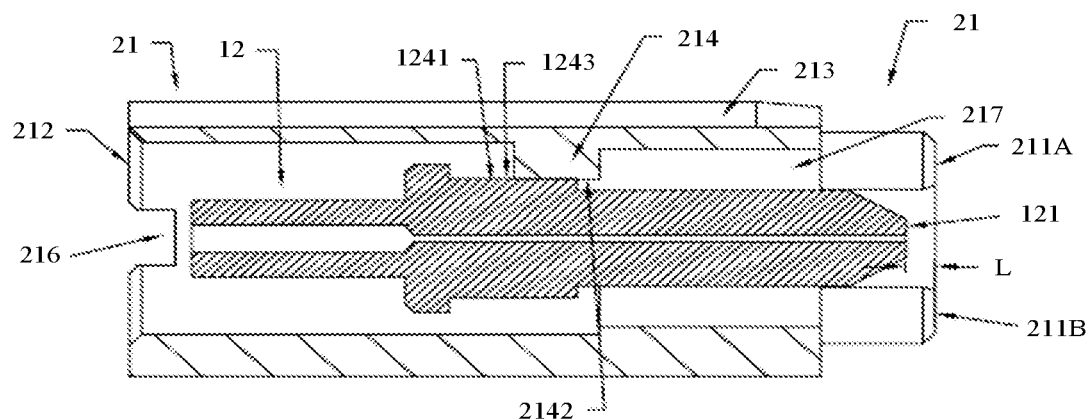
FIG. 12 is a schematic cross-sectional diagram of a second position relationship between a front cover and a ferrule of a fiber connector plug according to a first embodiment of this application.

Referring to FIG. 11, in an implementation, the front end face 211 of the front cover 21 is flush with the front end face 121 of the ferrule 12. Referring to FIG. 12, in another implementation, the front end face 121 of the ferrule 12 is encircled by an inner surface of the front cover 21, that is, the front end face 121 of the ferrule 12 is retracted into the front cover 21. The front end face 211 of the front cover 21 is protrudingly disposed on the front end face 121 of the ferrule 12 in the axial direction. In the axial direction, a distance between the front end face 121 of the ferrule 12 and the front end face 211 of the front cover 21 is L. In this implementation, it may also be understood as follows: A vertical projection of the front end face 121 of the ferrule 12 on the front cover 21 is located on the front end face 211 of the front cover 21 or the inner surface of the front cover 21, such that the front end face of the ferrule 12 is protected. In the implementations in FIG. 11 and FIG. 12, the front end face 211 of the front cover 21 can protect the front end face of the ferrule 12. For example, the front cover 21 can protect the front end face of the ferrule in a process of turnover, transportation, and insertion into and removal from the fiber adapter. During subsequent connection to a ferrule of a connector plug at a peer end, it is ensured that an optical signal can be stably and reliably transmitted between the two connector plugs.

Referring to FIG. 11 and FIG. 12, a slot 217 is formed between the inner surface of the front cover 21 and the ferrule 12, and the slot 217 forms an opening between the front end face 211 of the front cover 21 and the front end face 121 of the ferrule 12. The slot 217 is used to fit a ferrule sleeve of the fiber adapter. To be more specific, when the fiber connector plug is inserted into the fiber adapter, the ferrule is inserted into the ferrule sleeve, the ferrule sleeve is inserted into the slot 217, and one end of the ferrule sleeve needs to extend into the slot 217, that is, an end face of the ferrule sleeve is located in the slot 217 and is disposed opposite to a slot bottom of the slot 217, where the slot bottom of the slot 217 is an end opposite to the opening of the slot 217.

In the implementations shown in FIG. 9 to FIG. 13, two notches G1 and G2 opposite to each other are disposed in positions close to the front end face 211 of the front cover 21, and the front end face 211 of the front cover 21 is formed between the two notches G1 and G2. That is, the front end face 211 includes a first face 211A and a second face 211B, and the first face 211A and the second face 211B are symmetrically disposed on two sides of a central axis of the front cover 21. For example, if the first face 211A and the second face 211B are connected to form a complete circular ring, both the first face 211A and the second face 211B are less than or equal to a quarter of the circular ring, such that the positions of the two notches G1 and G2 can accommodate a part of a side wall on which a front end face of a front cover of another fiber connector plug is located. It may be understood that because the front end face of the front cover 21 protrudes from the front end face 211 of the ferrule 12, when a pair of same fiber connector plugs 100 is inserted into a same fiber adapter 200, two ferrules 12 need to be connected, and an interference fit is required between two front covers 21. The two notches G1 and G2 are designed to resolve a problem of the interference fit in the connection. The positions of the two notches G1 and G2 can accommodate a part of an area in which a front end face 211 of another front cover 21 is located.

For example, the two notches G1 and G2 may be symmetrically disposed on the two sides of the central axis of the front cover 21. Due to the form of symmetric disposing, force received by the exterior sleeve during the insertion can be relatively even and balanced, overall strength of the outer frame sleeve is high, and a possibility of a connection failure caused by force imbalance can be minimized.

Figure 14:
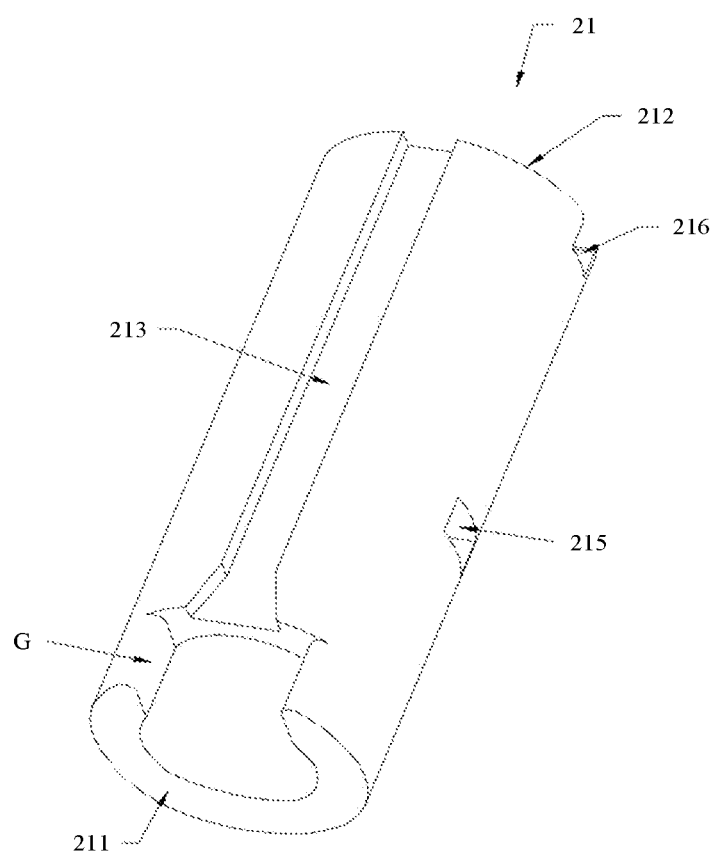
FIG. 14 is a schematic three-dimensional diagram of a front cover of a fiber connector plug according to a first embodiment of this application.

In another implementation, referring to FIG. 14, on the front cover 21, a notch G is disposed at one end close to the front end face of the front cover 21, such that the front end face 211 of the front cover 21 forms a non-closed continuously extending surface. For example, the front end face 211 may be C-shaped, arc-shaped, or semi-circular shaped.

Disposing of the notch G enables the front end of the fiber connector plug to present a concave-convex shape suitable for insertion. In this way, when the fiber connector plug is inserted into the fiber adapter, the fiber connector plug can better adapt to an internal space of the fiber adapter in comparison with a front end of a fiber connector plug in a flat shape. Therefore, a loose connection caused by a limitation of the internal space of the fiber adapter is avoided, stability and reliability of the insertion are improved, practicability is higher, and an application range is wide.

In this application, the notch G disposed at the front end of the front cover is also advantageous for observation. A worker can see at least the front end face of the ferrule when viewing an outer surface of the outer frame sleeve disposed with the notch G. Based on this, when connecting the fiber connection plug to the fiber adapter, the worker can see a position of the ferrule. This facilitates insertion, improves an insertion success rate, prevents the ferrule from suffering a plurality of collisions due to wrong insertion, and prevents the ferrule from being damaged.

Figure 15:
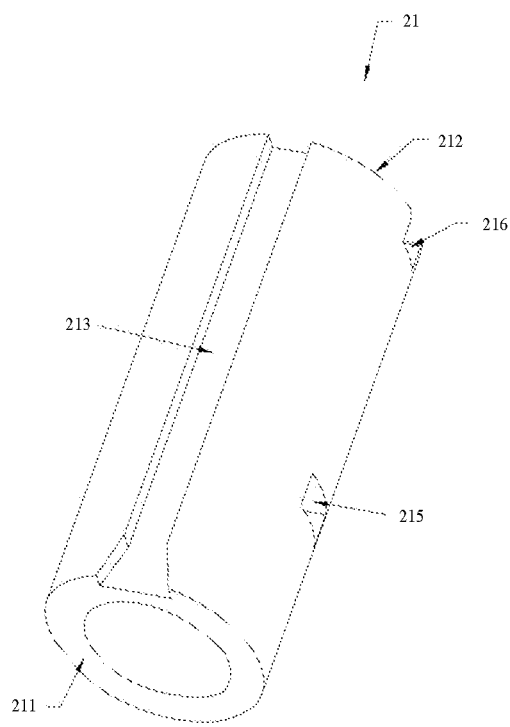
FIG. 15 is a schematic three-dimensional diagram of a front cover of a fiber connector plug according to a first embodiment of this application.

In another implementation, referring to FIG. 15, the front end face 211 of the front cover 21 is a closed ring structure, that is, the front end face 211 is not disposed with a notch structure. The front end face 211 may be in a circular ring shape, or may be in another shape. For example, a contour of an inner edge of the front end face 211 may be in a circular shape, and a contour of an outer edge of the front end face 211 may be in a square shape. The outer contour in the square shape facilitates matching with an internal space of the fiber adapter in a same shape.

In the implementations shown in FIG. 9 to FIG. 16, a first guide structure 213 is disposed on the outer surface of the front cover 21, and the first guide structure 213 extends along the axial direction. The first guide structure 213 may extend from the front end face 211 of the front cover 21 to the rear end face 212 of the front cover 21, or may extend from the front end face 211 of the front cover 21 to a middle position of the front cover 21. The middle position is a position between the front end face 211 and the rear end face 212, does not merely represent a central position between the front end face 211 and the rear end face 212, and may be a position close to the front end face 211, or may be a position close to the rear end face 212.

Referring to FIG. 9, FIG. 10, FIG. 14, and FIG. 15, in an implementation, in a radial direction, the first guide structure 213 is a groove structure recessed on the outer surface of the front cover 21, that is, the first guide structure 213 does not penetrate the inner surface of the front cover 21.

Figure 16:
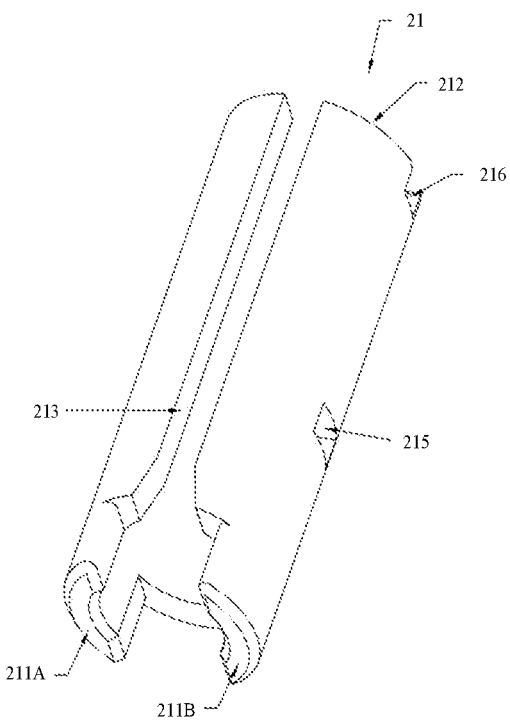
FIG. 16 is a schematic three-dimensional diagram of a front cover of a fiber connector plug according to a first embodiment of this application.

Referring to FIG. 16, in an implementation, the first guide structure 213 penetrates the inner surface and the outer surface of the front cover 21 (that is, a cut or a hollowed-out structure formed on the front cover 21).

In the axial direction, the first guide structure 213 may be correspondingly disposed in a position of the notch. The first guide structure and the notch can provide an eye-catching reminding function for alignment in a process of inserting the fiber connector plug. As shown in FIG. 15, that the first guide structure 213 is a groove structure is used as example, and an opening on a side that is of the first guide structure 213 and that faces the front end face 211 of the front cover 21 communicates with the notch G. To fit a guide key on the fiber adapter, a chamfer may be formed at the opening that is of the first guide structure 213 and that faces the front end face 211, such that a front end of the first guide structure 213 forms a flared shape. Therefore, disposing of the chamfer can provide a certain fault tolerance space for the first guide structure 213. Even if the guide key on the fiber adapter is not aligned with the first guide structure 213, the fiber adapter can slide into the first guide structure 213 under guidance of the chamfer. When the worker inserts the fiber connector plug into the fiber adapter, insertion efficiency and an insertion success rate can be improved. The chamfer may alternatively be a round corner. The round corner has no edge, and a surface is smoother. Therefore, abrasion of the corresponding structure on the fiber adapter can be effectively prevented, and safety is high.

In another implementation, the first guide structure 213 may alternatively be a structure protrudingly disposed on the outer surface of the front cover 21.

There may be one, two, or more first guide structures 213. Two or more first guide structures 213 may be evenly disposed on the outer surface of the front cover 21 at intervals in the circumferential direction.

The first guide structure 213 is disposed, such that in a process in which the fiber connector plug is connected to the fiber adapter, the front cover 21 can have an eye-catching reminding and guiding function. This facilitates alignment between the fiber connector plug and the fiber adapter, improves accuracy of connection, prevents a ferrule component of the fiber connector plug from being damaged or invalid due to a plurality of collisions caused by incorrect insertion of the fiber connector plug, and effectively prolongs a service life of the fiber connector plug.

The outer surface of the front cover 21 is cylindrical. Because the outer surface needs to fit the adapter and has a guide structure, the outer surface of the front cover 21 is also the outer surface of the fiber connector plug 100. The outer surface of the front cover 21 is directly exposed to the outside of the fiber connector plug 100 in the process of insertion into the fiber adapter 200, and no other element covers the front cover 21. When the fiber connector plug 100 is not in use, the front cover 21 may be externally covered by the dustproof cap 50. There is only one front cover 21 in the periphery of the ferrule 12 of the fiber connector plug 100, the structure is simple, and a size can also be reduced. Therefore, the dustproof cap 50 can be designed to be a small structure in size.

In an implementation, referring to FIG. 10, FIG. 11, and FIG. 12, a second limiting structure 214 is disposed on the inner surface of the front cover 21, and is used to fit the first limiting structure 1241 on the ferrule 12, to prevent the ferrule 12 from rotating in the front cover 21. For example, the front cover 21 includes a central axis C1 connected between a central position of the front end face 211 and a central position of the rear end face 212. The second limiting structure 214 is protrudingly disposed on the inner surface of the front cover 21. The second limiting structure 214 includes a second plane 2142. The second plane 2142 faces the central axis C1. It may also be understood that the second plane 2142 is a surface on a side that is of the second limiting structure 214 and that is away from the outer surface of the front cover 21. The second plane 2142 is used to fit the first plane 1243 of the first limiting structure 1241 of the ferrule 12. The first plane 1243 and the second plane 2142 are not limited to theoretical plane features in this application. It may be understood that the first plane may alternatively be approximately a plane, for example, an arc surface approximate to a plane. Alternatively, a concave-convex structure may be disposed on the first plane and the second plane.

Figure 13:
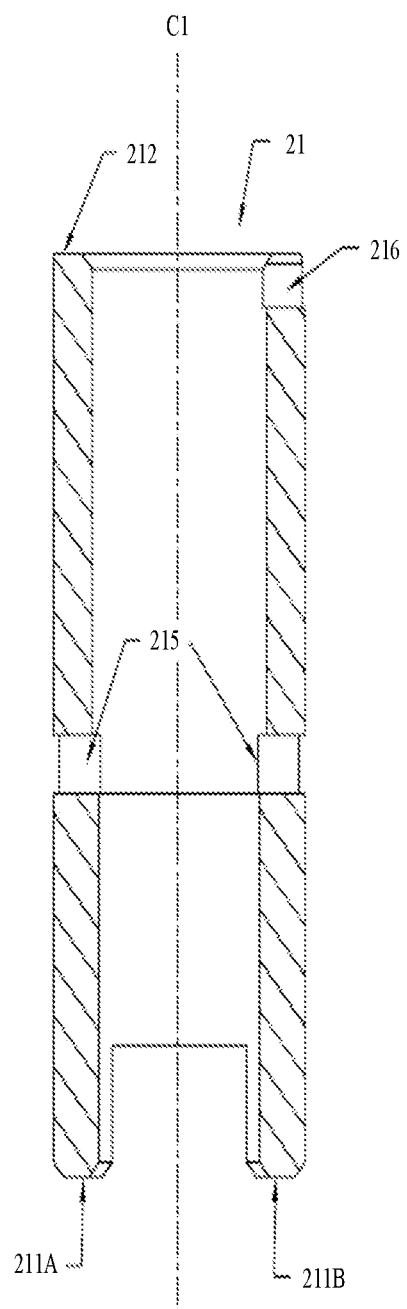
FIG. 13 is a cross-sectional diagram of a front cover of a fiber connector plug in another direction according to a first embodiment of this application.

In an implementation, referring to FIG. 13, a hole 215 is disposed on the inner surface of the front cover 21, and the hole 215 is a hole-like structure that penetrates the inner surface and the outer surface of the front cover 21. Alternatively, the hole 215 may be a clamping groove structure recessed on the inner surface of the front cover 21. The hole 215 is used to fasten the mounting member 221 of the main housing 22. There may be one, two, or more holes 215. In the implementation shown in FIG. 11, there are two holes 215 disposed opposite to each other on two sides of the central axis of the front cover 21.

In the implementations shown in FIG. 9 to FIG. 16, a first cut 216 is disposed on the rear end face 212 of the front cover 21, and the first cut 216 forms openings on all of the rear end face 212, the inner surface, and the outer surface of the front cover 21. The first cut 216 is used to fit a bump 2232 on the main housing 22, to position the front cover 21 and the main housing 22 in the circumferential direction and prevent the front cover 21 from rotating relative to the main housing 22.

The front end face 211 of the front cover 21 provided in this application can protect the front end face 121 of the ferrule 12. The inner surface of the front cover 21 can be connected to the ferrule 12 in a position defining manner. The outer surface of the front cover 21 is used to fit the inner surface of the fiber adapter 200, and has the first guide structure 213. The rear end face of the front cover 21 is connected to the main housing 22. A plurality of functions are implemented using one front cover 21. In addition, the outer surface of the front cover 21 is exposed, that is, the outer surface of the front cover 21 is the outer surface of the fiber connector plug 100. To be more specific, in the periphery of the ferrule 12, there is only one structural member: the front cover 21. In this application, a protection feature (the front end face 211 of the front cover 21) configured in the periphery of the ferrule 12 and an insertion/removal fit feature (a slot formed between the inner surface of the front cover 21 and the ferrule 12, and a fit between the outer surface of the front cover 21 and the inner surface of the fiber adapter) are concentrated on the front cover 21. This can not only reduce parts and simplify the structure of the fiber connector plug 100, but also facilitate a miniaturization design of a radial size.

A rear end of the front cover 21 is in a fully enclosed cylindrical architecture, that is, the rear end of the front cover 21 is in a circumferentially closed architecture. Even if the first cut 216 is disposed, after the front cover 21 and the main shaft 223 are assembled, the first cut 216 is also filled with a corresponding bump on the main shaft 223. Therefore, on a fiber connector plug obtained through assembly, the rear end of the front cover 21 is still in a fully enclosed and circumferential closed architecture. This can improve structural strength of the front cover on one hand, and can also improve connection strength between the front cover and the main shaft on the other hand. In addition, the front cover is used as an exterior part of the fiber connector plug, and the fully enclosed and circumferential structure can implement exterior integrity and improve user experience.

The mounting member 221 and the front cover 21 are stacked in the radial direction, and the front cover 21 is sleeved over a periphery of the mounting member 221. The following describes the mounting member 221 in detail.

Figure 17:
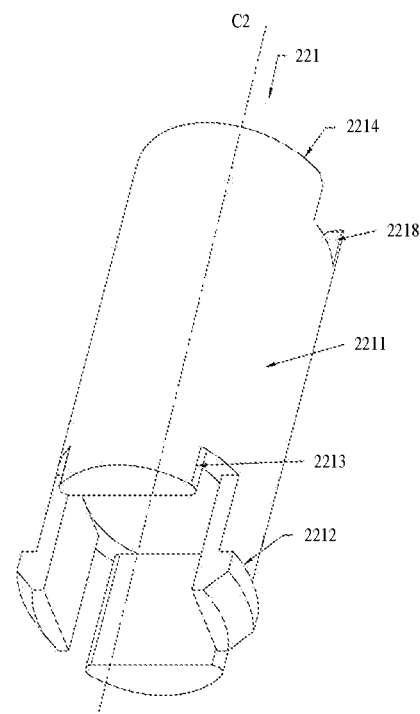
FIG. 17 is a schematic three-dimensional diagram of a mounting member of a fiber connector plug in one direction according to a first embodiment of this application.
Figure 18:
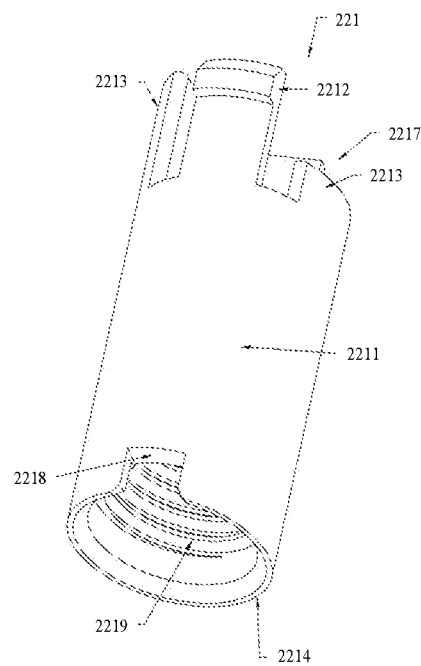
FIG. 18 is a schematic three-dimensional diagram of a mounting member of a fiber connector plug in another direction according to a first embodiment of this application.

Referring to FIG. 17 and FIG. 18, the mounting member 221 includes a mounting member body 2211, an elastic clamping hook 2212, and a second stop structure 2213. The elastic clamping hook 2212 and the second stop structure 2213 are formed at a front end of the mounting member body 2211. A rear end face 2214 of the mounting member body 2211 is used to be in contact with the main shaft 223.

Figure 19:
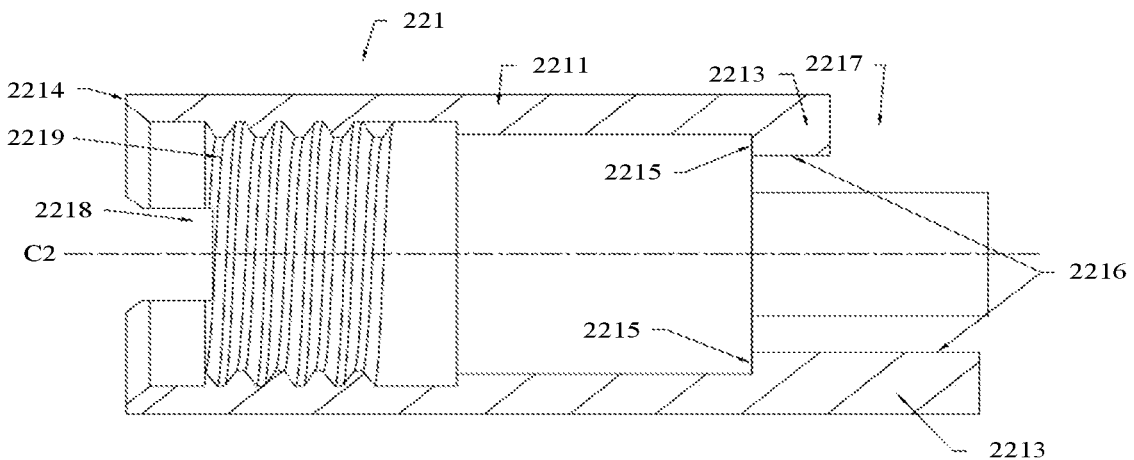
FIG. 19 is a cross-sectional diagram of a mounting member of a fiber connector plug according to a first embodiment of this application.

Referring to FIG. 19, the mounting member body 2211 is sleeve-shaped and includes a central axis C2, the second stop structure 2213 protrudes from an inner surface of the mounting member body 2211, and the second stop structure 2213 includes a second limiting face 2215 and a contact face 2216. The second limiting face 2215 faces a rear end of the mounting member body 2211, and the contact face 2216 faces the central axis C2 of the mounting member body 2211. For example, the second limiting face 2215 is vertically connected to the contact face 2216, and both the second limiting face 2215 and the contact face 2216 are planar. The second limiting face 2215 is used to fit the first limiting face 1244 of the first stop structure 1242 of the ferrule 12, and the contact face 2216 is used to fit the first plane 1243 of the first limiting structure 1241 of the ferrule 12.

Referring to FIG. 19, there are two second stop structures 2213 disposed opposite to each other on two sides of the central axis C2 of the mounting member body. An axial size of one second stop structure 2213 is less than an axial size of the other second stop structure 2213. A side that is of one second stop structure 2213 and that is away from the mounting member body 2211 forms a mounting member notch 2217. A position of the mounting member notch 2217 directly faces a part of a contact face 2216 of the other second stop structure 2213. The mounting member notch 2217 is used to accommodate the second limiting structure 214 of the front cover 21.

Figure 20:
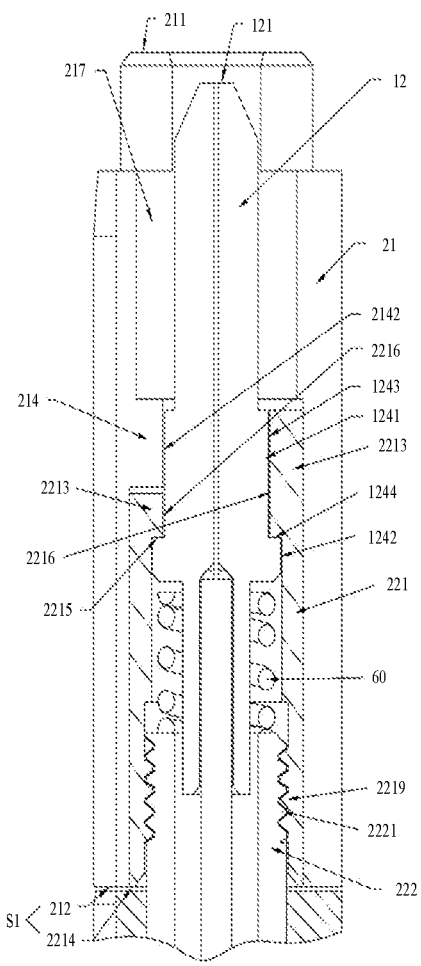
FIG. 20 is a partially enlarged schematic cross-sectional diagram of a fiber connector plug according to a first embodiment of this application, and mainly shows a structural feature inside a front cover.

Referring to FIG. 20, the second plane 2142 of the second limiting structure 214 of the front cover 21 is coplanar with a contact face 2216 of one second stop structure 2213, and is disposed opposite to the contact face 2216 of the other second stop structure 2213.

Figure 21:
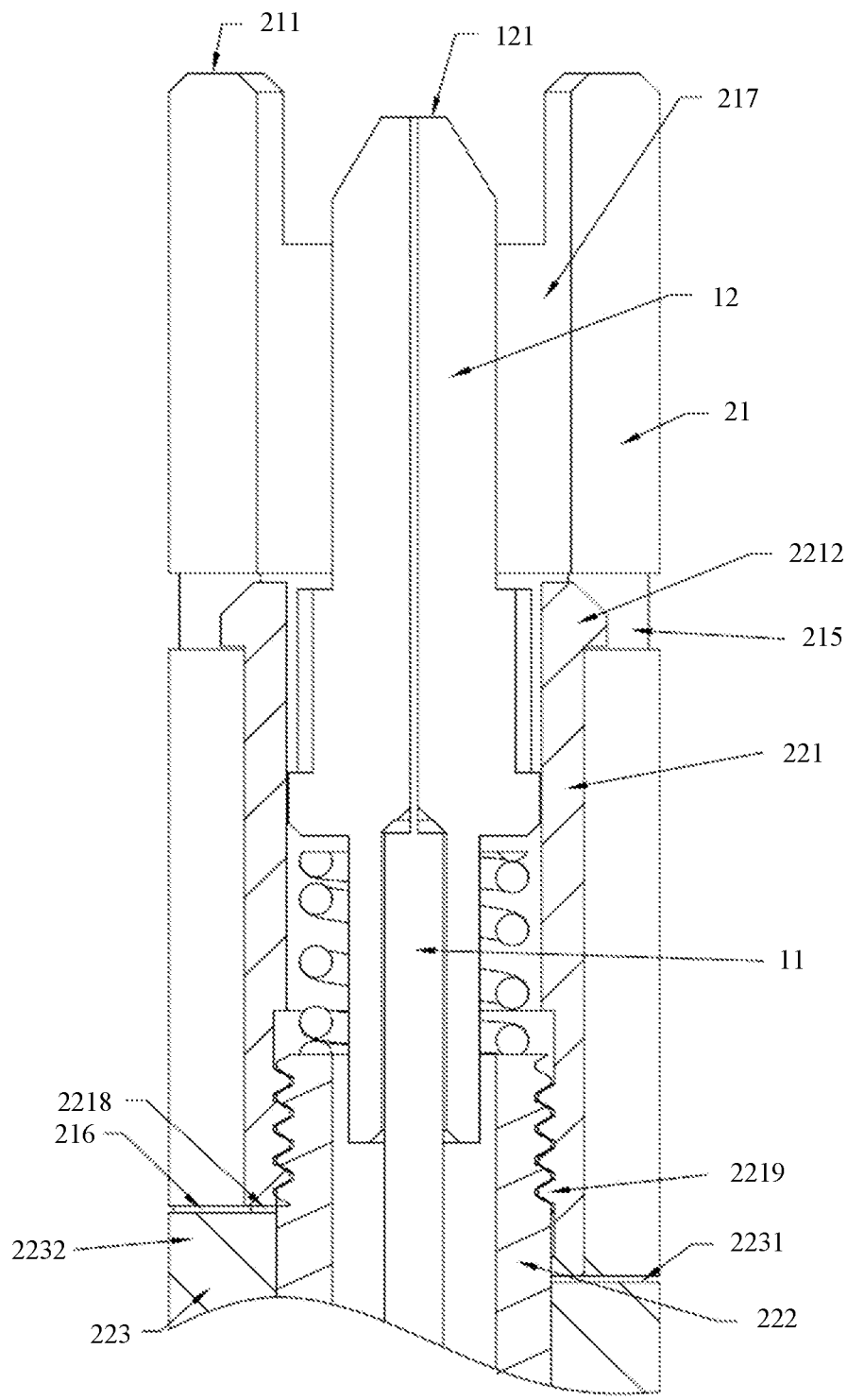
FIG. 21 is a partially enlarged schematic cross-sectional diagram of a fiber connector plug according to a first embodiment of this application, and mainly shows a structural feature inside a front cover.

Referring to FIG. 21, an outer surface of the mounting member body 2211 is in contact with the inner surface of the front cover 21, and the inner surface of the mounting member body 2211 is in contact with the ferrule 12. The elastic clamping hook 2212 is used to fit the hole 215 on the front cover 21 to fasten the mounting member 221 to the front cover 21. As shown in FIG. 17, there are two elastic clamping hooks 2212 symmetrically distributed on the two sides of the central axis C2 of the mounting member body 2211. The two second stop structures 2213 are located on sides of the two elastic clamping hooks 2212, and the two second stop structures 2213 are distributed between the two elastic clamping hooks 2212 in the circumferential direction. In another implementation, alternatively, there may be only one elastic clamping hook 2212, or there may be three or more elastic clamping hooks 2212. This is not specifically limited in this application.

A fastening manner between the mounting member 221 and the front cover 21 is not limited to fastening through a fit between the elastic clamping hook 2212 and the hole 215. In another implementation, another fastening manner may be used. For example, alternatively, the mounting member 221 may not be disposed with the elastic clamping hook 2212. The mounting member 221 and the front cover 21 may be fastened using a screw, and the screw passes through the front cover 21 and is fastened in the mounting member 221. Alternatively, the mounting member 221 and the front cover 21 are fastened using glue. Alternatively, a clamping hook is disposed on the front cover 21, a clamping groove or a hole is disposed on the mounting member 221, and the mounting member 221 and the front cover 21 are fastened through a fit between the clamping hook and the clamping groove or the hole.

Referring to FIG. 17, FIG. 18, and FIG. 19, a second cut 2218 is disposed on the rear end face 2214 of the mounting member body 2211. The second cut 2218 forms openings on all of the rear end face 2214, the inner surface, and the outer surface of the mounting member body 2211. The second cut 2218 is used to implement positioning between the mounting member 221 and the main shaft 223, position the mounting member 221 and the main shaft 223 in the circumferential direction, and prevent the mounting member 221 from rotating relative to the main shaft 223. Referring to FIG. 20 and FIG. 21, after the front cover 21 is mounted on the mounting member 221, the rear end face 2214 of the mounting member body 2211 and the rear end face 212 of the front cover 21 are coplanar and jointly form a connecting face S1. The connecting face S1 is in contact with the end face of the main shaft 223. In this application, a structural design in which the connecting face S1 is in contact with the end face of the main shaft 223 is employed, such that the connection between the front cover 21 and the main shaft 223 occupies only a space of the end face of the main shaft 223 and does not extend to an outer surface of the main shaft 223. In addition, in this application, the outer surface of the front cover 21 and the outer surface of the main shaft 223 may be coplanar, or there is a smooth transition. For example, the outer surface of the front cover 21 is a cylindrical surface, and the outer surface of the main shaft 223 is also a cylindrical surface. When the front cover 21 is in contact with the end face of the main shaft 223, the outer surfaces of the two cylinders with a same radial size are in contact to form a complete cylindrical outer surface. The connecting face S1 and the end face of the main shaft 223 implement positioning in the circumferential direction using a cut-bump fitting structure. For example, the first cut 216 and the second cut 2218 directly face each other in the radial direction, and are used to implement positioning of the front cover 21 and the mounting member 221 to the main shaft 223.

A sealing connection may be formed at a joint between the connecting face S1 and the main shaft 223. A function of the sealing connection is to isolate an internal space of the main shaft 223 from an external space in a sealing manner. In this way, the fiber core and the ferrule can be protected from erosion by dust, moisture, and the like, the service life of the fiber connector plug is prolonged, and efficiency and quality of light transmission are enhanced.

Referring to FIG. 18 to FIG. 21, the inner surface of the mounting member body 2211 is further disposed with a threaded part 2219, and the threaded part 2219 is used to fasten the fastener 222. Referring to FIG. 19, the fastener 222 is also sleeve-shaped, an external thread 2221 is disposed in a periphery of a front end of the fastener 222, and the front end of the fastener 222 extends into the mounting member 221 and is fastened to the threaded part 2219 on the mounting member 221. A rear end of the fastener 222 extends into the main shaft 223 and is fastened to an inner surface of the main shaft 223.

Figures 22A, 22B:
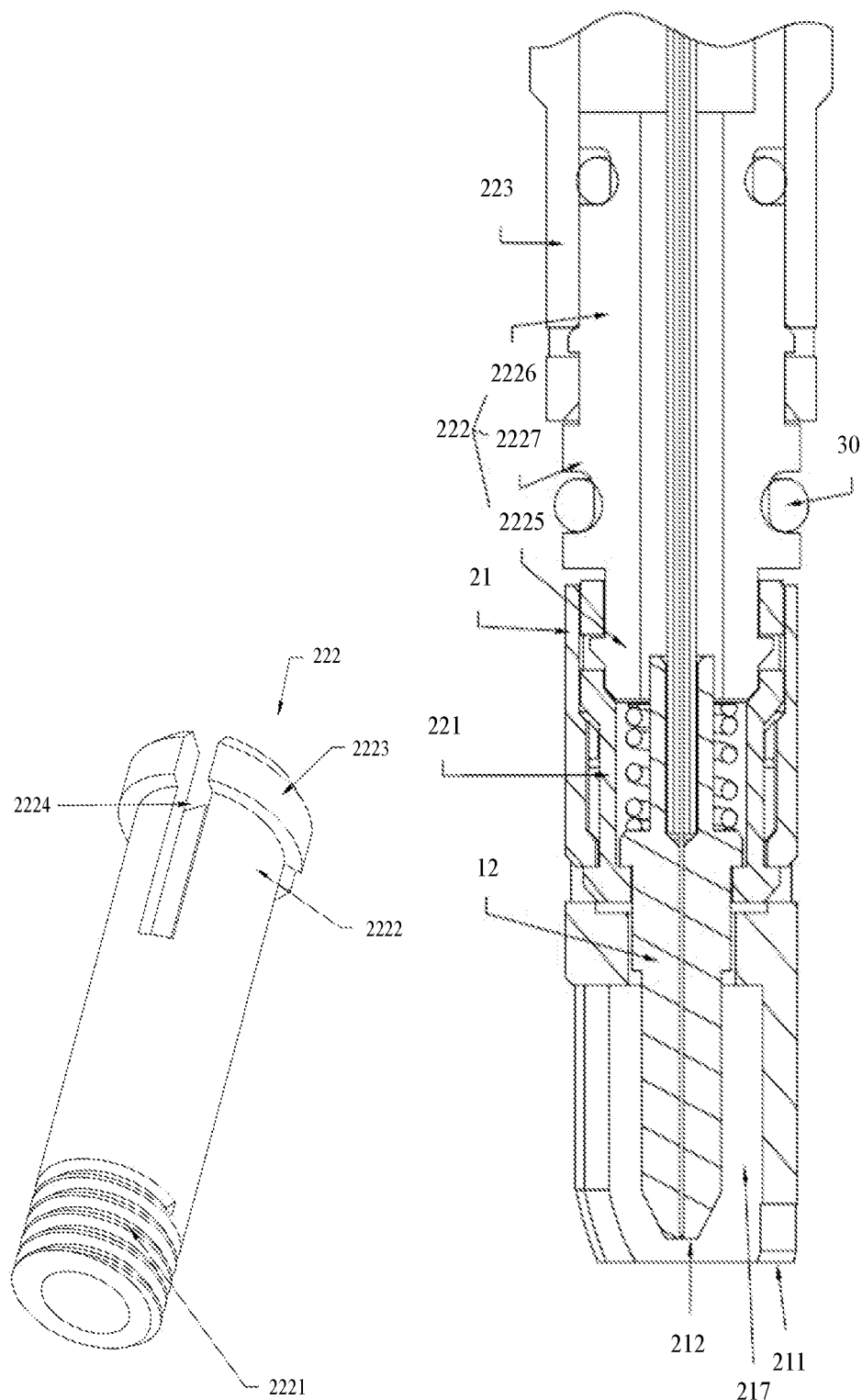
FIG. 22A is a schematic three-dimensional diagram of a fastener of a fiber connector plug according to a first embodiment of this application.
FIG. 22B is a partially enlarged schematic cross-sectional diagram of a fiber connector plug according to a first embodiment of this application, and mainly shows a position relationship between a mounting member, a fastener, and a main shaft.

For example, referring to FIG. 22A, an elastic clasp arm 2222 is formed at the rear end of the fastener 222. The elastic clasp arm 2222 extends along the axial direction. A clasp part 2223 is protrudingly disposed on an outer surface of the elastic clasp arm 2222. The clasp part 2223 is used to fit a limiting step on the inner surface of the main shaft 223, to fasten the fastener 222 to the main shaft 223. Three elastic clasp arms 2222 are disposed at the rear end of the fastener 222, and a gap 2224 is formed between adjacent elastic clasp arms 2222. The gap 2224 is formed to enable the elastic clasp arms 2222 to elastically swing in the radial direction. In another implementation, there may be one, two, or more elastic clasp arms 2222. This is not limited in this application.

Referring to FIG. 20, FIG. 21, and FIG. 22A, in a possible implementation, a part of the fastener 222 is located inside the main shaft 223, and the other part is located inside the mounting member 221. That is, the fastener 222 is in a fully enclosed state. In a periphery of the fastener 222, the main shaft 223 and the mounting member 221 are connected.

In another implementation, the fastener 222 may alternatively be partially exposed as an exterior face of the fiber connector plug. Referring to FIG. 22B, in this implementation, the fastener 222 is in a sleeve-shaped structure. The fastener 222 includes a front end 2225, a rear end 2226, and a middle part 2227 connected between the front end 2225 and the rear end 2226. The front end 2225 of the fastener 222 extends into an inner side of the mounting member 221 and is fastened to the mounting member 221. The rear end 2226 of the fastener 222 extends into an inner side of the main shaft 223 and is fastened to the main shaft 223. The middle part 2227 is located between the front end of the main shaft 223 and a rear end of the mounting member 221. It may also be understood that the middle part 2227 is located between the front end of the main shaft 223 and the rear end of the front cover 21. An outer surface of the middle part 2227 forms the exterior face of the fiber connector plug.

For example, the front end 2225 is detachably connected to the mounting member 221 in a manner of a fit between a buckle and a hole. A buckle is disposed in a periphery of the front end 2225. A hole that penetrates the inner surface and the outer surface is disposed on the mounting member 221. The buckle of the front end 2225 is accommodated in the hole of the mounting member 221. The rear end 2226 is also detachably connected to the main shaft 223 in a manner of a fit between a buckle and a hole. A buckle is disposed in a periphery of the rear end 2226. A hole that penetrates the inner surface and the outer surface is disposed on the main shaft 223. The buckle of the rear end 2226 is accommodated in the hole of the main shaft 223.

In this implementation, a sealing groove is disposed in a periphery of the middle part 2227 and is used to accommodate a sealing structure 30. Certainly, in the architecture in this implementation, the sealing groove may not be disposed in the periphery of the middle part 2227, but the sealing groove is disposed on the outer surface of the main shaft 223. When the fiber connector plug is inserted into the fiber adapter, the middle part 2227 is located inside the fiber adapter, and the front end of the main shaft 223 also extends into the fiber adapter.

A sealing structure may also be disposed between the rear end 2226 of the fastener 222 and the main shaft 223.

It may be understood that a guide structure may also be disposed in the periphery of the middle part 2227. The guide structure communicates with or continuously extends to the first guide structure 213 on the front cover 21. The guide structure and the first guide structure 213 on the front cover 21 jointly fit the guide key on the fiber adapter. In another implementation, a guide structure is disposed in each of the periphery of the middle part 2227 and the periphery of the main shaft 223. The two guide structures are disposed on an extension path of the first guide structure 213 on the front cover 21. The two guide structures and the first guide structure 213 on the front cover 21 jointly form a guide structure of the fiber connector plug.

Figure 23:
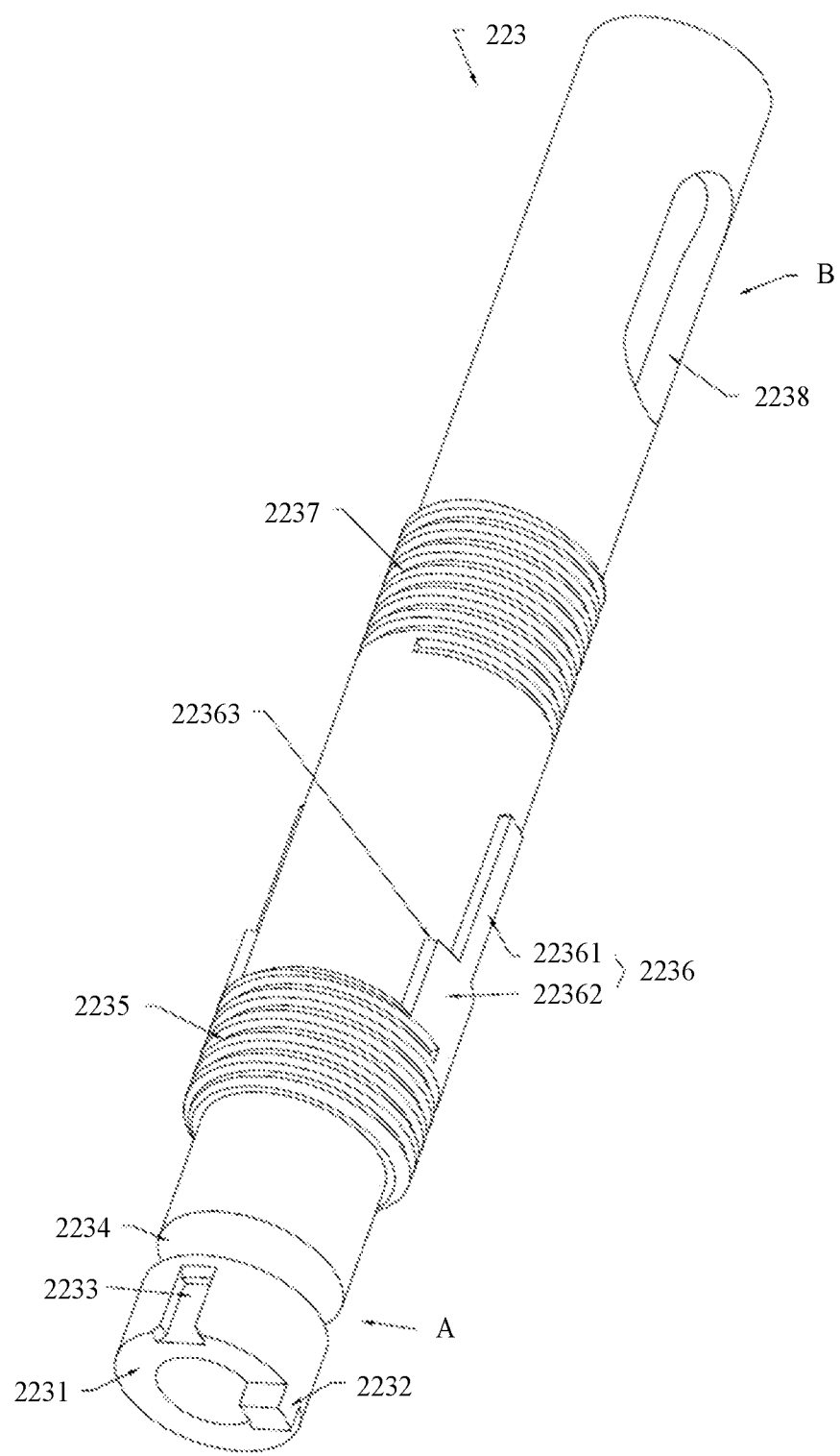
FIG. 23 is a schematic three-dimensional diagram of a main shaft of a fiber connector plug according to a first embodiment of this application.
Figure 24:
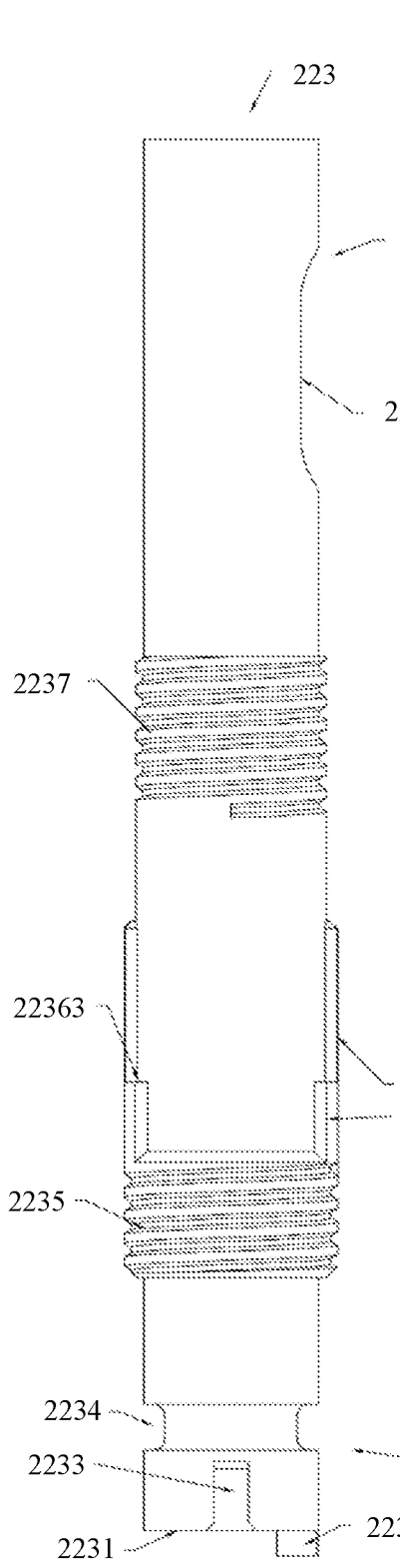
FIG. 24 is a plan view of a main shaft of a fiber connector plug in one direction according to a first embodiment of this application.
Figure 25:
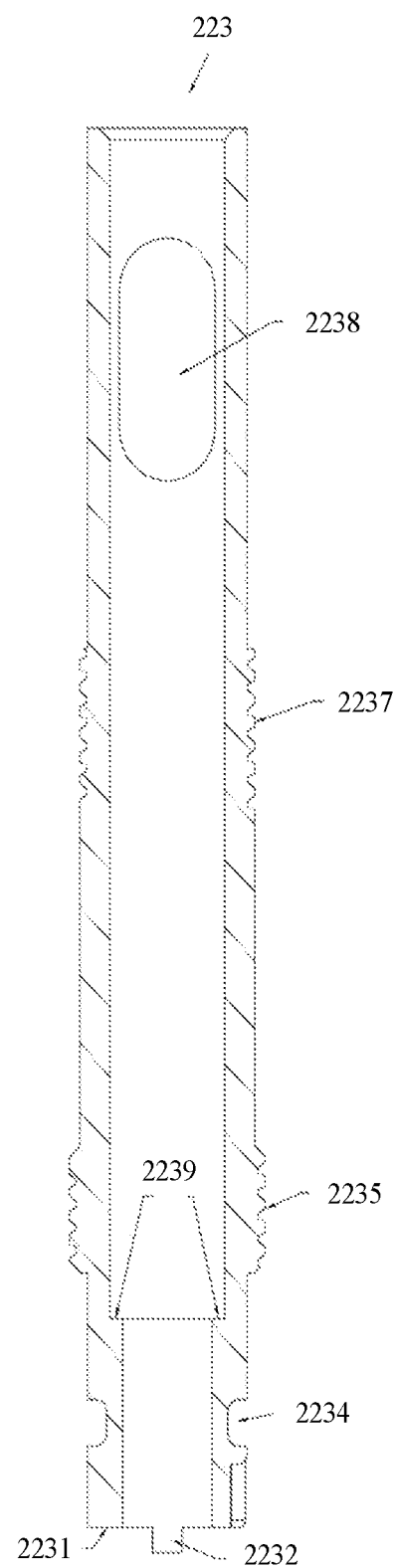
FIG. 25 is a cross-sectional diagram of a main shaft of a fiber connector plug according to a first embodiment of this application.

Referring to FIG. 23, FIG. 24, and FIG. 25, a core element of the main housing 22 is the main shaft 223, and main features of the main shaft 223 are concentrated on a front end face 2231 and the outer surface of the main shaft 223. The front end face 2231 of the main shaft 223 is used to in contact with the front cover 21 and the mounting member 221. A bump 2232 is protrudingly disposed on the front end face 2231 of the main shaft 223. The bump 2232 extends along the radial direction from an inner edge of the front end face 2231 of the main shaft 223 to an outer edge of the front end face 2231 of the main shaft 223.

In an implementation, a second guide structure 2233, a sealing groove 2234, a locking part 2235, a first sliding guide structure 2236, and a fastening part 2237 are sequentially disposed on the outer surface of the main shaft 223 along the axial direction from the front end to the rear end of the main shaft 223.

In a position of the front end face 2231 of the main shaft 223, the second guide structure 2233 and the first guide structure 213 (as shown in FIG. 3) on the front cover 21 are connected, and jointly fit the guide key on the fiber adapter 200. This can prevent the front cover 21 and the main shaft 223 from rotating relative to each other.

In an implementation, in the radial direction, the second guide structure 2233 may be a groove structure recessed on the outer surface of the main shaft 223, or the second guide structure 2233 penetrates the inner surface and the outer surface of the main shaft 223 (that is, the second guide structure 2233 may be understood as a cut structure disposed on the main shaft 223). In another implementation, alternatively, the second guide structure 2233 may be a structure protrudingly disposed on the outer surface of the main shaft 223. A circumferential size and a radial size of the second guide structure 2233 may be the same as a circumferential size and a radial size of the first guide structure 213 respectively. Because both the outer surface of the main shaft and the outer surface of the front cover are exterior faces of the fiber connector plug, the circumferential size and the radial size of the second guide structure 2233 are designed to be the same as the circumferential size and the radial size of the first guide structure 213 respectively, such that the first guide structure 213 and the second guide structure 2233 can visually form an integrated structure. Therefore, there is also an effect of complete exterior consistency between the front cover and the main shaft. This not only facilitates the miniaturization design, but also improves user experience.

The sealing groove 2234 is an arc-shaped groove structure that encircles the outer surface of the main shaft 223. The locking part 2235 is located on a side that is of the sealing groove 2234 and that is away from the second guide structure 2233. The following describes the locking part 2235 in detail.

For ease of description, as defined in this application, the outer surface of the main shaft 223 is a surface that bears the locking part 2235, instead of an outer surface of the locking part 2235.

Referring to FIG. 23, the locking part 2235 may be a boss structure integrally formed on the outer surface of the main shaft 223. Alternatively, the locking part 2235 and the main shaft 223 may be a split structure. For example, the locking part 2235 is sleeved over and fastened to the outer surface of the main shaft 223, or is connected to the outer surface of the main shaft 223 in another fastening manner (for example, fastened using glue). The locking part 2235 may be a closed ring structure encircling the outer surface of the main shaft 223, and may be understood as a cylindrical boss structure continuously extending along the circumferential direction, and is a centrosymmetric rotary structure. The locking part 2235 may alternatively be a non-closed ring structure. For example, one, two, or more locking parts 2235 are disposed on the outer surface of the main shaft 223. In an embodiment in which there are two locking parts 2235, the locking parts 2235 may be symmetrically distributed on two sides of the main shaft 223. In an embodiment in which there are a plurality of locking parts 2235, the locking parts 2235 may be distributed on a same circumference at equal intervals. The outer surface of the locking part 2235 may be a smooth surface, for example, a cylindrical surface, an arc surface, or a plane, and the outer surface of the locking part 2235 may be disposed with a screw thread or another microstructure used to increase contact friction force, for example, an etched structure.

Referring to FIG. 23 and FIG. 24, the first sliding guide structure 2236 is located on a side that is of the locking part 2235 and that is away from the sealing groove 2234. The first sliding guide structure 2236 is used to fit the sliding member 40, and provide mounting position defining and guidance for the sliding member 40 slidably connected on the main shaft 223. The first sliding guide structure 2236 may be a guide rail structure protrudingly disposed on the outer surface of the main shaft 223, or may be a guide groove structure recessed on the outer surface of the main shaft 223. The first sliding guide structure 2236 includes a first guide part 22361 and a first limiting part 22362. The first limiting part 22362 is connected to the locking part 2235. The first guide part 22361 is connected to a side that is of the first limiting part 22362 and that is away from the locking part 2235. In the circumferential direction, a size of the first guide part 22361 is less than a size of the first limiting part 22362. A first limiting step 22363 is formed between the first limiting part 22362 and the outer surface of the main shaft 223. The first limiting step 22363 is used to define a boundary position for sliding of the sliding member 40 toward the front end of the main shaft 223. When the sliding member 40 slides to the first limiting step 22363 and abuts against the first limiting step 22363, the sliding member 40 cannot slide toward the front end of the main shaft 223 any longer. The first guide part 22361 is connected to a middle part of the first limiting part 22362. The first limiting part 22362 and the first guide part 22361 form a T-shaped structure, and the first guide part 22361 is a strip-shaped structure extending along the axial direction. In this implementation, there are two first sliding guide structures 2236 symmetrically distributed on outer surfaces of two opposite sides of the main shaft 223.

The fastening part 2237 is located on a side that is of the first sliding guide structure 2236 and that is away from the locking part 2235. The fastening part 2237 is used to connect to the fastening base 224. In this implementation, the fastening part 2237 is a threaded structure and is used to connect to the fastening base 224 in a threaded connection manner. Alternatively, the fastening part 2237 may be another clamping structure. For example, the main shaft 223 and the fastening base 224 are fastened in a manner of a fit between a buckle and a clamping groove.

Referring to FIG. 23, FIG. 24, and FIG. 25, the main shaft 223 provided in this application includes a front end A and a tail end B. The front end face 2231 is an end face of the front end A. The second guide structure 2233 and the sealing groove 2234 are disposed on an outer surface of the front end A. An inner surface of the front end A is used to connect to the fastener 222. A limiting step 2239 is disposed on the inner surface of the main shaft 223. The limiting step 2239 faces the tail end B, and the limiting step 2239 is used to fit the clasp part 2223 of the elastic clasp arm 2222 on the fastener 222. The tail end B is used to be fastened to the fiber. A through hole 2238 is disposed at the tail end B. The through hole 2238 penetrates the outer surface and the inner surface of the main shaft 223.

In this implementation, elements assembled on the outer surface of the main shaft 223 include the sealing structure 30, the sliding member 40, the second elastic member 70, the fastening base 224, the heat shrink tube 226, and the tail sleeve 225. The sealing structure 30 is an elastic sealing ring, and is sleeved in the sealing groove 2234 and partially protrudes from the outside of the sealing groove 2234. A part protruding from the outside of the sealing groove 2234 is used to sealingly connect to the fiber adapter or the dustproof cap.

Figure 26:
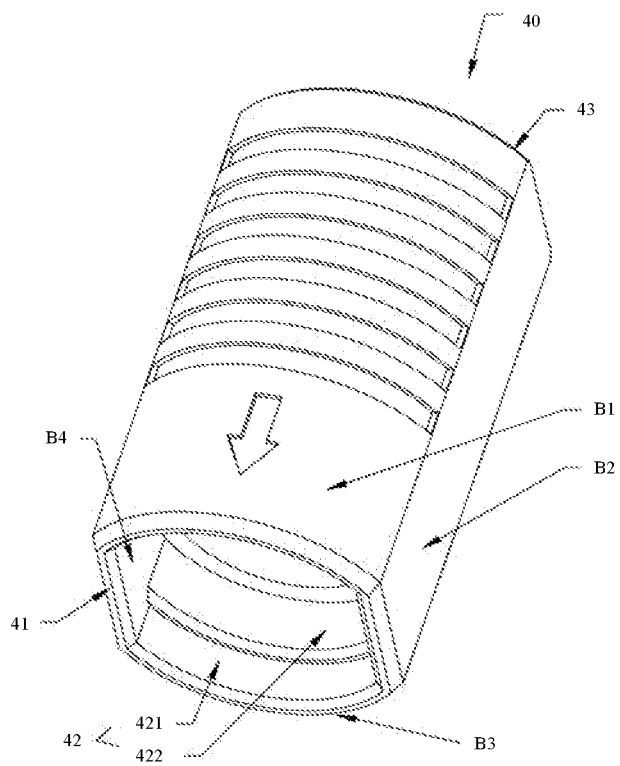
FIG. 26 is a schematic three-dimensional diagram of a sliding member of a fiber connector plug in one direction according to a first embodiment of this application.
Figure 27:
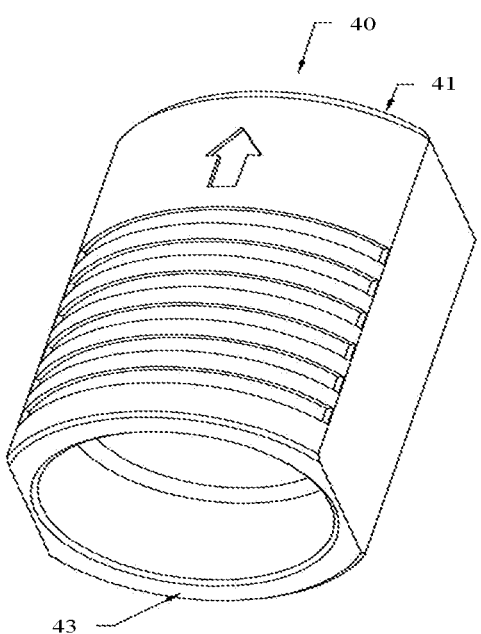
FIG. 27 is a schematic three-dimensional diagram of a sliding member of a fiber connector plug in another direction according to a first embodiment of this application.
Figure 28:
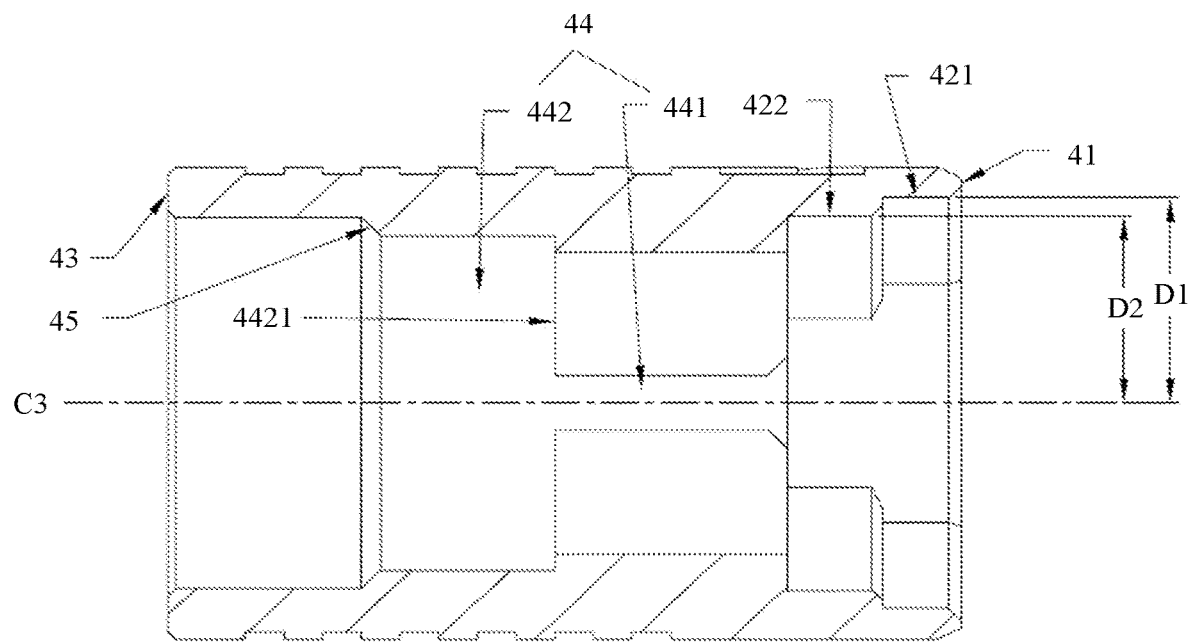
FIG. 28 is a cross-sectional diagram of a sliding member of a fiber connector plug according to an implementation in a first embodiment of this application.
Figure 29:
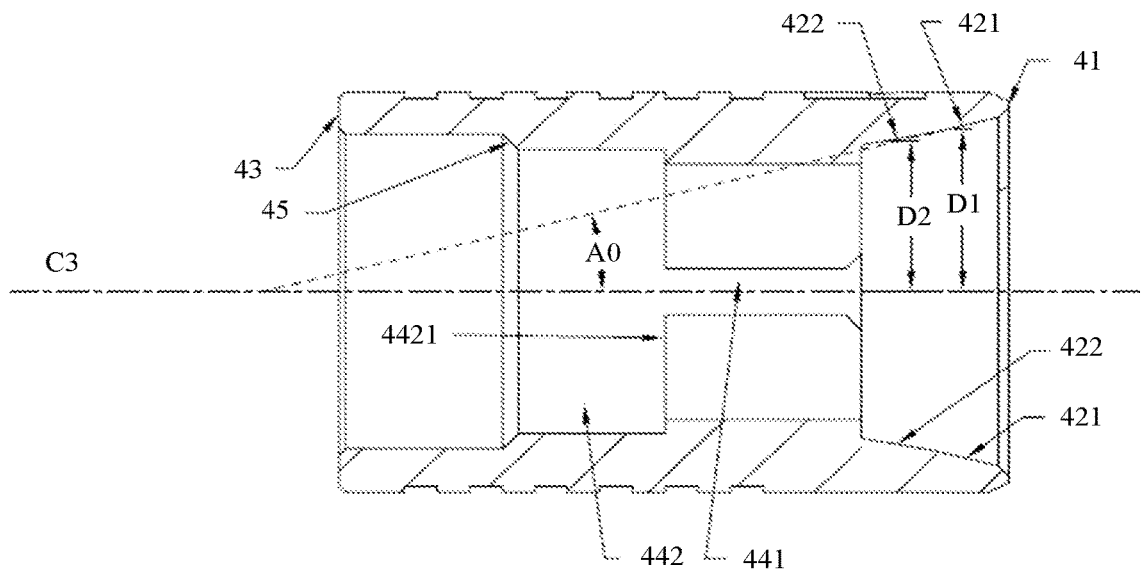
FIG. 29 is a cross-sectional diagram of a sliding member of a fiber connector plug according to another implementation in a first embodiment of this application.

Referring to FIG. 26 and FIG. 27, in an implementation, the sliding member 40 is sleeve-shaped, and the sliding member 40 includes a front end face 41 and a rear end face 43. An inner surface of the sliding member 40 includes a fitting surface 42. The fitting surface 42 adjoins the front end face 41 of the sliding member 40 and faces an internal space of the sliding member 40 (it may also be understood as facing a central axis of the sliding member 40). The fitting surface 42 includes a first area 421 and a second area 422. The first area 421 is located between the second area 422 and the front end face 41 of the sliding member 40. In an implementation, both the first area 421 and the second area 422 are arc-shaped surfaces along the circumferential direction. Referring to FIG. 28 and FIG. 29, in the radial direction, a vertical distance D1 (which may be understood as a radial size of the first area 421) between the first area 421 and the central axis C3 is greater than a vertical distance D2 (which may be understood as a radial size of the second area 422) between the second area 422 and the central axis. The first area 421 may be directly connected to the second area 422. Alternatively, the first area 421 and the second area 422 may be two non-adjacent areas on the fitting surface 42, that is, the first area 421 and the second area 422 are spaced apart. Along the axial direction, vertical distances from different positions of the first area 421 to the central axis may be equal (the implementation shown in FIG. 28), that is, an extension direction of the first area 421 in a direction from the front end face 41 to the rear end face 43 of the sliding member 40 is parallel to the central axis. In another implementation, vertical distances from different positions of the first area 421 to the central axis may be unequal (the implementation shown in FIG. 29), that is, an included angle A0 is formed between the extension direction of the first area 421 in the direction from the front end face 41 to the rear end face 43 of the sliding member 40 and the central axis.

For example, along the axial direction, the fitting surface 42 may be in a stepped shape (the implementation shown in FIG. 28), or the fitting surface 42 may be is in a bevel shape (the implementation shown in FIG. 29). An etched structure is disposed in the first area 421 and/or the second area 422. Alternatively, a groove is disposed on the fitting surface 42 (the groove may be disposed in the first area 421 or the second area 422, or the groove may be disposed in each of the first area 421 and the second area 422). The groove is used to fit a protruding part on the elastic arm. Both the etched structure and the groove structure that is disposed on the fitting surface help increase locking force. Disposing of the second area 422 may be the same as or different from that of the first area 421. This is not limited in this application. Forms of the first area 421 and the second area 422 may be different as long as the distance between the second area 422 and the central axis is closer than that between the first area 421 and the central axis.

Referring to FIG. 26 and FIG. 27, the sleeve-shaped sliding member 40 includes a first plate member B1, a second plate member B2, a third plate member B3, and a fourth plate member B4 that are sequentially connected. The first plate member B1 is disposed opposite to the third plate member B3. The second plate member B2 is disposed opposite to the fourth plate member B4. The fitting surface 42 is disposed on inner surfaces of the first plate member B1 and the third plate member B3. In this implementation, the first plate member B1 and the third plate member B3 are convex arc-shaped structures, and an anti-sliding structure is disposed on an outer surface of each of the first plate member B1 and the third plate member B3. The second plate member B2 and the fourth plate member B4 are flat plate structures. The second plate member B2 and the fourth plate member B4 are disposed in parallel with each other. A distance between the second plate member B2 and the fourth plate member B4 is less than a maximum distance between the first plate member B1 and the third plate member B3. When the sliding member 40 is operated, external force is applied to the first plate member B1 and the third plate member B3, and one side of the second plate member B2 and one side of the fourth plate member B4 may be used to adjoin another fiber connector plug, such that a plurality of fiber connector plugs are densely arranged to save a space. When the sliding member 40 is connected to the main shaft 223, the second plate member B2 and the fourth plate member B4 may be in direct contact with the outer surface of the main shaft 223 or may be connected to the outer surface of the main shaft 223 using a guide structure. A gap is formed between the main shaft 223 and each of the first plate member B1 and the third plate member B3. The gap may be a locking groove for accommodating a second locking structure of the fiber adapter or an accommodating space for accommodating a second elastic element 70 and a fastening base.

Referring to FIG. 28 and FIG. 29, a second sliding guide structure 44 is further disposed on the inner surface of the sliding member 40. The second sliding guide structure 44 is used to fit the first sliding guide structure 2236 on the main shaft 223. The second sliding guide structure 44 is located on inner surfaces of the second plate member B2 and the fourth plate member B4. The second sliding guide structure 44 includes a second guide part 441 and a second limiting part 442. The second limiting part 441 is located on a side that is of the second guide part 441 and that is away from the front end face 41 of the sliding member 40. The second guide part 441 is used to fit the first guide part 22361 on the outer surface of the main shaft 223. The second limiting part 442 is used to fit the first limiting part 22362 on the outer surface of the main shaft 223. A side that is of the second limiting part 442 and that faces the front end face of the sliding member 40 forms a second limiting step 4421. The second limiting step 4421 is used to fit the first limiting step 22363 of the first limiting part 22362 on the main shaft 223, to define a boundary position for sliding of the sliding member 40 toward the front end of the main shaft 223. The second limiting part 442 and the second guide part 441 form a T-shaped structure. In this implementation, the second limiting part 442 and the second guide part 441 are guide groove structures recessed on the inner surface of the sliding member 40. Alternatively, in another implementation, the second limiting part 442 and the second guide part 441 may be guide rail structures protrudingly disposed on the inner surface of the sliding member 40. A step positioning face 45 facing the rear end face 43 of the sliding member 40 is disposed on the inner surface of the sliding member 40, and is used to position the second elastic member 70.

The second elastic member 70 is elastically connected between the fastening base 224 and the sliding member 40, and the fastening base 224 is fastened to the fastening part 2237 on the outer surface of the main shaft 223.

Figure 30:
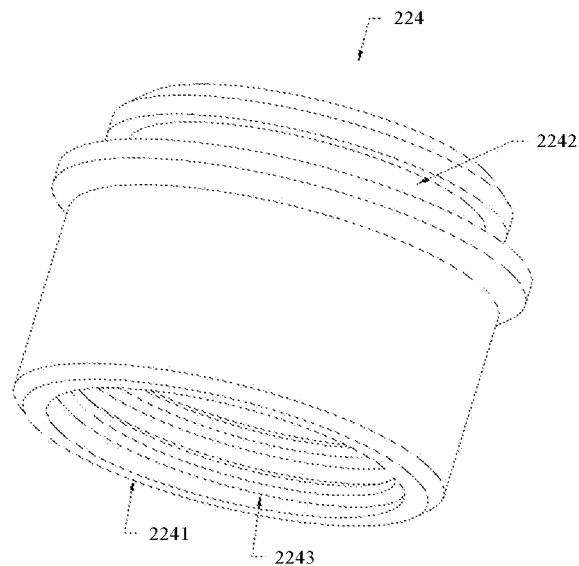
FIG. 30 is a schematic three-dimensional diagram of a fastening base of a fiber connector plug according to a first embodiment of this application.

Referring to FIG. 30, in an implementation, the fastening base 224 includes a front end face 2241. An inner surface of the fastening base 224 is disposed with a screw thread 2243, and the fastening base 224 is fastened to the fastening part 2237 on the main shaft 223 using a thread fitting structure. The thread fitting structure connects the fastening base 224 to the main shaft 223. An axial position of the fastening base 224 on the main shaft 223 may be adjusted by rotating the fastening base 224. The front end face 2241 of the fastening base 224 is used to abut against the second elastic member 70. A fastening groove 2242 is disposed on an outer surface of the fastening base 224, and the fastening groove 2242 is located in a position close to a rear end face of the fastening base 224.

Referring to FIG. 5 and FIG. 6, the fastening groove 2242 is used to fasten a front end of the tail sleeve 225, and the tail sleeve 225 is sleeved over a periphery of the tail end of the main shaft 223. The heat shrink tube 226 is disposed between an outer surface of the tail end of the main shaft 223 and the tail sleeve 225. The heat shrink tube 226 is connected between the tail end of the main shaft 223 and the fiber 11 outside the main shaft 223, and the heat shrink tube 226 is used to sealingly connect the main shaft 223 and the fiber 11.

Figure 31:
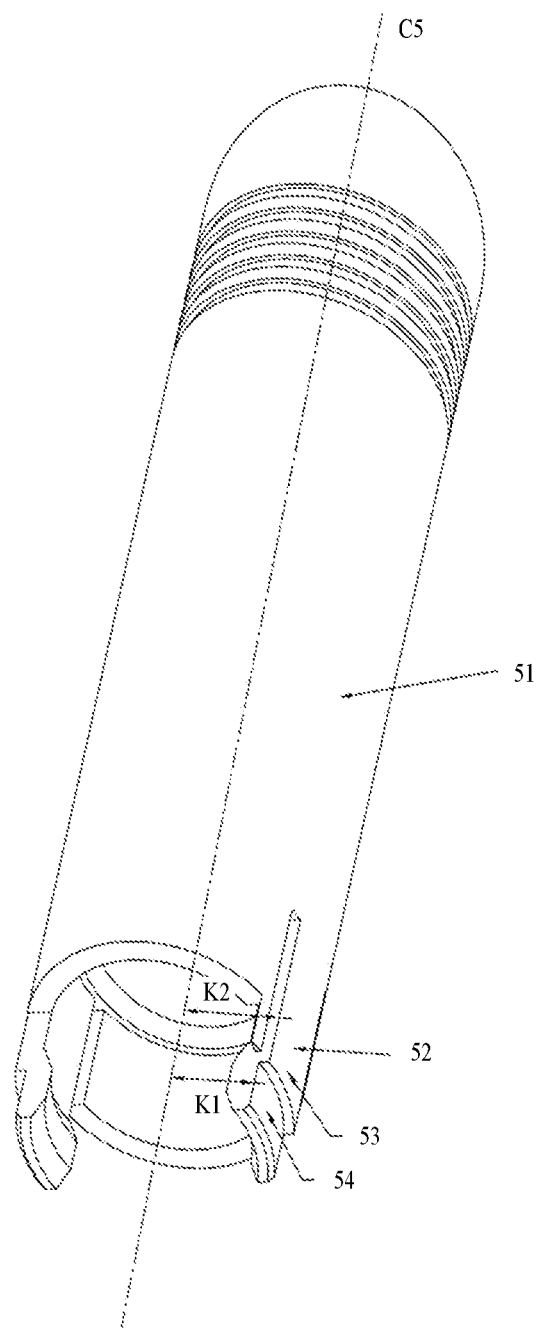
FIG. 31 is a schematic three-dimensional diagram of a dustproof cap of a fiber connector plug according to a first embodiment of this application.

Referring to FIG. 31, the dustproof cap 50 of the fiber connector plug 100 provided in this implementation includes a cap body 51 and an elastic arm 52. The cap body 51 is hollow and is disposed with an opening. The elastic arm 52 is formed in a position of the opening of the cap body 51. The cap body 51 is a centrosymmetric structure and is disposed with a central axis C5. There are two elastic arms 52 disposed opposite to each other on two sides of the central axis C5. Along the axial direction, a first fitting part 53 and a second fitting part 54 are disposed at an end that is of the elastic arm 52 and that is away from the cap body 51. The first fitting part 53 is located between the second fitting part 54 and the elastic arm 52. A vertical distance K2 between the first fitting part 53 and the central axis C5 is greater than a distance K1 between the second fitting part 54 and the central axis C5.

In a use state, the dustproof cap 50 covers a periphery of the front cover 21, and the elastic arm 52 extends into the locking groove formed between the fitting surface 42 of the sliding member 40 and the outer surface of the main housing 22; through a fit between the elastic arm 52 and the fitting surface 42, the first fitting part 53 abuts against the first area 421, and the second fitting part 54 abuts against the second area 422; and the dustproof cap 50 is fastened to the fiber connector plug 100 using clamping force applied by the fitting surface 42 to the first fitting part 53 and the second fitting part 54. When the dustproof cap 50 needs to be removed, the sliding member 40 is moved toward the tail end B of the main shaft 223, such that the first area 421 leaves the first fitting part 53 and the second area 422 leaves the second fitting part 54. When the first area 421 directly faces the second fitting part 54 in the radial direction, unlocking between the fiber connector plug 100 and the dustproof cap 50 can be implemented.

For an assembly and fit relationship between the elements in the fiber connector plug 100 provided in the first embodiment, refer to the following description (referring to FIG. 4, FIG. 5, and FIG. 6, the description is provided in an assembly sequence in a possible implementation).

The rear end of the fastener 222 is inserted into the main shaft 223 from an opening position of the front end of the main shaft 223, and the clasp part 2223 on the elastic clasp arm 2222 on the fastener 222 fits the limiting step 2239 on the inner surface of the main shaft 223 to fasten the fastener 222 and the main shaft 223. The front end of the fastener 222 is exposed to the front end of the main shaft 223. In this application, the fastener 222 and the main shaft 223 are designed to be a split structure, and are therefore easy to manufacture and also relatively easy to assemble. In addition, the fastener 222 is fastened to the main shaft 223 by extending into the internal space of the main shaft 223, and the fastener 222 occupies the internal space of the main shaft 223, without increasing a peripheral size of the main shaft 223, thereby facilitating the miniaturization design. In another implementation, alternatively, the fastener 222 and the main shaft 223 may be an integrated structure, that is, the front end of the main shaft 223 is directly integrally formed as a front end of the fastener 222. Although a manufacturing process of the integrated structure is more complex than that of the split architecture, the integrated structure of the fastener 222 and the main shaft 223 has an advantage of lightness and thinness, where "thin" refers to a radial size, because in the radial direction, the fastener 222 and the main shaft 223 are not assembled and connected in an overlapping manner.

The fiber 11 passes through the main shaft 223 and the fastener 222, a part of the fiber core 111 at the front end of the fiber 11 is inserted into the fiber core fastening hole 1251 of the ferrule 12, and the fiber core 111 is fastened to the ferrule 12 using curing glue.

Referring to FIG. 20 and FIG. 21, the ferrule 12 extends into and passes through the mounting member 221 from the rear end of the mounting member 221. The first limiting face 1244 of the first stop structure 1242 on the ferrule 12 abuts against the second limiting face 2215 of the second stop structure 2213 on the inner surface of the mounting member 221, and the first plane 1243 of the first limiting structure 1241 on the ferrule 12 is in contact with the contact face 2216 of the second stop structure 2213 on the mounting member 221. In this way, the ferrule 12 is connected to the mounting member 221, and the first elastic member 60 is sleeved over the rear section 125 of the ferrule 12.

The mounting member 221 on which the ferrule 12 and the first elastic member 60 are mounted is connected to the main shaft 223. For example, the threaded part 2219 at the rear end of the mounting member 221 is fitted to the external thread 2221 at the front end of the fastener 222, such that the mounting member 221 is fastened to the main shaft 223. In this state, the bump 2232 on the front end face 2231 of the main shaft 223 extends into the second cut 2218 on the rear end face of the mounting member 221. The first elastic member 60 abuts between the positioning face 1245 of the first stop structure 1242 of the ferrule 12 and a front end face of the fastener 222.

The front cover 21 is sleeved from one side of the front end of the ferrule 12 to the periphery of the mounting member 221, and the second plane 2142 of the second limiting structure 214 in the front cover 21 is in contact with the first plane 1243 of the first limiting structure 1241 of the ferrule 12. In this state, the second plane 2142 of the front cover 21 is coplanar with the contact face 2216 of one of the second stop structures 2213 of the mounting member 221. The second plane 2142 of the front cover 21 and the contact face 2216 of the other second stop structure 2213 of the mounting member 221 are disposed opposite to each other on two sides of the ferrule 12. The elastic clamping hook 2212 on the mounting member 221 fits the hole 215 on the front cover 21, to fasten the front cover 21 and the mounting member 221. In this state, the bump 2232 on the front end face 2231 of the main shaft 223 extends into the first cut 216 on the rear end face of the front cover 21 to position the front cover 21 and the main shaft 223 in the circumferential direction. The rear end face 212 of the front cover 21 is coplanar with the rear end face 2214 of the mounting member 221. The first cut 216 directly faces the second cut 2218 in the radial direction, and the bump 2232 on the main shaft 223 fits both the first cut 216 and the second cut 2218.

The front end face 121 of the ferrule 12 is flush with the front end face 211 of the front cover 21, or the front end face 121 of the ferrule 12 is located between the front end face 211 of the front cover 21 and the rear end face 43 of the front cover 21 in the axial direction. It may also be understood that the vertical projection of the front end face 121 of the ferrule 12 on the front cover 21 is located on the front end face 211 of the front cover 21 or the inner surface of the front cover 21.

Referring to FIG. 5 and FIG. 6, the front end face of the sliding member 40 faces the tail end of the main shaft 223 (the fiber needs to pass through the sliding member 40), and the sliding member 40 is sleeved over the outer surface of the main shaft 223. The second sliding guide structure 44 on the inner surface of the sliding member 40 fits the first sliding guide structure 2236 on the outer surface of the main shaft 223, such that the sliding member 40 and the main shaft 223 are positioned in the circumferential direction. The second sliding guide structure in this implementation is a groove structure. A position indicated by a reference numeral 44 in FIG. 6 represents an inner wall of the groove, and the first sliding guide structure 2236 is accommodated in the groove. Referring to FIG. 28 and FIG. 29, a position between the sliding member 40 and the main shaft 223 is defined in the axial direction through a fit between the second limiting step 4421 of the second limiting part 442 of the sliding member 40 and the first limiting step 22363 of the first limiting part 22362 on the outer surface of the main shaft 223.

The second elastic member 70 is sleeved over the main shaft 223, and one end of the second elastic member 70 is mounted in a space between the sliding member 40 and the main shaft 223 and abuts against the step positioning face 45 of the inner surface of the sliding member 40.

The fastening base 224 is mounted to the fastening part 2237 on the main shaft 223, a front end of the fastening base 224 abuts against the other end of the second elastic member 70, and the fastening base 224 partially extends into the space between the sliding member 40 and the main shaft 223. In this state, the second elastic member 70 is in a compressed state and pushes the sliding member 40 to the first position using elastic force, that is, a position of a fit between the second limiting step 4421 of the second limiting part 442 of the sliding member 40 and the first limiting step 22363 of the first limiting part 22362 on the outer surface of the main shaft 223.

The sliding member 40 can slide between the first position and the second position. The second position may be determined using a limiting structure on the main shaft 223, or the second position may not have a determined position provided that in the axial direction, the sliding member 40 is located on a side that is of the first position and that is away from the ferrule. Referring to FIG. 5, the sliding member 40 and the locking part 2235 on the main shaft 223 together form a first locking structure L1, and the first locking structure L1 is used to fit the second locking structure on the fiber adapter 200, to fasten the fiber connector plug 100 to the fiber connector plug. When the sliding member 40 is located in the first position, the sliding member 40 fits the locking part 2235 to lock the second locking structure. When the sliding member 40 is located in the second position, unlocking between the locking part 2235 and the second locking structure is implemented. A locking groove 47 is formed between the fitting surface 42 of the sliding member 40 and the outer surface of the main housing 22. The locking groove 47 is used to fit an elastic arm of the second locking structure. An opening of the locking groove 47 is located between the front end face 41 of the sliding member 40 and the outer surface of the main housing 22. It may be understood that the fitting surface 42 is an inner wall of the locking groove 47. The fitting surface 42 faces the main housing 22. The first area 421 is located between the second area 422 and the opening of the locking groove. A vertical distance between the first area 421 and the main housing 22 is greater than a vertical distance between the second area 422 and the main housing 22. When the sliding member 40 is located in the first position, the first area 421 is disposed opposite to the locking part 2235, and the second area 422 is disposed opposite to the outer surface of the main housing 22. When the sliding member 40 is located in the second position, the fitting surface 42 (including the first area 421 and the second area 422) is disposed opposite to the outer surface of the main housing 22.

After the sliding member 40 and the fastening base 224 are mounted to the main shaft 223, the position of the fiber is adjusted. The through hole 2238 at the tail end B of the main shaft 223 corresponds to an exposed part of the reinforced layer 112 of the fiber 11. Glue is dispensed in the through hole 2238 at the tail end B of the main shaft 223. The reinforced layer 112 of the fiber 11 is fastened to the inner surface of the main shaft 223 using the glue. In this application, the through hole 2238 for glue filling is disposed at the tail end B of the main shaft 223, and the fiber is fastened through glue pouring. The glue fills a gap between the reinforced layer 112 and the main shaft 223, a surface structure form of the reinforced layer 112 is further utilized, and a surface of the reinforced layer 112 has a space for glue pouring. Therefore, the glue can be fully in contact with the fiber 11 and the main shaft 223, and a fastening effect is improved. In addition, the miniaturization design is facilitated by removing some materials from the main shaft 223 and fastening the fiber inside the main shaft 223 without occupying any space outside the main shaft. In addition, filling the glue in the gap between the main shaft 223 and the fiber 11 can further sealingly connect the fiber 11 to the main shaft 223, such that disposing of the through hole does not cause a poor sealing effect. To ensure the sealing effect, the heat shrink tube 226 is sleeved in the position of the tail end B of the main shaft 223, such that a part of the heat shrink tube 226 is fastened on the outer surface of the tail end of the main shaft 223. The other part of the heat shrink tube 226 is fastened to an outer layer 113 of a part that is of the fiber 11 and that does not extend into the main shaft 223. The tail sleeve 225 is fastened to a periphery of the heat shrink tube 226, and the front end of the tail sleeve 225 is fastened in the fastening groove 2242 at the rear end of the fastening base 224. An outer surface of the tail sleeve 225 may be imprinted with a one-dimensional bar code using a technology such as mold printing or laser marking, for visual recognition.

The sealing structure 30 is sleeved in the sealing groove 2234, and when the fiber connector plug 100 is inserted into the fiber adapter 200, the sealing ring is sealingly connected between the main shaft 223 and the inner surface of the fiber adapter 200. The fiber connector plug 100 provided in this implementation is a fiber connector plug 100 used outdoors, and has a sealing requirement. According to this application, the front end of the main shaft 223 extends into the fiber adapter 200 to implement sealing using the sealing structure 30, and the tail end of the main shaft 223 sealingly connects the main shaft 223 to the fiber using the heat shrink tube 226. In this way, only one sealing structure 30 needs to be disposed at the front end of the main shaft 223 to sealingly connect the fiber connector plug 100 to the fiber adapter 200.

The following describes in detail the fiber adapter 200 fitting the fiber connector plug 100 provided in the first embodiment.

Figure 32:
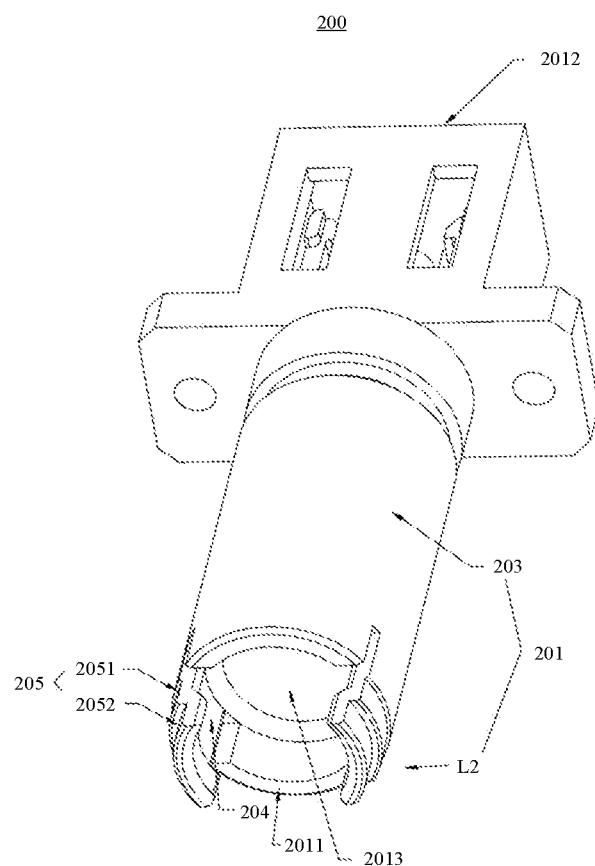
FIG. 32 is a schematic three-dimensional diagram of a fiber adapter according to a first embodiment of this application.
Figure 33:
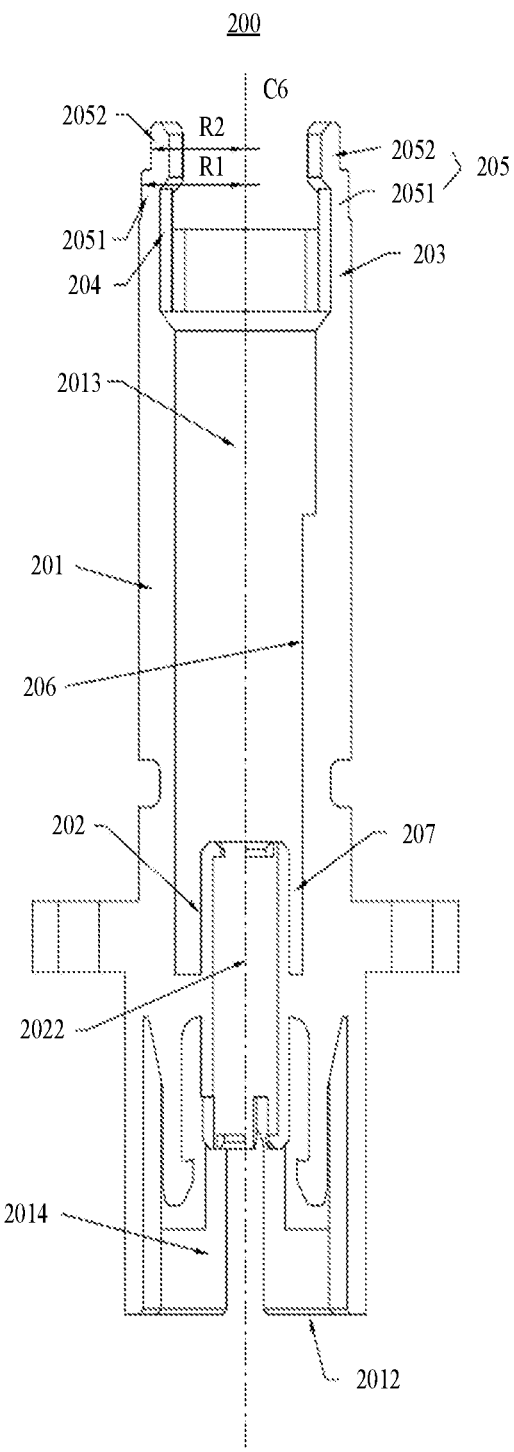
FIG. 33 is a cross-sectional view of a fiber adapter according to an implementation in a first embodiment of this application.

Referring to FIG. 32 and FIG. 33, the fiber adapter 200 includes a body sleeve 201 and a ferrule sleeve 202. The ferrule sleeve 202 is connected inside the body sleeve 201. The ferrule sleeve 202 and the body sleeve 201 may be an integrated structure. The body sleeve 201 includes a first end face 2011 and a second end face 2012. A first accommodating space 2013 located on an inner side of the first end face 2011 and a second accommodating space 2014 located on an inner side of the second end face 2012 are formed inside the body sleeve 201. A first opening for the first accommodating space 2013 to communicate with the outside is disposed on the first end face 2011. A second opening for the second accommodating space 2014 to communicate with the outside is disposed on the second end face 2012. A ferrule accommodating space 2022 is disposed in the ferrule sleeve 202, and the ferrule accommodating space 2022 is located between the first accommodating space 2013 and the second accommodating space 2014, and communicates with the first accommodating space 2013 and the second accommodating space 2014. The first accommodating space 2013 is used to accommodate one fiber connector plug 100. The second accommodating space 2014 is used to accommodate another fiber connector plug 100. The ferrule accommodating space 2022 in the ferrule sleeve 202 is used to accommodate ferrules of the two fiber connector plugs. In the fiber adapter 200 provided in this implementation, the first accommodating space 2013 is used to insert an outdoor fiber connector plug (that is, the fiber connector plug 100 provided in the first embodiment). The second accommodating space 2014 is used to insert an indoor fiber connector plug. An internal structure of the second accommodating space 2014 and a specific architecture of the indoor fiber connector plug are not limited in this application.

The body sleeve 201 includes a body part 203 and a second locking structure L2. The second locking structure L2 is disposed at one end of the body part 203. The second locking structure L2 is located in a first opening position in which the first accommodating space 2013 communicates with the outside. The second locking structure L2 includes a clamping groove 204 and an elastic arm 205. The elastic arm 205 is connected to one end of the body part 203. In an axial direction, the body part 203 is located between the ferrule sleeve 202 and the elastic arm 205, and the clamping groove 204 is located on an inner surface of the body sleeve 201. The elastic arm 205 of the fiber connector plug 100 extends from one end of the body part 203 along the axial direction of the body sleeve 201. The elastic arm 205 includes a first section 2051 and a second section 2052. The first section is connected between the second section 2052 and the body part 203. An outer surface of the elastic arm 205 is a surface that is of the elastic arm 205 and that is away from the first accommodating space 2013.

Referring to FIG. 33, a vertical distance R1 from an outer surface of the first section 2051 to a central axis C6 of the body sleeve 201 is greater than a vertical distance R2 from an outer surface of the second section 2052 to the central axis C6 of the body sleeve 201. For example, a part of the clamping groove 204 is located on an inner surface of the body part 203, and a part of the clamping groove 204 is located on an inner surface of the elastic arm 205 (such as an inner surface of the first section 2051). In a radial direction of the body sleeve 201, the first section 2051 directly faces the part of the clamping groove 204, and the second section 2052 is located in a periphery of the clamping groove 204.

Figure 34:
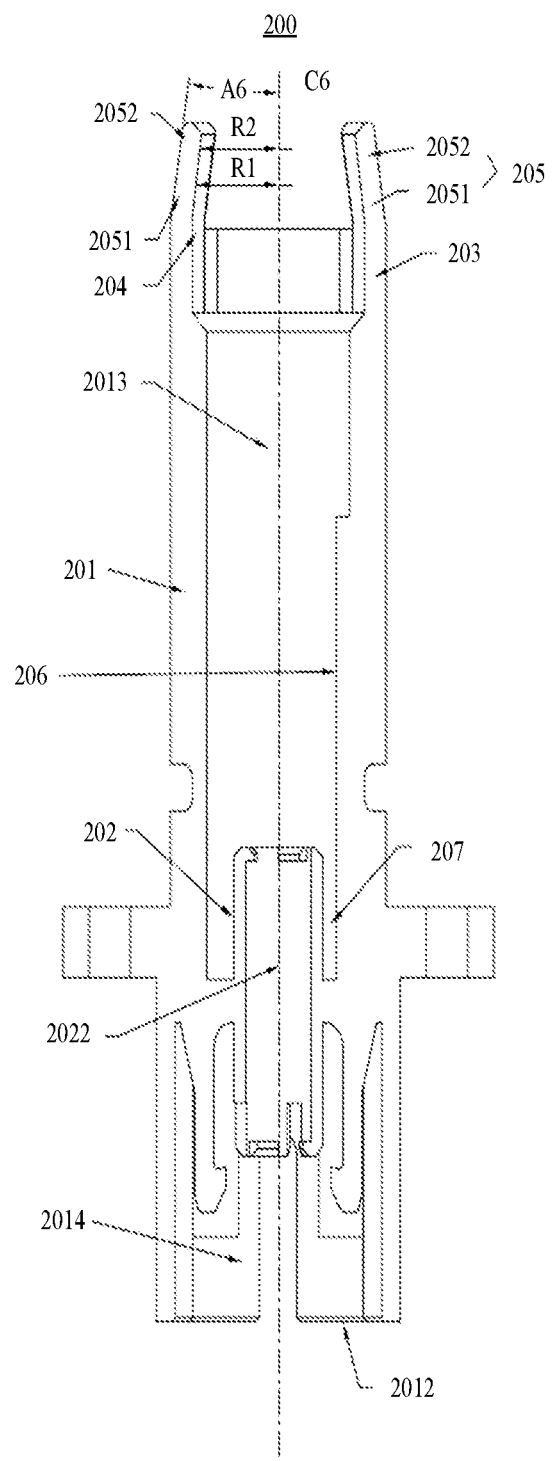
FIG. 34 is a cross-sectional view of a fiber adapter according to another implementation in a first embodiment of this application.

In an implementation, as shown in FIG. 33, the outer surface of the elastic arm 205 is in a stepped shape, that is, a stepped surface is formed between the first section 2051 and the second section 2052. In another implementation, as shown in FIG. 34, an extension direction from the body part 203 to an end that is of the second section 2052 and that is away from the body part 203 is an extension direction of the elastic arm 205, and an included angle A6 is formed between the extension direction of the elastic arm 205 and the axial direction of the body sleeve 201. FIG. 34 schematically shows oblique extension of the elastic arm 205 relative to the axial direction. The specific oblique angle A6 may be set based on a related feature (that is, a fitting surface) on a sliding member of a specific fiber connector plug.

In an implementation, an etched structure is disposed on the outer surface of the first section 2051 and/or the outer surface of the second section 2052; or a protruding part is disposed on the outer surface of the elastic arm 205, and the protruding part is used to fit the groove on the sliding member 40 of the fiber connector plug 100.

Referring to FIG. 33 and FIG. 34, a guide key 206 is disposed on the inner surface of the body part 203 of the body sleeve 201. In this implementation, the guide key 206 protrudes toward the first accommodating space 2013, and the guide key 206 is used to fit the first guide structure 213 on the front cover 21 and provide guidance in a process of inserting the fiber connector plug 100 into the fiber adapter 200. A first slot 207 is formed between the body sleeve 201 and the ferrule sleeve 202, and the first slot 207 is used to accommodate the front cover 21 of the fiber connector plug 100. According to the fiber adapter 200 provided in this application, the first slot 207 between the body sleeve 201 and the ferrule sleeve 202 fits the front cover 21 of the fiber connector plug 100, the inner surface of the body sleeve 201 is in contact with and fits the outer surface of the front cover 21, and the guide key 206 is used to fit the first guide structure 213 on the front cover 21, to implement matching between the fiber adapter 200 and the fiber connector plug 100. The structure of the fiber adapter 200 is simplified, alignment of the fiber connector plug 100 inserted into the fiber adapter 200 is implemented using the first slot 207 and the inner surface of the body sleeve 201, and a radial size may be designed to match the front cover 21 of the fiber connector plug 100. Therefore, the fiber connector plug 100 has an advantage of a small size.

Figure 35:
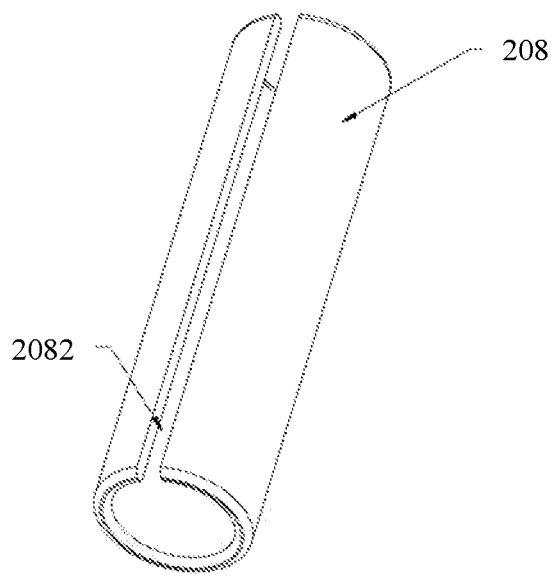
FIG. 35 is a schematic three-dimensional diagram of a ceramic sleeve of a fiber adapter according to a first embodiment of this application.

Referring to FIG. 35, the fiber adapter 200 provided in this application further includes a ceramic sleeve 208, and the ceramic sleeve 208 is mounted inside the ferrule sleeve 202. The ceramic sleeve 208 is disposed with a cut 2082. The cut 2082 extends from one end of the ceramic sleeve 208 to the other end along the axial direction. Disposing of the cut 2082 makes a radial size of the ceramic sleeve 208 adjustable, such that a close fit between the ceramic sleeve 208 and the ferrule sleeve 202 can be implemented. An internal space of the ceramic sleeve 208 is used to accommodate the ferrule.

Figure 37:
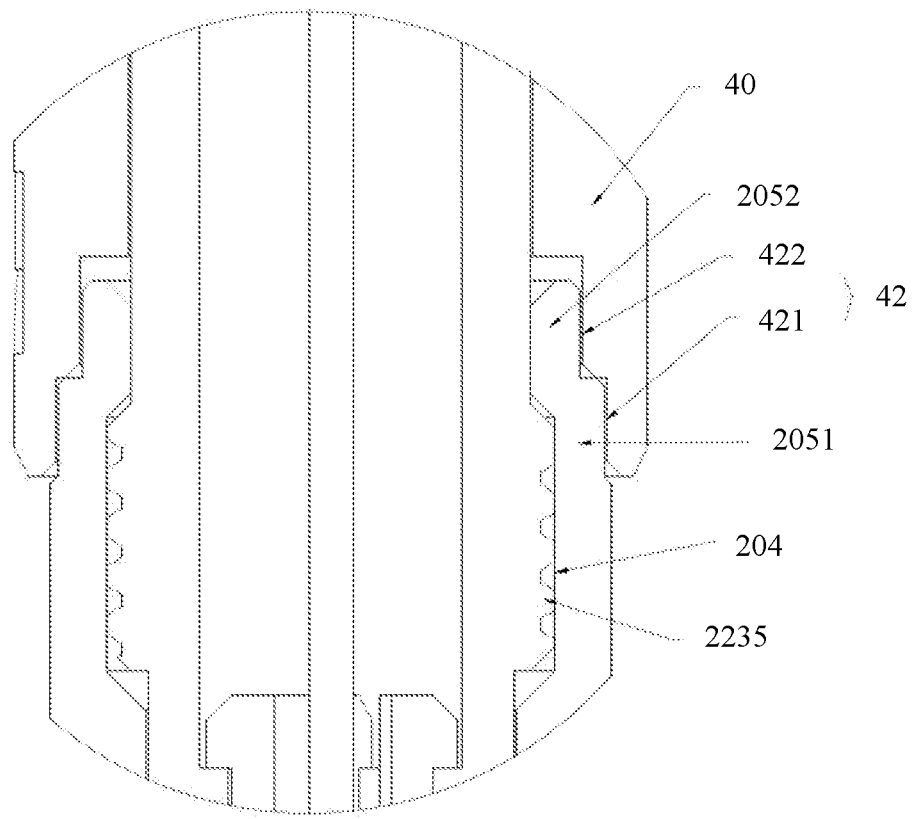
FIG. 37 is an enlarged schematic diagram of a part I in FIG. 36.
Figure 36:
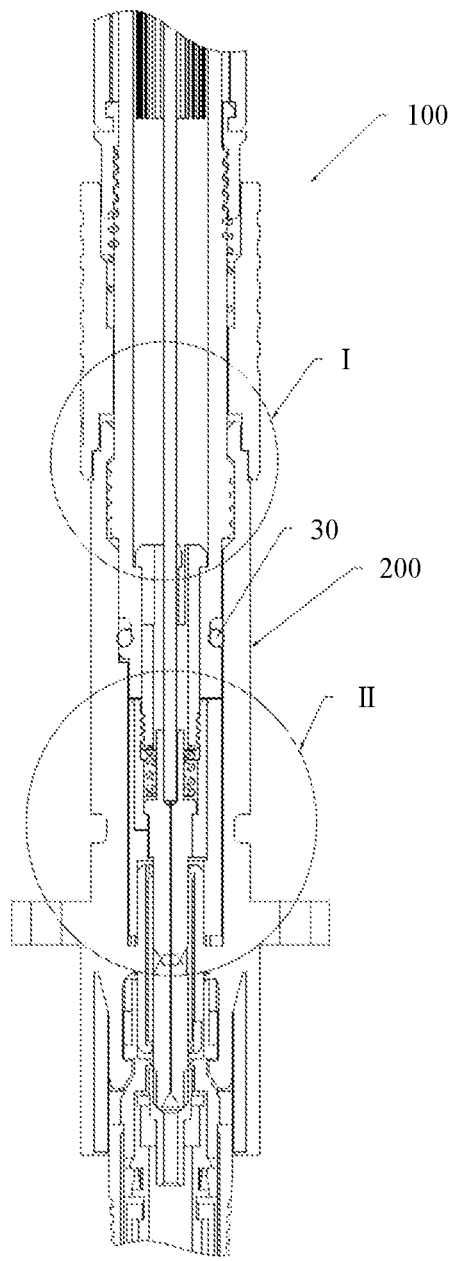
FIG. 36 is a schematic cross-sectional diagram after a fiber connector plug is inserted into a corresponding fiber adapter according to a first embodiment of this application.

FIG. 36 is a schematic cross-sectional diagram after the fiber connector plug 100 is inserted into the corresponding fiber adapter 200 according to a first implementation of this application. FIG. 37 is an enlarged schematic diagram of a part I in FIG. 36, and FIG. 38 is an enlarged schematic diagram of a part II in FIG. 36.

Figure 39:
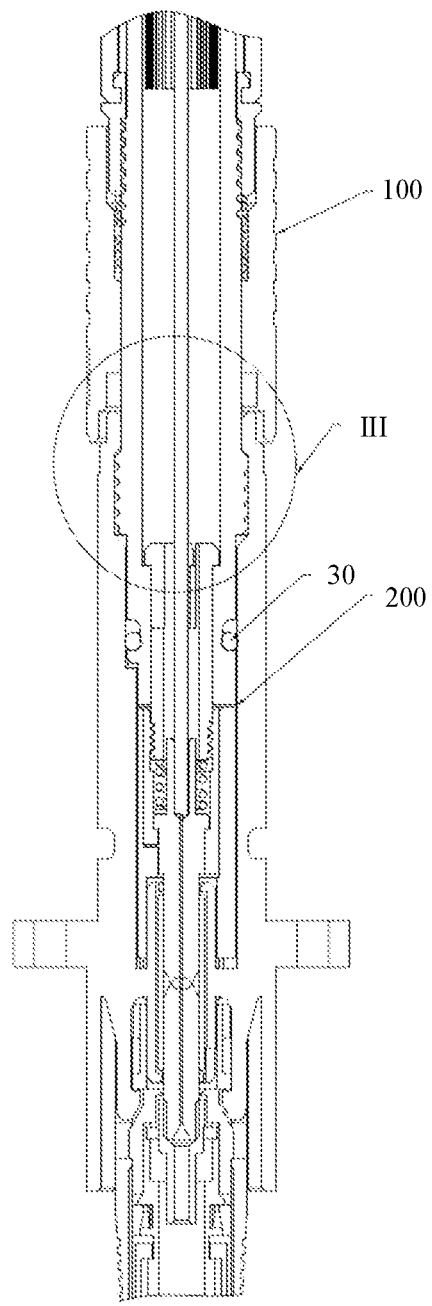
FIG. 39 is another schematic cross-sectional diagram after a fiber connector plug is inserted into a corresponding fiber adapter according to a first embodiment of this application.
Figure 40:
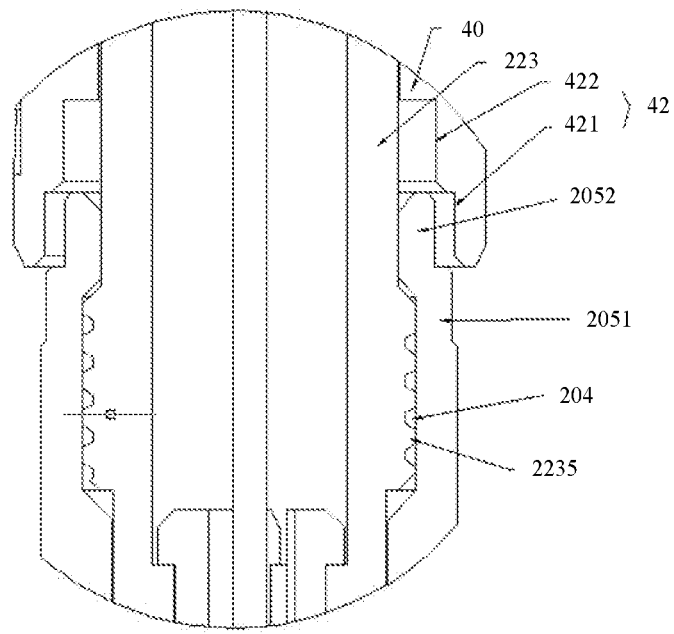
FIG. 40 is an enlarged schematic diagram of a part III in FIG. 39.

FIG. 39 is another schematic cross-sectional diagram after the fiber connector plug 100 is inserted into the corresponding fiber adapter 200 according to the first implementation. FIG. 40 is an enlarged schematic diagram of a part III in FIG. 39.

It can be seen from FIG. 36 that, in the fiber adapter 200, the sealing structure 30 sealingly connects the fiber connector plug 100 to the corresponding fiber adapter 200.

Figure 38:
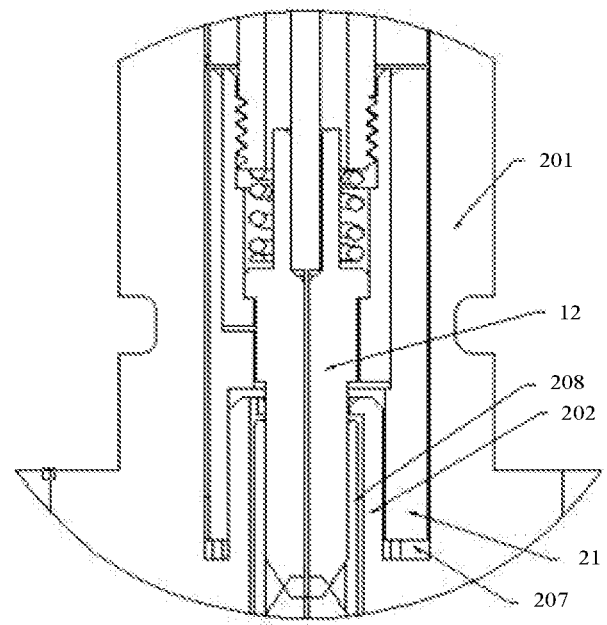
FIG. 38 is an enlarged schematic diagram of a part II in FIG. 36.

As shown in FIG. 38, after the fiber connector plug 100 is inserted into the fiber adapter 200, the front cover 21 of the fiber connector plug 100 is inserted into the slot 207, the ferrule 12 is inserted into the ferrule sleeve 202 and is encircled by the ceramic sleeve 208, and the outer surface of the front cover 21 is in contact with the inner surface of the body sleeve 201.

FIG. 36 shows a locked state after the fiber connector plug 100 is inserted into the fiber adapter 200. As shown in FIG. 37, the sliding member 40 is located in the first position, and the locking part 2235 of the fiber connector plug fits the clamping groove 204 of the fiber adapter. The first area 421 of the fitting surface 42 abuts against the first section 2051 of the elastic arm 205, and the second area 422 of the fitting surface 42 abuts against the second section 2052 of the elastic arm 205, to implement a two-step locking structure.

FIG. 39 shows an unlocked state after the fiber connector plug 100 is inserted into the fiber adapter 200. As shown in FIG. 40, the sliding member 40 is located in the second position, and the first area 421 of the fitting surface 42 is located in a periphery of the second section 2052 of the elastic arm 205. In addition, there is no abutting relationship between the first area 421 and the second section 2052. The first area 421 and the second section 2052 are detached from each other, a gap is formed between the first area 421 and the second section 2052, and the second area 422 directly faces the outer surface of the main shaft 223 of the fiber connector plug 100. A gap is formed between the fitting surface 42 and the elastic arm 205, and the elastic arm 205 may be opened. Therefore, in this case, although the locking part 2235 of the fiber connector plug is located in the clamping groove 204 of the fiber adapter, the fiber connector plug 100 can still be pulled out of the fiber adapter 200.

The following describes in detail a fiber connector plug provided in a second embodiment.

Figure 41:
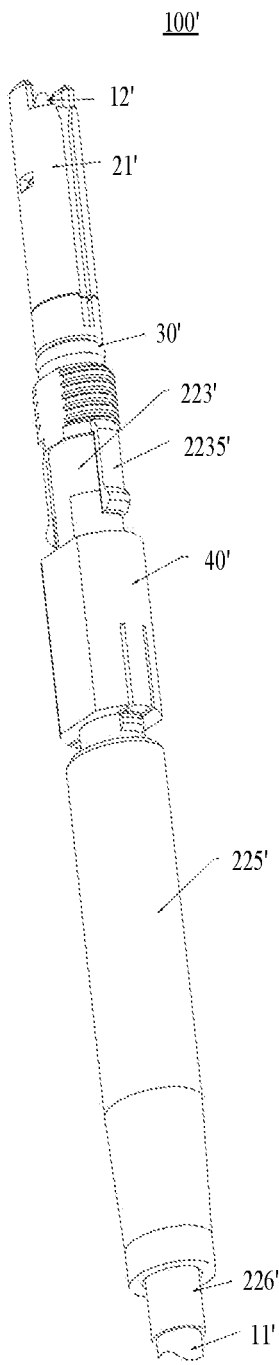
FIG. 41 is a schematic three-dimensional diagram of a fiber connector plug according to a second embodiment of this application.
Figure 42:
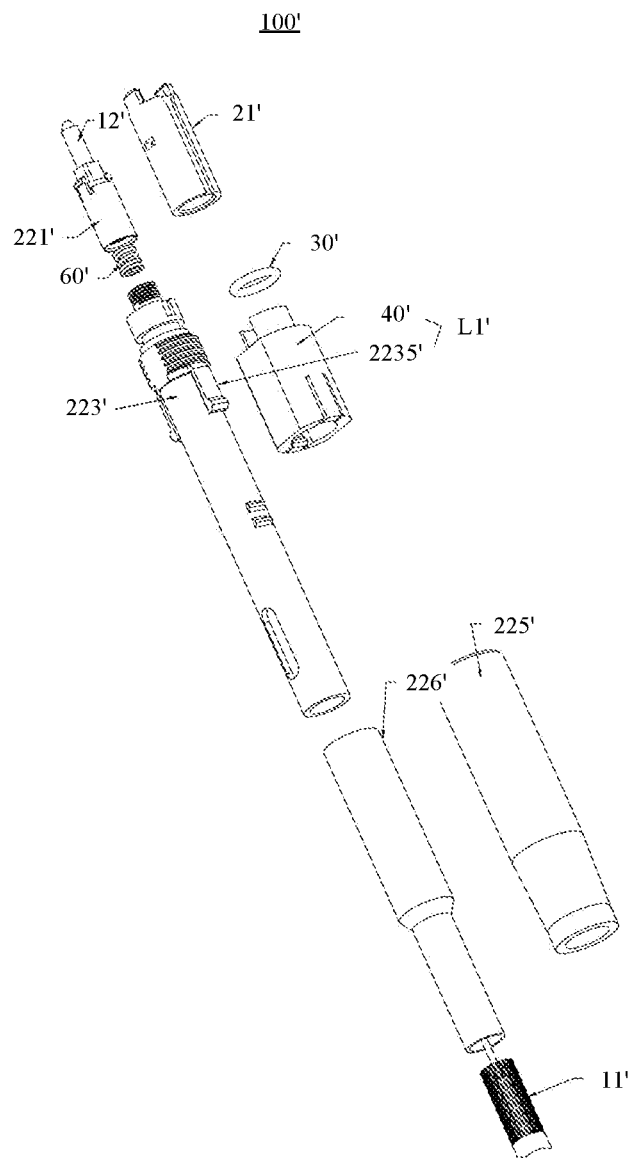
FIG. 42 is a schematic three-dimensional exploded diagram of a fiber connector plug according to a second embodiment of this application.

FIG. 41 is a three-dimensional diagram of a fiber connector plug 100' provided in the second embodiment. FIG. 42 is a three-dimensional exploded diagram of the fiber connector plug 100' provided in the second embodiment. Referring to FIG. 41 and FIG. 42, the fiber connector plug 100' includes a fiber 11', a ferrule 12', a front cover 21', a mounting member 221', a main shaft 223', a tail sleeve 225', a heat shrink tube 226', a sealing structure 30', a sliding member 40', and a first elastic member 60'. A locking part 2235' is disposed on the main shaft 223', and the locking part 2235' and the sliding member 40' form a first locking structure L1'.

A difference between the fiber connector plug 100' provided in the second embodiment and the fiber connector plug 100 provided in the first embodiment lies in a structure of the main shaft 223' and a structure of the sliding member 40'. The following describes in detail a structural feature that is of the main shaft 223' and that is different from a structural feature of the main shaft in the fiber connector plug 100 provided in the first embodiment.

Figure 43:
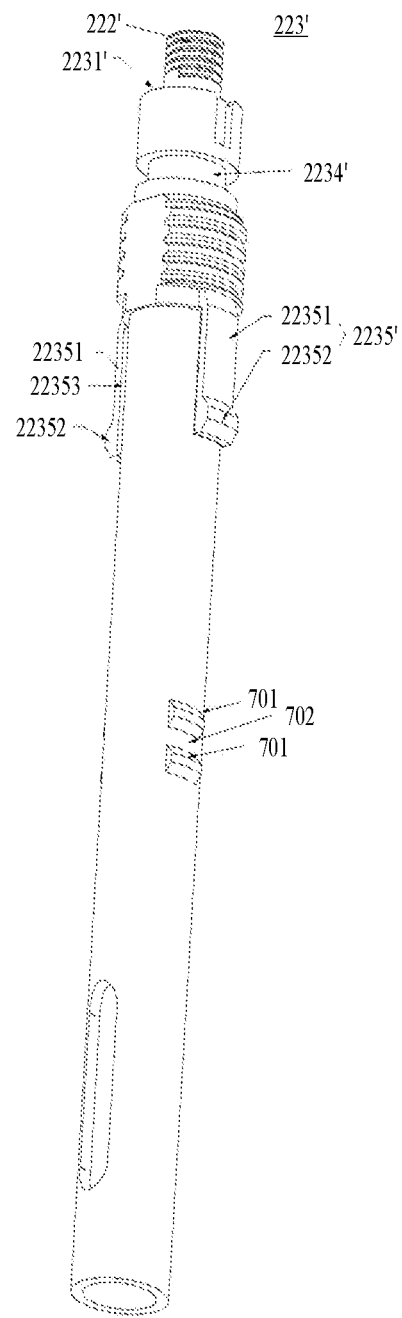
FIG. 43 is a schematic three-dimensional diagram of a main shaft of a fiber connector plug according to a second embodiment of this application.
Figure 44:
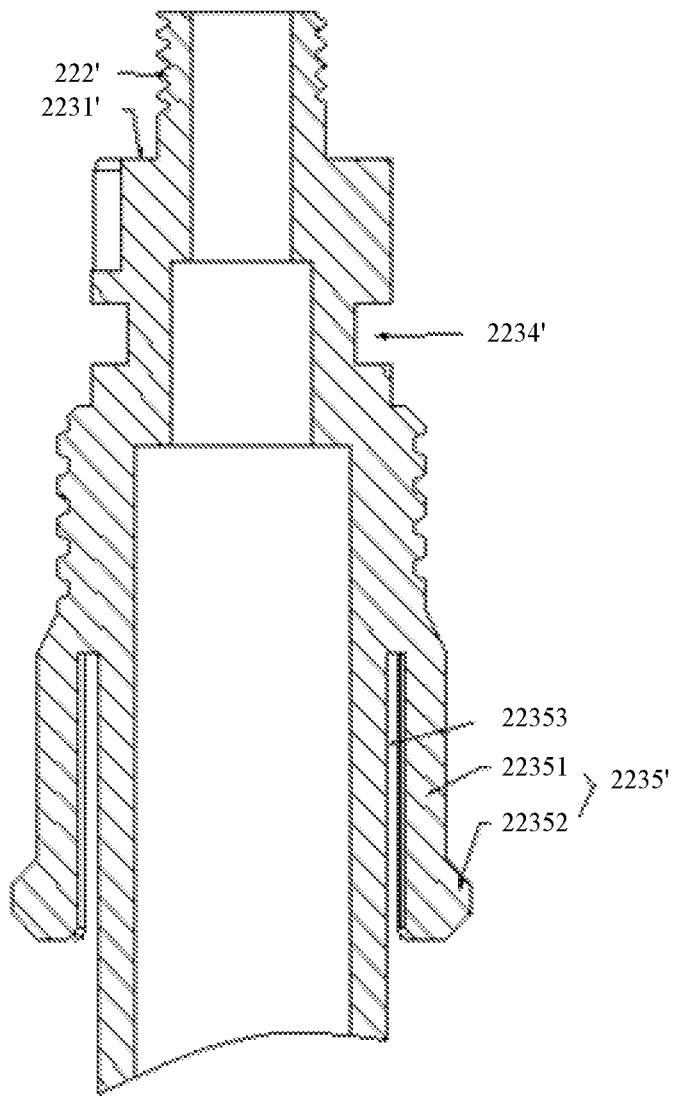
FIG. 44 is a partially enlarged cross-sectional view of a main shaft of a fiber connector plug according to a second embodiment of this application.
Figure 45:
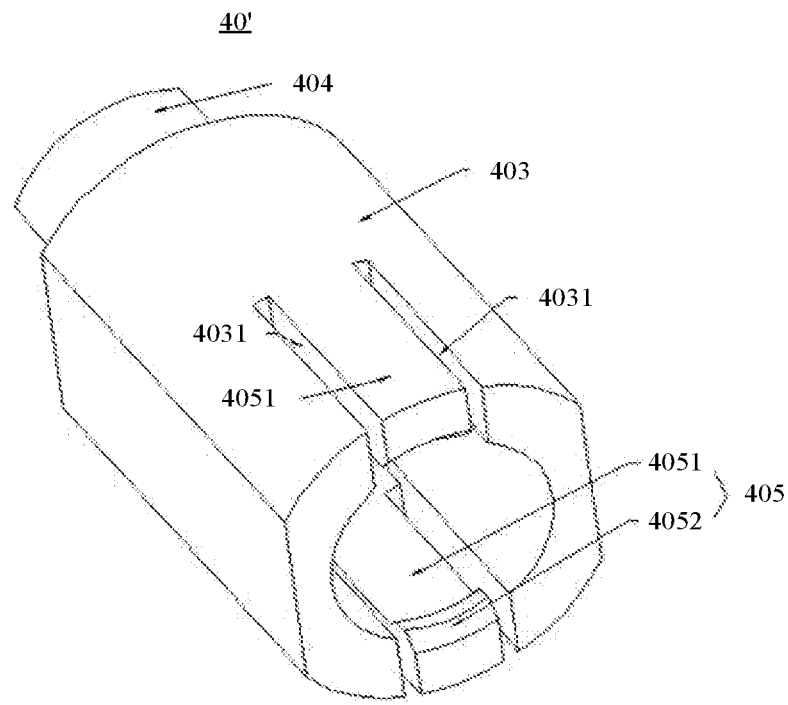
FIG. 45 is a schematic three-dimensional diagram of a sliding member of a fiber connector plug according to a second embodiment of this application.
Figure 46:
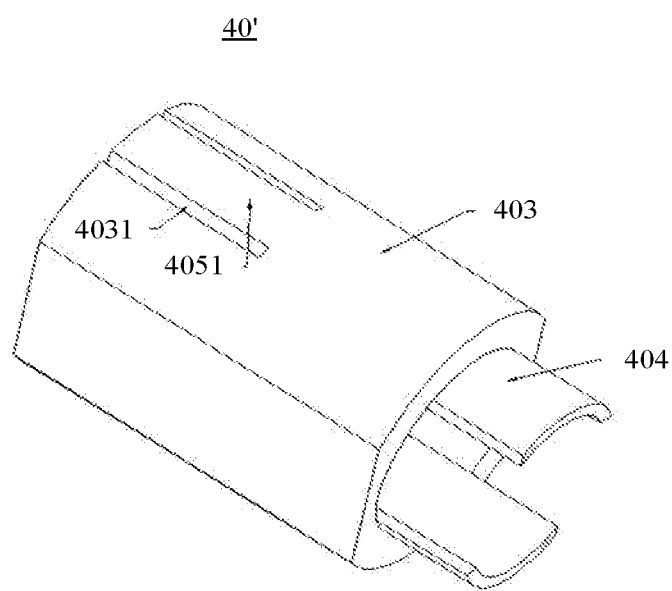
FIG. 46 is a schematic three-dimensional diagram of a sliding member of a fiber connector plug in another direction according to a second embodiment of this application.
Figure 47:
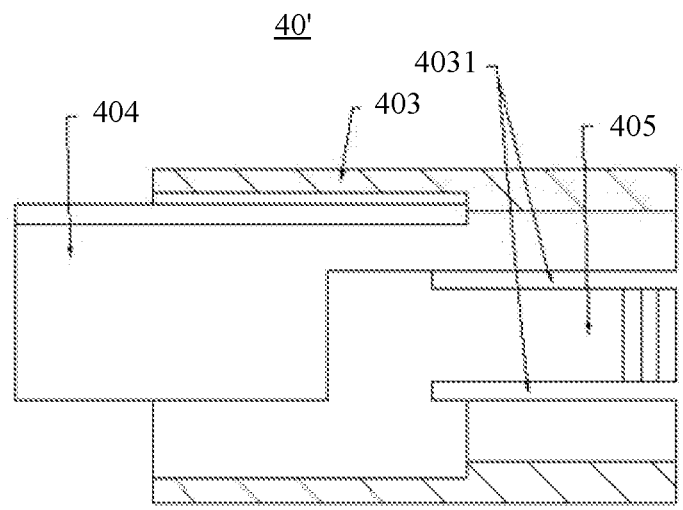
FIG. 47 is a cross-sectional diagram of a sliding member of a fiber connector plug in one direction according to a second embodiment of this application.
Figure 48:
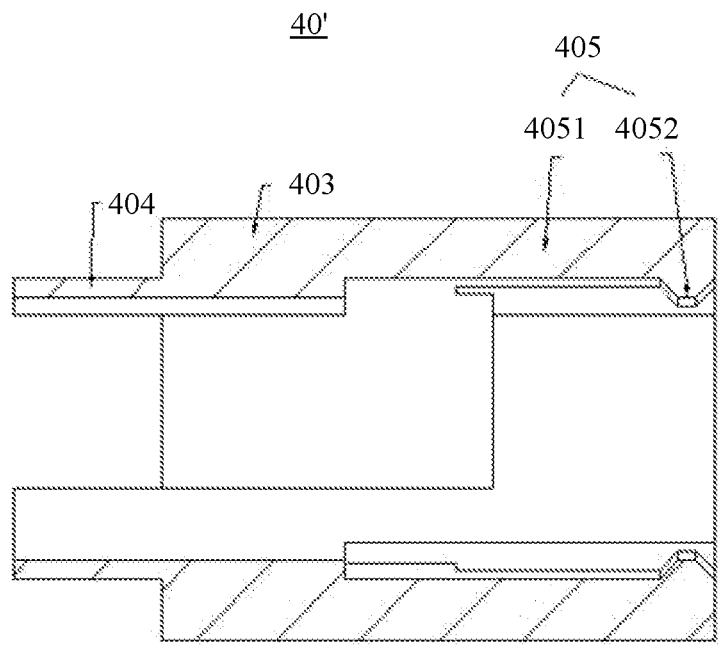
FIG. 48 is a cross-sectional diagram of a sliding member of a fiber connector plug in another direction according to a second embodiment of this application.

Referring to FIG. 43 and FIG. 44, the fiber connector plug 100' provided in this implementation does not include the fastener 222 independent of the main shaft in the fiber connector plug 100 provided in the first embodiment. It may be understood that in this implementation, a structural feature similar to a fastener function is integrated on the main shaft 223'. To be more specific, a protruding ring structure 222' integrally formed to an inner surface of the main shaft 223' is disposed at an inner edge of a front end face 2231' of the main shaft 223', and an outer surface of the protruding ring structure 222' is disposed with a screw thread for connecting the mounting member 221'.

The locking part 2235' disposed on an outer surface of the main shaft 223' is located on a side that is of a sealing groove 2234' and that is away from the front end face 2231'. The locking part 2235' includes an elastic arm 22351 and a clamping block 22352. One end of the elastic arm 22351 is fastened to the outer surface of the main shaft 223'. For example, one end of the elastic arm 22351 and the main shaft 223' are an integrated structure. Only one end of the elastic arm 22351 is connected to the main shaft 223', a remaining part of the elastic arm is an architecture disconnected from and opposite to the main shaft 223', and a gap 22353 is disposed between the elastic arm 22351 and the main shaft 223'. The clamping block 22352 is fastened to the other end of the elastic arm 22351, an end at which the elastic arm 22351 is connected to the main shaft 223' is a connection end, and the clamping block 22352 is located in a position that is on the elastic arm 22351 and that is away from the connection end. The clamping block 22352 protrudes from a surface that is of the elastic arm 22351 and that is away from the main shaft 223'. There are two locking parts 2235' symmetrically distributed on two opposite sides of the main shaft 223'.

A clamping structure 701 is further disposed on the outer surface of the main shaft 223', and the clamping structure 701 is used to fit the sliding member 40', to limit the sliding member 40' to a first position. For example, the clamping structure 701 is a limiting block protrudingly disposed on the outer surface of the main shaft 223'. There are two clamping structures 701, and the clamping structures are spaced apart, that is, a limiting groove 702 is formed between the two clamping structures 701.

Referring to FIG. 45, FIG. 46, FIG. 47, and FIG. 48, the sliding member 40' includes a sliding body 403 slidably connected to the main shaft 223' and a stop structure 404 connected to one end of the sliding body 403. The sliding body 403 is sleeve-shaped. The stop structure 404 extends from an inner surface of one end of the sliding body 403. The stop structure 404 is in an arc-shaped sheet-like structure, and the stop structure 404 can slide into the gap 22353. There are also two stop structures 404 symmetrically distributed on two opposite sides of the sliding body 403. The sliding member 40' includes a sliding positioning structure 405. The sliding positioning structure 405 includes a connection part 4051 connected to the sliding body 403 and a bump structure 4052 protrudingly disposed on the connection part 4051. The connection part 4051 is formed by disposing a pair of strip-shaped slits 4031 on the sliding body 403. Disposing of the slits 4031 enables the connection part 4051 to easily make radial elastic deformation under an action of external force. The bump structure 4052 is used to fit the clamping structure 701 on the main shaft. For example, when the bump structure 4052 is clamped in the limiting groove 702, the sliding member 40' can be limited to the first position.

When the sliding member 40' is connected to the main shaft 223', an inner surface of the sliding body 403 of the sliding member 40' is in contact with the inner surface of the main shaft 223'.

The following describes in detail a fiber adapter 200' fitting the fiber connector plug 100' provided in the second embodiment.

Figure 49:
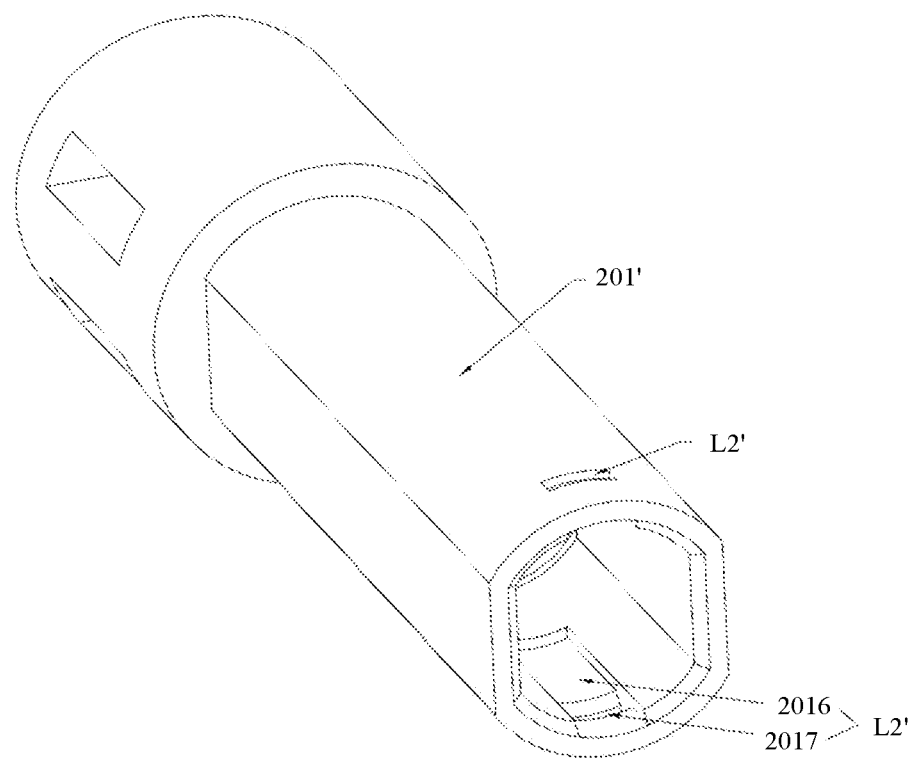
FIG. 49 is a schematic three-dimensional diagram of a fiber adapter according to a second embodiment of this application.
Figure 50:
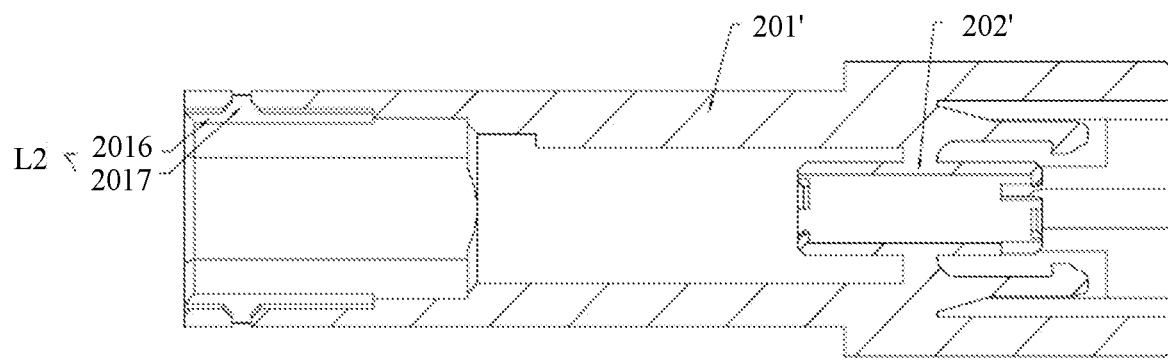
FIG. 50 is a cross-sectional diagram of a fiber adapter according to a second embodiment of this application.

Referring to FIG. 49 and FIG. 50, the fiber adapter 200' includes a body sleeve 201' and a ferrule sleeve 202', and a second locking structure L2' is disposed on the body sleeve 201'. A difference between the fiber adapter 200' and the fiber adapter 200 lies in that the second locking structure L2' of the fiber adapter 200' is different from the second locking structure L2 of the fiber adapter 200.

The second locking structure L2' is a clamping groove formed on an inner surface of the body sleeve 201'. The clamping groove includes a limiting groove 2016 recessed on an inner surface of the body part and a groove or hole 2017 located at a bottom of the limiting groove 2016. The limiting groove 2016 is used to fit the elastic arm 22351 of the locking part 2235' on the fiber connector plug 100'. The groove or hole 2017 is used to fit the clamping block 22352 of the locking part 2235' on the fiber connector plug 100'.

Figure 51:
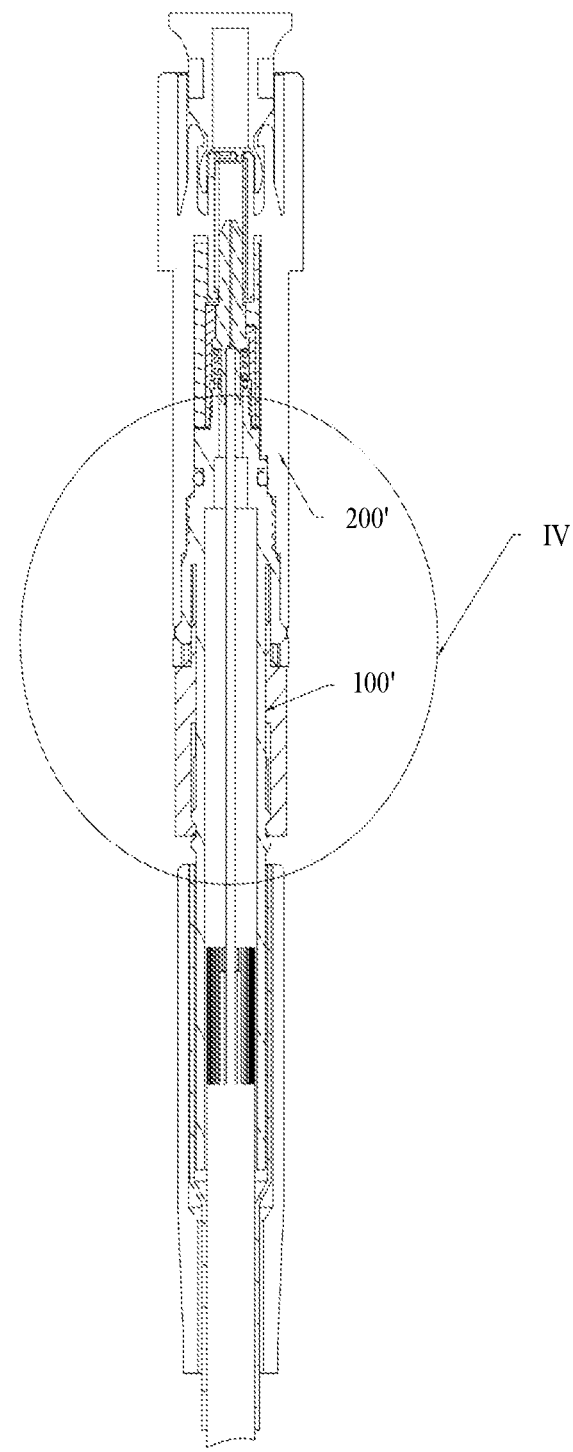
FIG. 51 is a schematic diagram of a state in which a fiber connector plug is inserted into a fiber adapter according to a second embodiment of this application, where the fiber connector plug is in a locked state.
Figure 52:
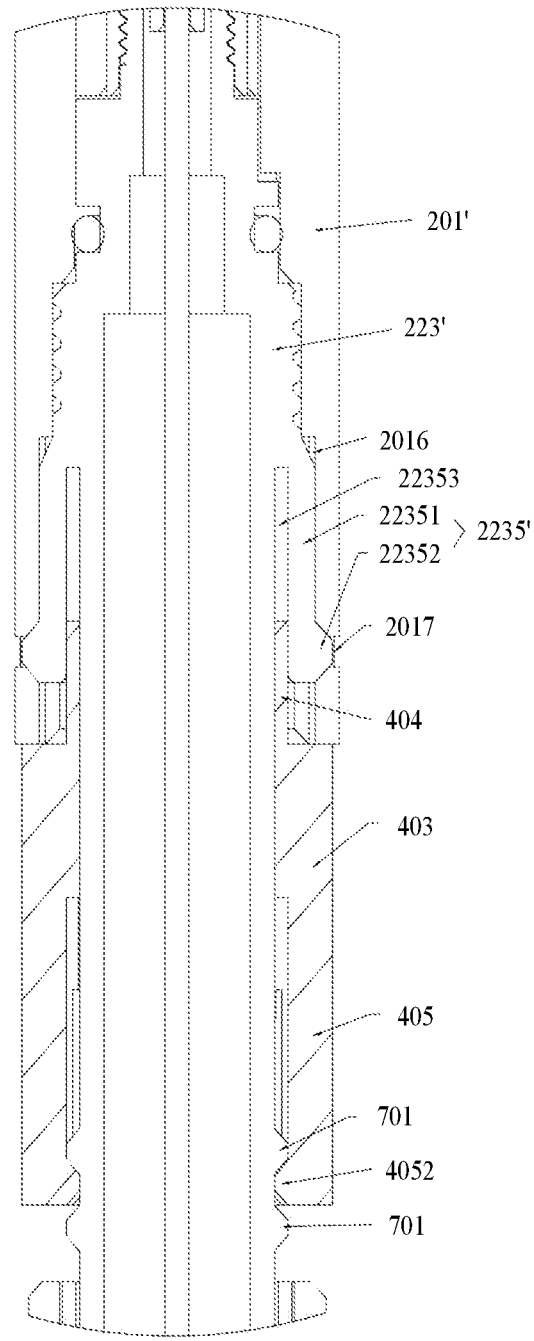
FIG. 52 is an enlarged schematic diagram of a part IV in FIG. 51.
Figure 53:
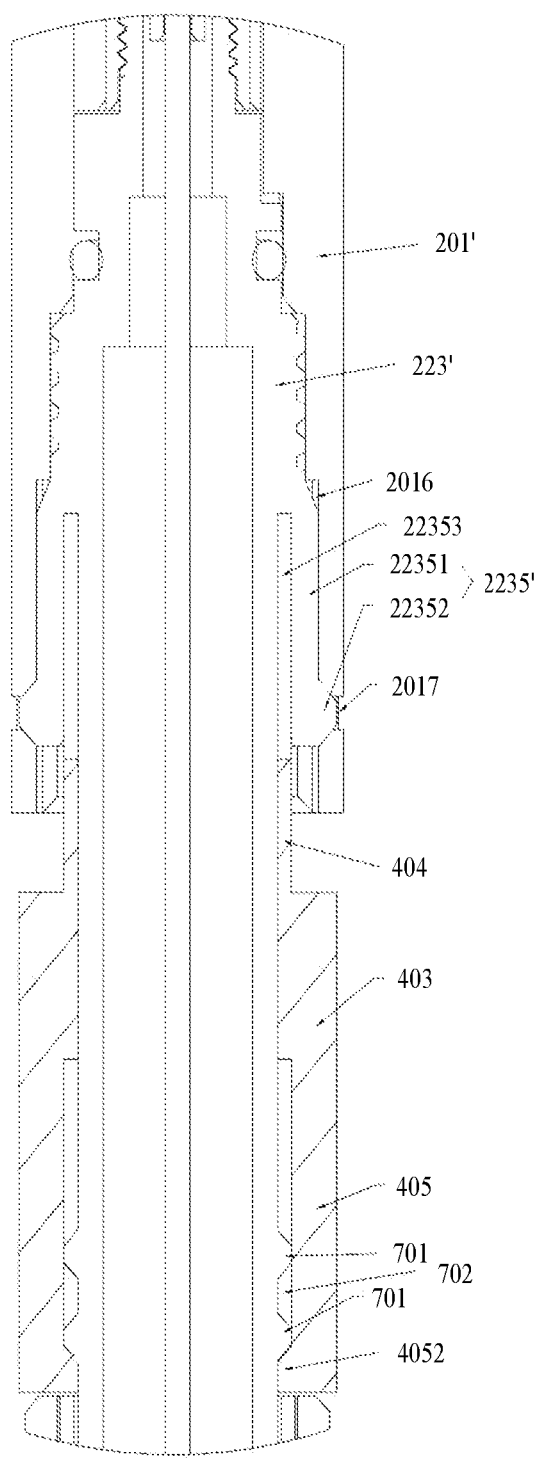
FIG. 53 is a schematic diagram of a state of unlocking between a fiber connector plug and a fiber adapter according to a second embodiment of this application.

FIG. 51 is a schematic diagram of a state in which the fiber connector plug 100' is inserted into the fiber adapter 200'. FIG. 52 is an enlarged schematic diagram of a part IV in FIG. 51. FIG. 52 is a schematic diagram of a state of locking between the fiber connector plug 100' and the fiber adapter 200'. FIG. 53 is a schematic diagram of a state of unlocking between the fiber connector plug 100' and the fiber adapter 200'.

As shown in FIG. 52, after the fiber connector plug 100' is inserted into the fiber adapter 200', the elastic arm 22351 of the locking part 2235' is located in the limiting groove 2016, and the clamping block 22352 is clamped into the groove or hole 2017. The sliding member 40' slides to cause the stop structure 404 to slide into the gap 22353. In this state, the stop structure 404 can abut against the elastic arm 22351, to lock the clamping block 22352 in the groove or hole 2017, such that locking between the fiber connector plug 100' and the corresponding fiber adapter 200' is implemented.

As shown in FIG. 53, the sliding member 40' slides to cause the stop structure 404 to leave the gap 22353. In this state, due to the gap 22353 between the elastic arm 22351 and the main shaft 223', the elastic arm 22351 swings into the gap 22353 under an action of elastic deformation of the elastic arm 22351, such that the clamping block 22352 leaves the groove or hole 2017, to implement unlocking.

The following describes in detail a fiber connector plug provided in a third embodiment.

Figure 54:
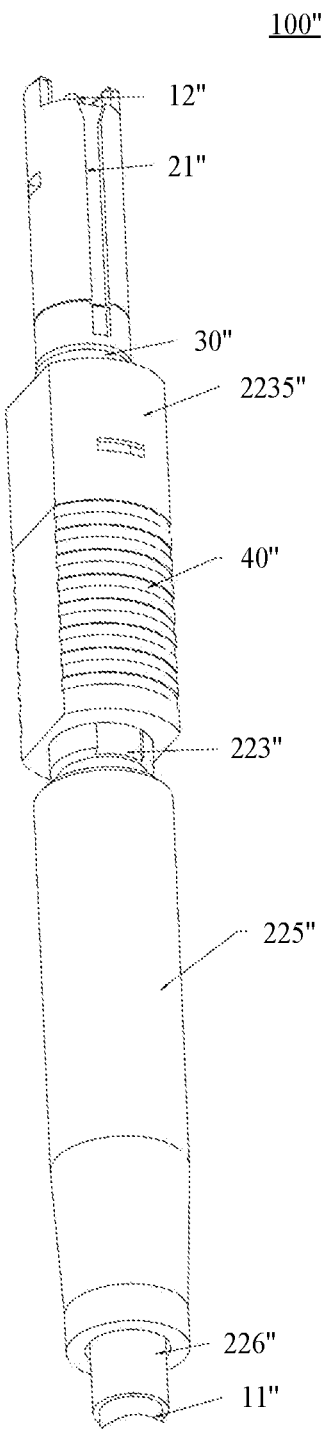
FIG. 54 is a schematic three-dimensional diagram of a fiber connector plug according to a third embodiment of this application.
Figure 55:
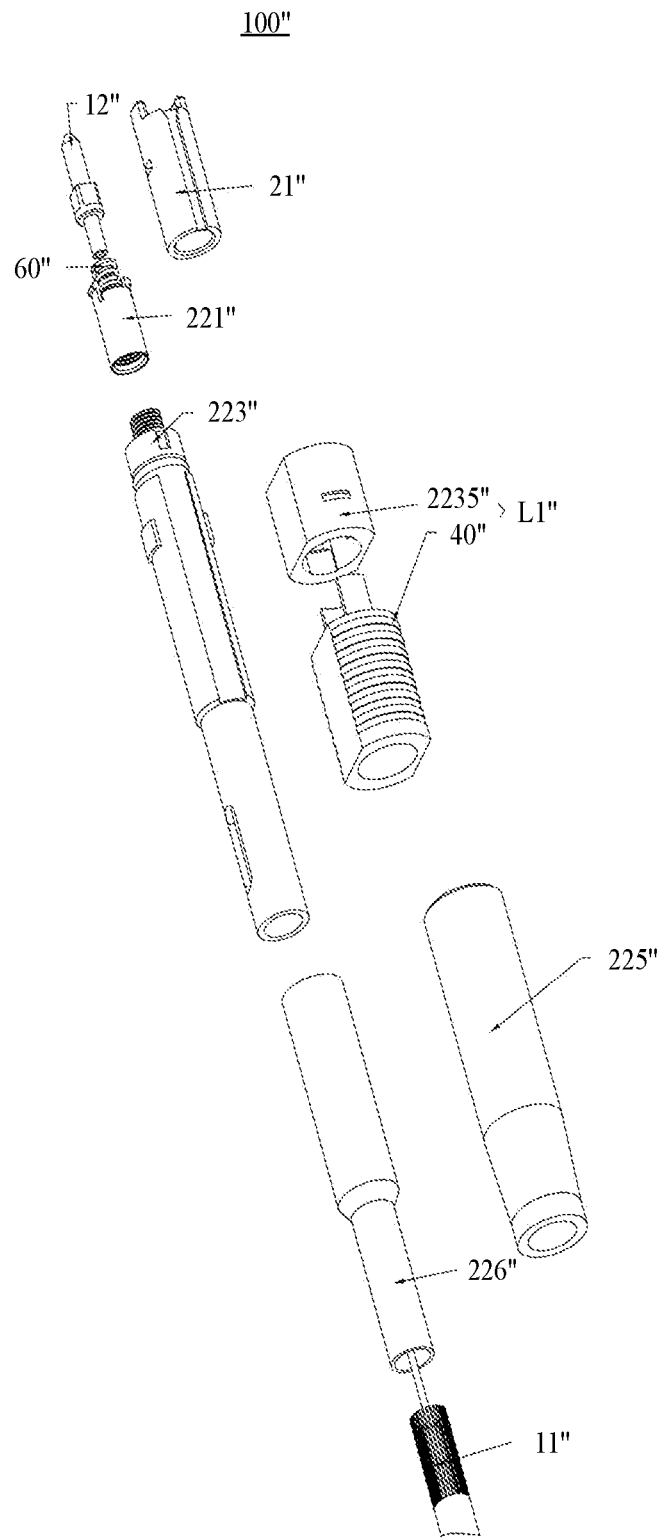
FIG. 55 is a schematic three-dimensional exploded diagram of a fiber connector plug according to a third embodiment of this application.

FIG. 54 is a three-dimensional diagram of a fiber connector plug 100" provided in the third embodiment. FIG. 55 is a three-dimensional exploded diagram of the fiber connector plug 100" provided in the third embodiment. Referring to FIG. 54 and FIG. 55, the fiber connector plug 100" includes a fiber 11", a ferrule 12", a front cover 21", a mounting member 221", a main shaft 223", a tail sleeve 225", a heat shrink tube 226", a sealing structure 30", a sliding member 40", and a first elastic member 60". A locking part 2235" is disposed on the main shaft 223", and the locking part 2235" and the sliding member 40" form a first locking structure L1".

A difference between the fiber connector plug 100" provided in the third embodiment and the fiber connector plug 100' provided in the second embodiment lies in a structure of the main shaft 223", a structure of the locking part 2235", and a structure of the sliding member 40".

Figure 56:
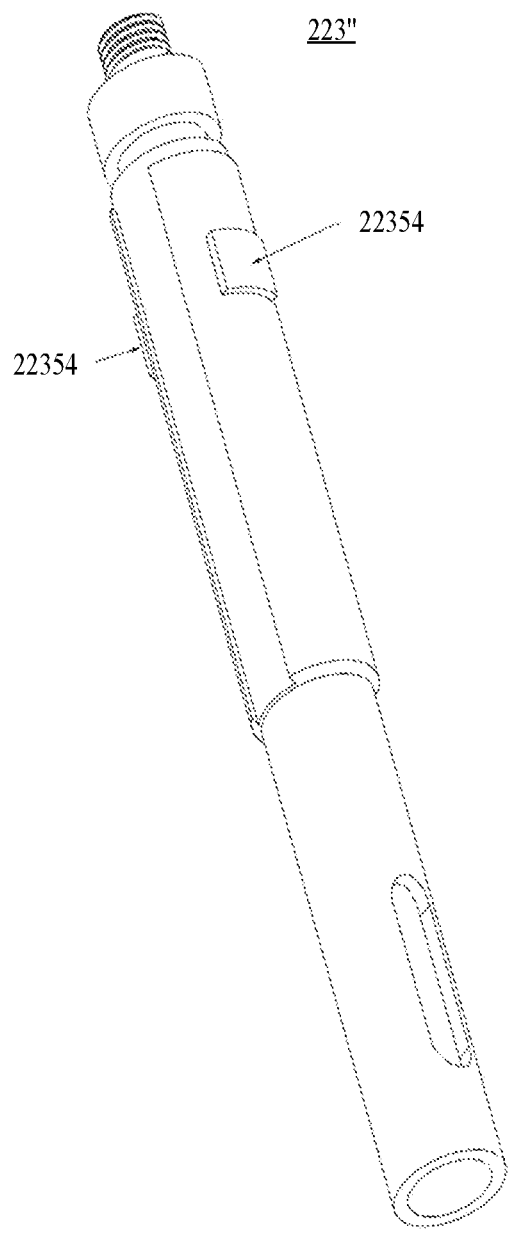
FIG. 56 is a schematic three-dimensional diagram of a main shaft of a fiber connector plug according to a third embodiment of this application.

Referring to FIG. 56, a difference between the main shaft 223" provided in this implementation and the main shaft 223' of the fiber connector plug 100' provided in the second embodiment lies in that no locking part of an integrated structure is disposed on the main shaft 223". In this implementation, the locking part 2235" and the main shaft 223" are a split structure, and a connection part 22354 for connecting the locking part 2235" is disposed on an outer surface of the main shaft 223". The connection part 22354 is a bump structure protrudingly disposed on the outer surface of the main shaft 223". A specific shape of the connection part 22354 may be a square, a circle, a triangle, a polygon, or the like. This is not limited in this application. There are two connection parts 22354 symmetrically distributed on two sides of the main shaft 223".

Figure 57:
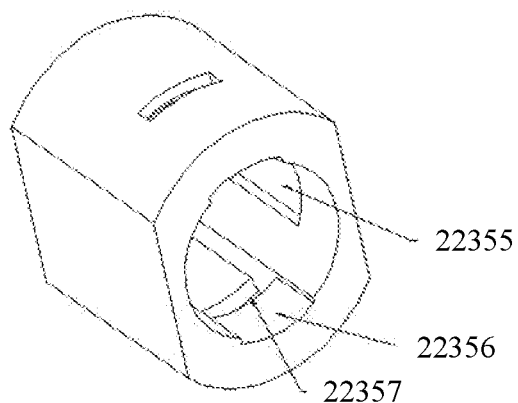
FIG. 57 is a schematic three-dimensional diagram of a locking part of a fiber connector plug in one direction according to a third embodiment of this application.
Figure 58:
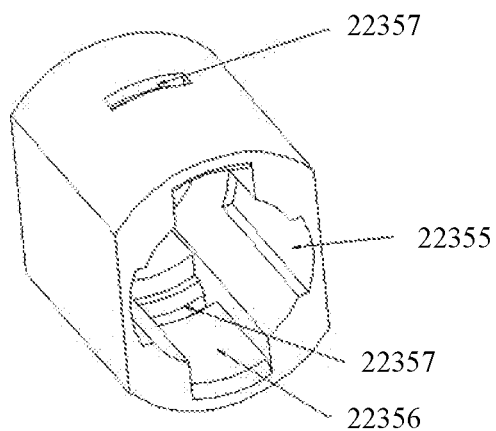
FIG. 58 is a schematic three-dimensional diagram of a locking part of a fiber connector plug in another direction according to a third embodiment of this application.
Figure 59:
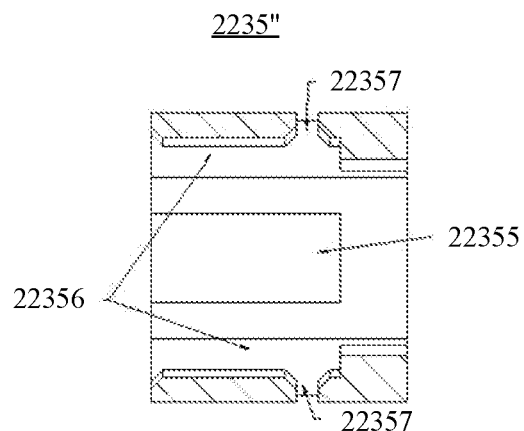
FIG. 59 is a schematic cross-sectional diagram of a locking part of a fiber connector plug according to a third embodiment of this application.

Referring to FIG. 57, FIG. 58, and FIG. 59, the locking part 2235" is in a sleeve-shaped structure, and an inner surface of the locking part 2235" is disposed with a positioning groove 22355, a locking groove 22356, and a hole 22357. The positioning groove 22355 is used to fit the connection part 22354 on the outer surface of the main shaft 223" to fasten the locking part 2235" to the main shaft 223". There are two positioning grooves 22355 symmetrically distributed on two sides of a central axis of the locking part 2235". The hole 22357 is located at a bottom of the locking groove 22356, and the hole 22357 is in a through-hole structure, such that the inner surface of the locking part 2235" communicates with an outer surface of the locking part 2235". An extension direction of the locking groove 22356 is an axial direction of the locking part 2235", and an opening of the locking groove 22356 is formed at one end face of the locking part 2235". There are two holes 22357 and two locking grooves 22356, and the two holes 22357 and the two locking grooves 22356 are symmetrically distributed on other two sides of the central axis of the locking part 2235".

During assembly, the locking part 2235" is sleeved over the main shaft 223", and the connection part 22354 is clamped into the positioning groove 22355, to implement a connection between the locking part 2235" and the main shaft 223". In this state, a bottom wall of the locking groove 22356 and the main shaft 223" form an accommodating space, and the locking part 2235" in a bottom wall position of the locking groove 22356 forms a locking arm. It may be understood that the hole 22357 is disposed on the locking arm. The hole 22357 may be in a structure of a clamping groove or a hole. The accommodating space is formed between the locking arm and the outer surface of the main shaft 223". The accommodating space is used to accommodate a second locking structure of a fiber adapter, and the hole 22357 is used to fit the second locking structure.

Figure 60:
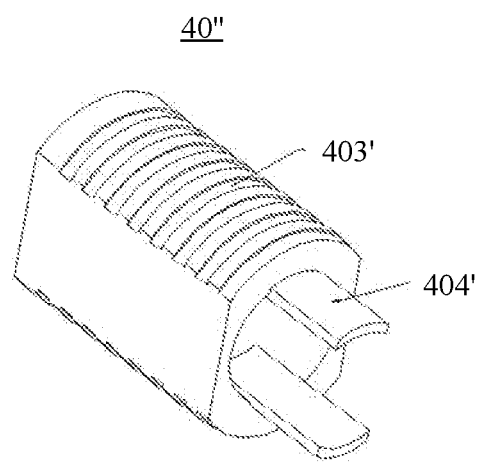
FIG. 60 is a schematic three-dimensional diagram of a sliding member of a fiber connector plug according to a third embodiment of this application.

Referring to FIG. 60, a structure of the sliding member 40" provided in this implementation may be the same as a structure of the sliding member 40' in the fiber connector plug 100' provided in the second embodiment, and the sliding member 40" is slidably connected to the main shaft 223". The sliding member 40" includes a sliding body 403' and a stop structure 404' connected to one end of the sliding body 403'. The stop structure 404' can move into the accommodating space and abut against the second locking structure of the fiber adapter.

The following describes in detail a fiber adapter 200" fitting the fiber connector plug 100" provided in the third embodiment.

Figure 61:
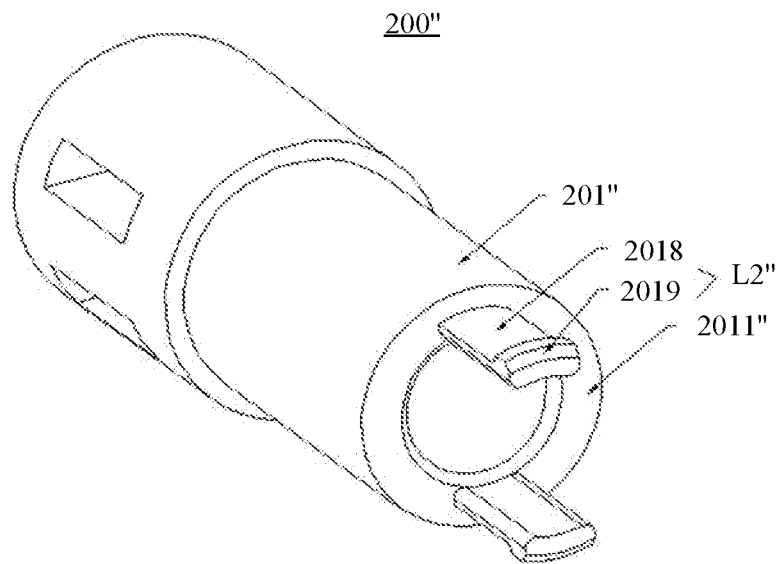
FIG. 61 is a schematic three-dimensional diagram of a fiber adapter according to a third embodiment of this application.
Figure 62:
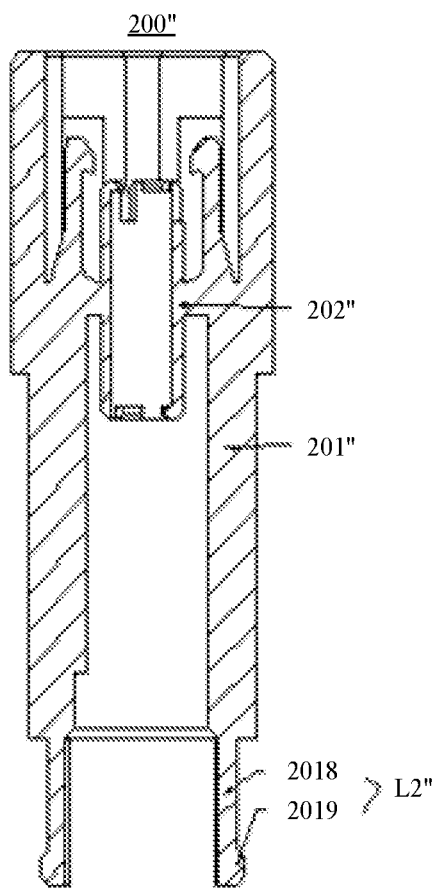
FIG. 62 is a schematic cross-sectional diagram of a fiber adapter according to a third embodiment of this application.

Referring to FIG. 61 and FIG. 62, the fiber adapter 200" includes a body sleeve 201" and a ferrule sleeve 202", and a second locking structure L2" is disposed on the body sleeve 201". A difference between the fiber adapter 200" and the fiber adapter 200 lies in that the second locking structure L2" of the fiber adapter 200" is different from the second locking structure L2 of the fiber adapter 200.

In an implementation, the second locking structure L2" includes a buckle part 2019 and a connection section 2018. The connection section 2018 is connected between the buckle part 2019 and an end face 2011" of the body sleeve 201". The buckle part 2019 is protrudingly disposed on a surface that is of the connection section 2018 and that is away from a central axis of the body sleeve 201". The connection section 2018 is used to extend into an accommodating space between the locking arm and the main shaft 223" on the fiber connector plug 100". To be more specific, the connection section 2018 is used to fit the locking groove 22356, and the buckle part 2019 is used to fit the hole 22357.

Figure 63:
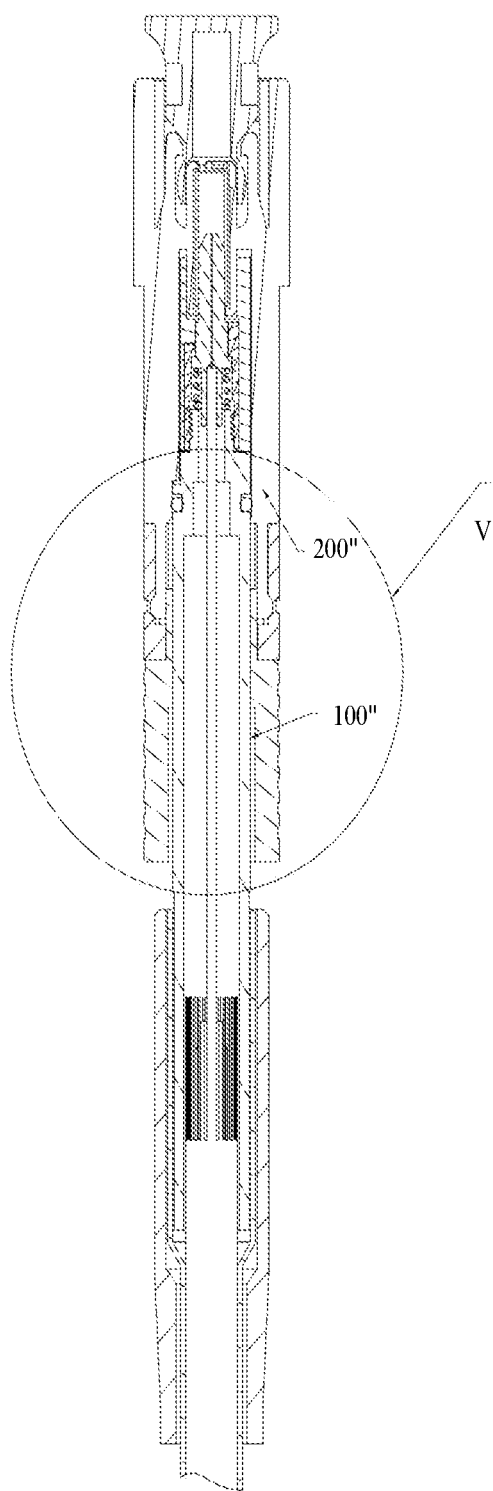
FIG. 63 is a schematic diagram of a state in which a fiber connector plug is inserted into a fiber adapter according to a third embodiment of this application, where the fiber connector plug is in a locked state.
Figure 64:
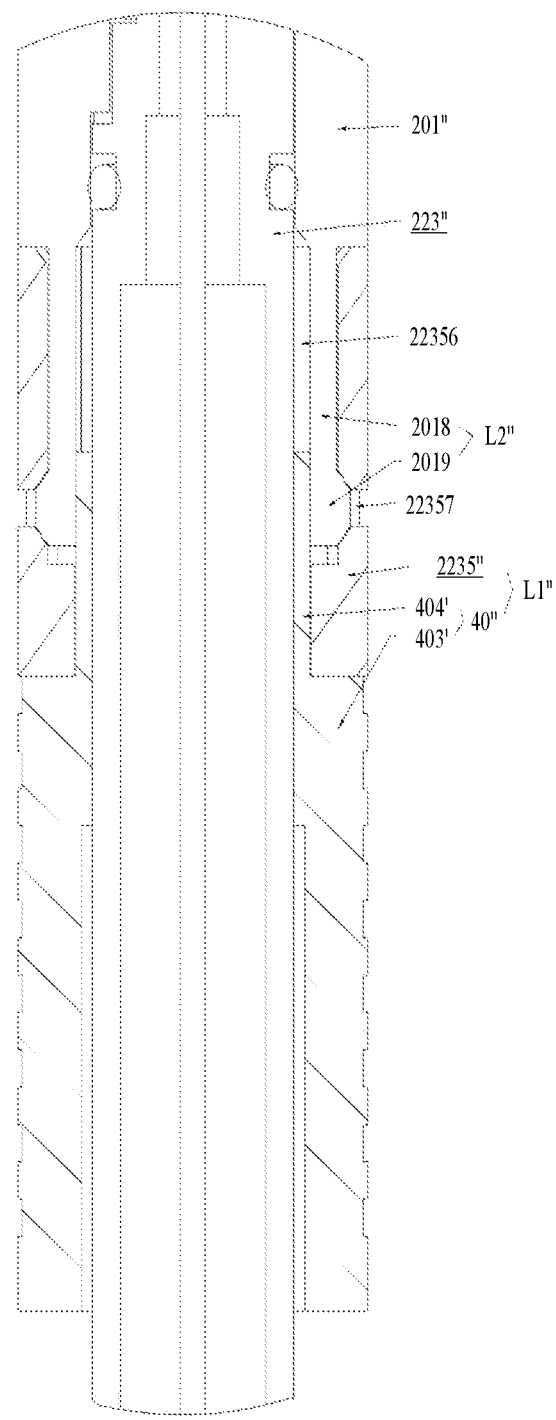
FIG. 64 is an enlarged schematic diagram of a part V in FIG. 63.
Figure 65:
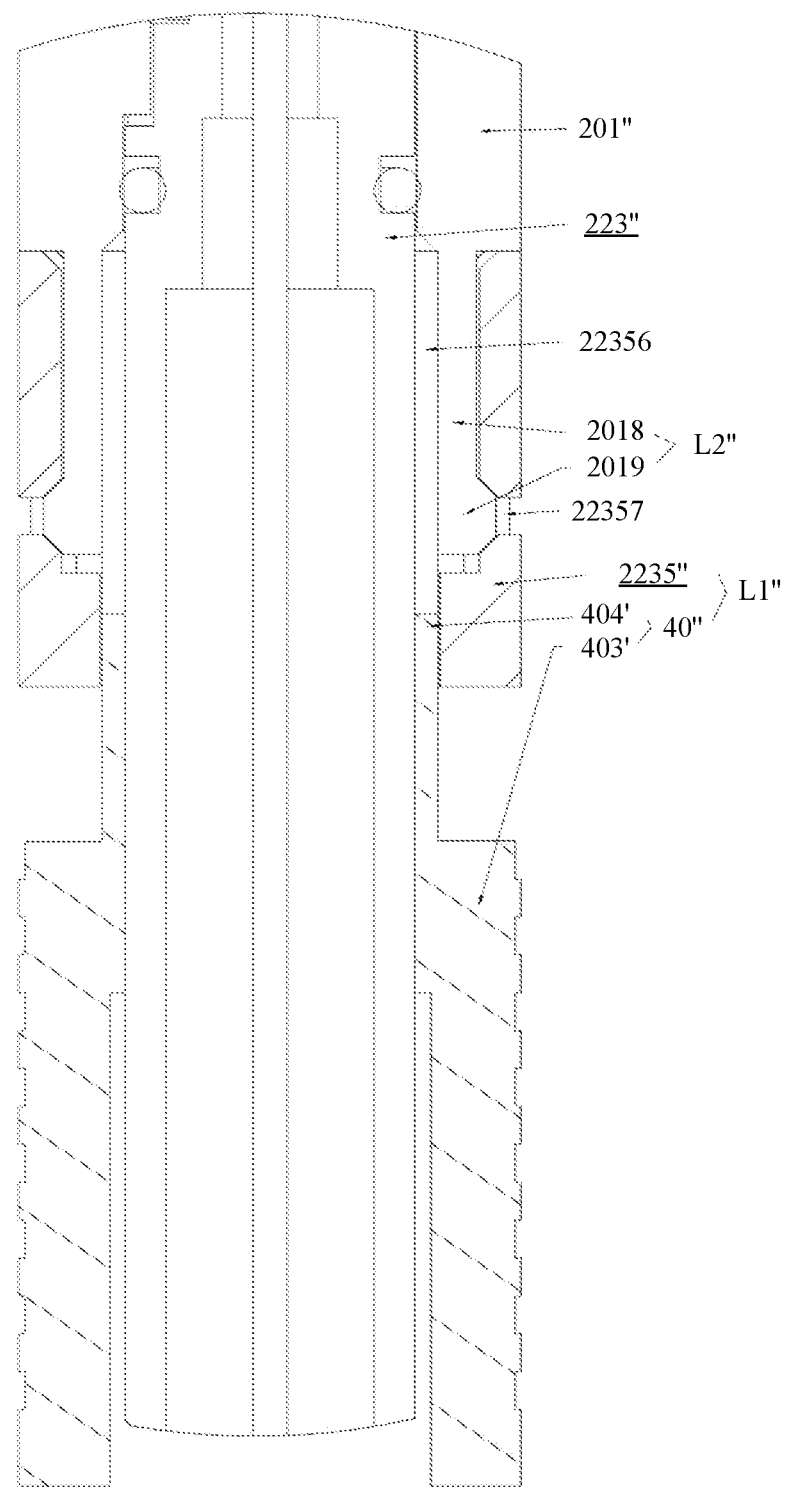
FIG. 65 is a schematic diagram of a state of unlocking between a fiber connector plug and a fiber adapter according to a third embodiment of this application.

FIG. 63 is a schematic diagram of a state in which the fiber connector plug 100" is inserted into the fiber adapter 200". FIG. 64 is an enlarged schematic diagram of a part V in FIG. 63. FIG. 64 is a schematic diagram of a state of locking between the fiber connector plug 100" and the fiber adapter 200". FIG. 65 is a schematic diagram of a state of unlocking between the fiber connector plug 100" and the fiber adapter 200".

As shown in FIG. 64, in a process of inserting the fiber connector plug 100" into the fiber adapter 200", the second locking structure L2" of the fiber adapter 200" is aligned, to form an opening position of the locking groove 22356 on an end face of with the locking part 2235". The fiber connector plug 100" is inserted into the fiber adapter 200", such that the connection section 2018 extends into the locking groove 22356 and that the buckle part 2019 is located in the position of the hole 22357. Then the sliding member 40" slides to cause the stop structure 404' to slide into a gap between the connection section 2018 and the main shaft 223". In this state, the stop structure 404' can abut against the connection section 2018, to lock the buckle part 2019 in the hole 22357, such that locking between the fiber connector plug 100" and the corresponding fiber adapter 200" is implemented.

As shown in FIG. 65, the sliding member 40" slides to cause the stop structure 404' to leave the gap between the connection section 2018 and the main shaft 223". In this state, the connection section 2018 swings toward one side of the main shaft 223" under an action of elastic deformation of the connection section 2018, such that the buckle part 2019 can be detached from the hole 22357, to implement unlocking.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fiber connector plug, comprising:
    a fiber comprising a fiber core, a reinforced layer wrapped around the fiber core, and an outer layer wrapped around the reinforced layer, wherein a part of the fiber core extends out of the reinforced layer, and wherein another part of the reinforced layer is not wrapped by the outer layer;
    a ferrule fastened to a front end of the fiber, wherein the ferrule comprises a front end face away from the fiber;
    a sleeve-shaped main housing sleeved over a periphery of the fiber, wherein the main housing comprises a sleeve-shaped main shaft, wherein the main shaft comprises a front end and a tail end that are opposite to each other, wherein the main shaft accommodates the fiber, wherein the tail end is fastened to the fiber, wherein the tail end is disposed with a through hole that penetrates an outer surface and inner surface of the main shaft, and wherein the through hole is configured to fill glue into a gap between the fiber and the inner surface of the main shaft, and wherein the glue is configured to fasten the reinforced layer to the main shaft;
    a front cover fastened to one end of the main housing and encircling the ferrule, wherein the front end of the main shaft is connected to the front cover, wherein the front cover comprises a front end face that is away from the main housing and a rear end face that faces the main housing, wherein the front end face of the ferrule is flush with the front end face of the front cover, or in an axial direction the front end face of the ferrule is located between the front end face of the front cover and the rear end face of the front cover; and
    a slot formed between the front cover and the ferrule, wherein the slot is configured to accommodate a ferrule sleeve of a fiber adapter, such that an end face of the ferrule sleeve is located in the slot, and wherein the ferrule is configured to be inserted into the ferrule sleeve.

2. The fiber connector plug of claim 1, further comprising a first guide structure disposed on an outer surface of the front cover, wherein the first guide structure is configured to fit a guide key on the fiber adapter.

3. The fiber connector plug of claim 2, wherein the first guide structure extends along an axial direction.

4. The fiber connector plug of claim 2, wherein in a radial direction, the first guide structure is one of:
   a slot structure disposed on the outer surface of the front cover;
   a guide structure penetrating an inner surface and the outer surface of the front cover; or
   a guide structure protrudingly disposed on the outer surface of the front cover.

5. The fiber connector plug of claim 2, further comprising a second guide structure disposed on a second outer surface of the main housing, wherein the second guide structure and the first guide structure are connected and jointly used to fit the guide key on the fiber adapter.

6. The fiber connector plug of claim 1, wherein the front end face of the front cover is in a closed ring structure, and wherein the front cover comprises:
   one notch disposed at an end of the front cover and close to the front end face of the front cover such that the front end face of the front cover forms a non-closed continuously extending surface; or
   two notches opposite to each other disposed at the end of the front cover and close to the front end face such that the front end face of the front cover is formed between the two notches.

7. The fiber connector plug of claim 1, further comprising:
   a first limiting structure disposed on a surface of the ferrule; and
   a second limiting structure disposed on an inner surface of the front cover, wherein the first limiting structure fits the second limiting structure to prevent the ferrule and the front cover from rotating relative to each other.

8. The fiber connector plug of claim 7, wherein the first limiting structure comprises a first plane, wherein the second limiting structure is protrudingly disposed on the inner surface of the front cover, wherein the second limiting structure comprises a second plane facing the ferrule, and wherein the first plane is in contact with the second plane.

9. The fiber connector plug of claim 1, wherein the main housing comprises a main shaft and a mounting member that are both sleeve-shaped, wherein the mounting member is connected to an end of the main shaft that faces the front cover, wherein a first stop structure is disposed on an outer surface of the ferrule, wherein the mounting member comprises a mounting member body and a second stop structure, wherein the second stop structure is located at a front end of the mounting member body and protrudes from an inner surface of the mounting member body, wherein the mounting member is configured to accommodate a part of the ferrule, wherein the first stop structure fits the second stop structure to prevent the ferrule from moving out of the mounting member from the front end of the mounting member body, and wherein the front cover is sleeved over an outer surface of the mounting member and is fastened to the mounting member.

10. The fiber connector plug of claim 9, wherein the mounting member further comprises an elastic clamping hook formed at the front end of the mounting member body, wherein the front cover is disposed with a clamping groove or a hole, and wherein the elastic clamping hook fits the clamping groove or the hole to fasten the mounting member to the front cover.

11. The fiber connector plug of claim 9, wherein a rear end face of the mounting member body and the rear end face of the front cover are coplanar and jointly form a connecting face, and wherein the connecting face is in contact with an end face of the main shaft.

12. The fiber connector plug of claim 11, further comprising a positioning structure disposed at a joint between the connecting face and a front end face of the main shaft, wherein the positioning structure is configured to at least one of:
   position the main housing and the front cover in a circumferential direction; or
   position the main housing and the mounting member in a circumferential direction.

13. The fiber connector plug of claim 12, wherein a first cut is disposed on the rear end face of the front cover, wherein a second cut is disposed on the rear end face of the mounting member body, wherein the first cut and the second cut are opposite to each other in a radial direction, wherein a bump is disposed on the end face of the main shaft, and wherein the bump fits the first cut and the second cut.

14. The fiber connector plug of claim 1, further comprising a sealing structure and a first locking structure disposed on an outer surface of the main housing and along the axial direction, wherein the sealing structure is located between the front cover and the first locking structure, wherein the first locking structure is configured to fit a second locking structure of the fiber adapter, and wherein the sealing structure is sealing connection of an inner surface of the fiber adapter.

15. A fiber adapter, comprising:
   a body sleeve, wherein an inner surface of the body sleeve is configured to be in contact with an outer surface of a front cover of a fiber connector plug;
   a ferrule sleeve connected inside the body sleeve, wherein a first slot is formed between the body sleeve and the ferrule sleeve, and wherein the first slot is configured to accommodate a part of the front cover;
   a ceramic sleeve connected inside the ferrule sleeve and configured to accommodate a ferrule of the fiber connector plug; and
   a first accommodating space communicating with an internal space of the ferrule sleeve, wherein the first accommodating space is disposed inside the body sleeve and is configured to accommodate the fiber connector plug.

16. The fiber adapter of claim 15, further comprising a guide key disposed on the inner surface of the body sleeve, wherein an extension direction of the guide key is the same as an extension direction of a central axis of the ferrule sleeve, and wherein the guide key is configured to fit a first guide structure on the front cover of the fiber connector plug.

17. The fiber adapter of claim 15, wherein the body sleeve comprises a first end, a second end, and a body part connected between the first end and the second end, wherein the ferrule sleeve is connected inside the body part, wherein the fiber adapter comprises a second locking structure disposed at the first end, wherein the second locking structure is configured to fit a first locking structure of the fiber connector plug, and wherein an inner surface of the body part is configured to sealingly connect to a sealing structure of the fiber connector plug.

18. A connector assembly, comprising:
   a fiber adapter comprising a ferrule sleeve; and a fiber connector plug comprising:
- a fiber comprising a fiber core, a reinforced layer wrapped around the fiber core, and an outer layer wrapped around the reinforced layer, wherein a part of the fiber core extends out of the reinforced layer, and wherein another part of the reinforced layer is not wrapped by the outer layer;
- a ferrule fastened to a front end of the fiber, wherein the ferrule comprises a front end face away from the fiber;
- a sleeve-shaped main housing sleeved over a periphery of the fiber, wherein the main housing comprises a sleeve-shaped main shaft, wherein the main shaft comprises a front end and a tail end that are opposite to each other, wherein the main shaft accommodates the fiber, wherein the tail end is fastened to the fiber, wherein the tail end is disposed with a through hole that penetrates an outer surface and inner surface of the main shaft, and wherein the through hole is configured to fill glue into a gap between the fiber and the inner surface of the main shaft, and wherein the glue is configured to fasten the reinforced layer to the main shaft;
- a front cover fastened to one end of the main housing and encircling the ferrule, wherein the front end of the main shaft is connected to the front cover, wherein the front cover comprises a front end face that is away from the main housing and a rear end face that faces the main housing, wherein the front end face of the ferrule is flush with the front end face of the front cover, or in an axial direction, the front end face of the ferrule is located between the front end face and the rear end face of the front cover; and
- a slot formed between the front cover and the ferrule, wherein the slot is configured to accommodate the ferrule sleeve of the fiber adapter.

19. The connector assembly of claim 18, wherein the main housing comprises a main shaft and a mounting member that are both sleeve-shaped, wherein the mounting member comprises a mounting member body and an elastic clamping hook formed at the front end of the mounting member body, wherein the front cover is disposed with a clamping groove or a hole, and wherein the elastic clamping hook fits the clamping groove or the hole to fasten the mounting member to the front cover.

20. The connector assembly of claim 18, wherein the main housing comprises a main shaft and a mounting member that are both sleeve-shaped, wherein the mounting member comprises a mounting member body, wherein a rear end face of the mounting member body and a rear end face of the front cover are coplanar and jointly form a connecting face, and wherein the connecting face is in contact with an end face of the main shaft.

* * * * *